United States Patent
Huang et al.

(10) Patent No.: US 12,449,328 B2
(45) Date of Patent: Oct. 21, 2025

(54) APPARATUS AND SYSTEM FOR VISUAL INSPECTION OF FIBER ENDS AND IMAGE ANALYSIS TOOL FOR DETECTING CONTAMINATION

(71) Applicant: Panduit Corp., Tinley Park, IL (US)

(72) Inventors: Yu Huang, Orland Park, IL (US); Jose M. Castro, Naperville, IL (US); Andrew R. Matcha, Chicago, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 281 days.

(21) Appl. No.: 18/097,533

(22) Filed: Jan. 17, 2023

(65) Prior Publication Data

US 2023/0228648 A1   Jul. 20, 2023

Related U.S. Application Data

(60) Provisional application No. 63/300,848, filed on Jan. 19, 2022.

(51) Int. Cl.
*G01M 11/02* (2006.01)
*G01M 11/00* (2006.01)
(Continued)

(52) U.S. Cl.
CPC .... *G01M 11/0257* (2013.01); *G01M 11/0278* (2013.01); *G01M 11/30* (2013.01);
(Continued)

(58) Field of Classification Search
CPC ......... G01M 11/0257; G01M 11/0278; G01M 11/30; G01N 21/88; G01N 21/8803;
(Continued)

(56) References Cited

U.S. PATENT DOCUMENTS

| | | | |
|---|---|---|---|
| 3,947,127 A | | 3/1976 | Bennett et al. |
| 4,952,058 A | * | 8/1990 | Noguchi ............. G01N 21/956 356/394 |

(Continued)

FOREIGN PATENT DOCUMENTS

| | | | | |
|---|---|---|---|---|
| CN | 112986264 A | * | 6/2021 | ............. G01N 21/01 |
| EP | 0114637 A2 | * | 8/1984 | ............ G01M 11/00 |

(Continued)

OTHER PUBLICATIONS

Lin, Chern S., et al. "Measurement of surface profile and surface roughness of fibre-optic interconnect by fast Fourier transform." Metrology and measurement Systems 24.2 (2017): 381-390. (Year: 2017).*

*Primary Examiner* — Michelle M Iacoletti
*Assistant Examiner* — Noah J. Haney
(74) *Attorney, Agent, or Firm* — Peter S. Lee; Christopher S. Clancy; James H. Williams

(57) ABSTRACT

A visual inspection device and apparatus is disclosed for inspecting fiber ends of a connector by capturing an image of the connector end face, and implementing an image analysis tool for detecting contamination from the captured image. The visual inspection tool includes components for providing a larger field of view to capture the entire connector end face in a single image, and the image analysis tool is able to accurately and efficiently detect contamination from the captured image.

12 Claims, 43 Drawing Sheets

(51) Int. Cl.

| | | |
|---|---|---|
| *G01N 21/88* | (2006.01) | |
| *G02B 5/02* | (2006.01) | |
| *G02B 6/38* | (2006.01) | |
| *G02B 25/00* | (2006.01) | |
| *G02B 27/14* | (2006.01) | |
| *G06T 7/00* | (2017.01) | |
| *G06T 7/12* | (2017.01) | |

(52) U.S. Cl.
CPC ........... *G01N 21/88* (2013.01); *G06T 7/0004* (2013.01); *G06T 7/12* (2017.01); *G01N 21/8803* (2013.01); *G01N 2021/8812* (2013.01); *G01N 2021/8845* (2013.01); *G02B 5/0278* (2013.01); *G02B 6/385* (2013.01); *G02B 25/002* (2013.01); *G02B 27/14* (2013.01); *G06T 2207/20021* (2013.01); *G06T 2207/20052* (2013.01); *G06T 2207/20061* (2013.01); *G06T 2207/30108* (2013.01)

(58) Field of Classification Search
CPC .... G01N 2021/8812; G01N 2021/8845; G06T 7/0004; G06T 7/12; G06T 2207/20021; G06T 2207/20052; G06T 2207/20061; G06T 2207/30108; G02B 5/0278; G02B 6/385; G02B 25/002; G02B 27/14
USPC ........................................................ 356/73.1
See application file for complete search history.

(56) References Cited

U.S. PATENT DOCUMENTS

| | | |
|---|---|---|
| 5,179,419 A | 1/1993 | Palmquist et al. |
| 5,724,127 A | 3/1998 | Csipkes et al. |
| 5,995,212 A | 11/1999 | Dar et al. |
| 6,148,097 A * | 11/2000 | Nakayama ......... G01M 11/0264 382/141 |
| 8,164,744 B2 | 4/2012 | Narum et al. |
| 8,976,345 B2 | 3/2015 | Zhou et al. |
| 9,151,694 B2 | 10/2015 | Wilson et al. |
| 9,217,688 B2 | 12/2015 | Levin et al. |
| 9,528,908 B2 | 12/2016 | Wilson et al. |
| 9,880,105 B2 | 1/2018 | Thompson |
| 9,915,790 B2 | 3/2018 | Baribault |
| 10,006,831 B2 | 6/2018 | Higuchi et al. |
| 10,521,922 B2 * | 12/2019 | Takasu .................. G06T 7/0002 |
| 10,627,310 B2 | 4/2020 | Levin et al. |
| 10,900,866 B2 | 1/2021 | Baribault |
| 2004/0156043 A1 * | 8/2004 | Toker ............... G01N 21/95684 356/602 |
| 2006/0078190 A1 * | 4/2006 | Shibata ................. G06T 7/0004 382/149 |
| 2008/0073485 A1 * | 3/2008 | Jahn ......................... G02B 7/36 356/73.1 |
| 2008/0074676 A1 * | 3/2008 | Koudelka .......... G01N 21/8806 356/600 |
| 2014/0327735 A1 * | 11/2014 | Ruchet ................. G03H 1/0866 348/40 |
| 2015/0116700 A1 * | 4/2015 | Meek ................... G01N 21/952 356/73.1 |
| 2016/0313211 A1 * | 10/2016 | Higuchi ............... G02B 6/3866 |
| 2016/0320565 A1 * | 11/2016 | Brown ................... G01M 11/33 |
| 2017/0244936 A1 * | 8/2017 | Koga ................. G01N 21/9501 |
| 2021/0270695 A1 | 9/2021 | Diepstraten et al. |
| 2021/0337091 A1 * | 10/2021 | Cassady ............... G02B 6/3847 |

FOREIGN PATENT DOCUMENTS

| | | | | |
|---|---|---|---|---|
| JP | 2005043229 A | * | 2/2005 | ........... G01N 21/958 |
| JP | 2006017487 A | * | 1/2006 | ........... G01N 21/892 |

* cited by examiner

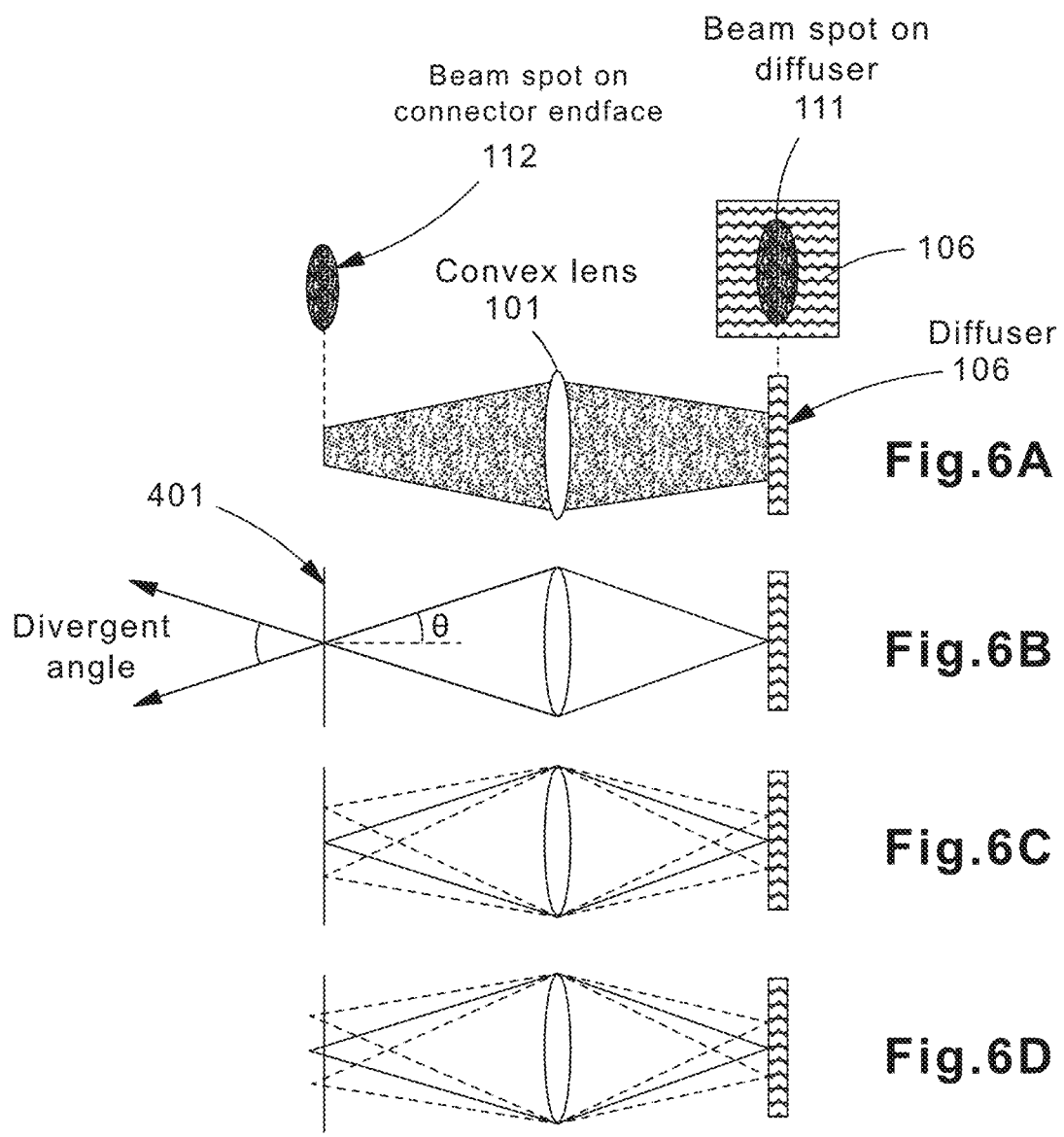

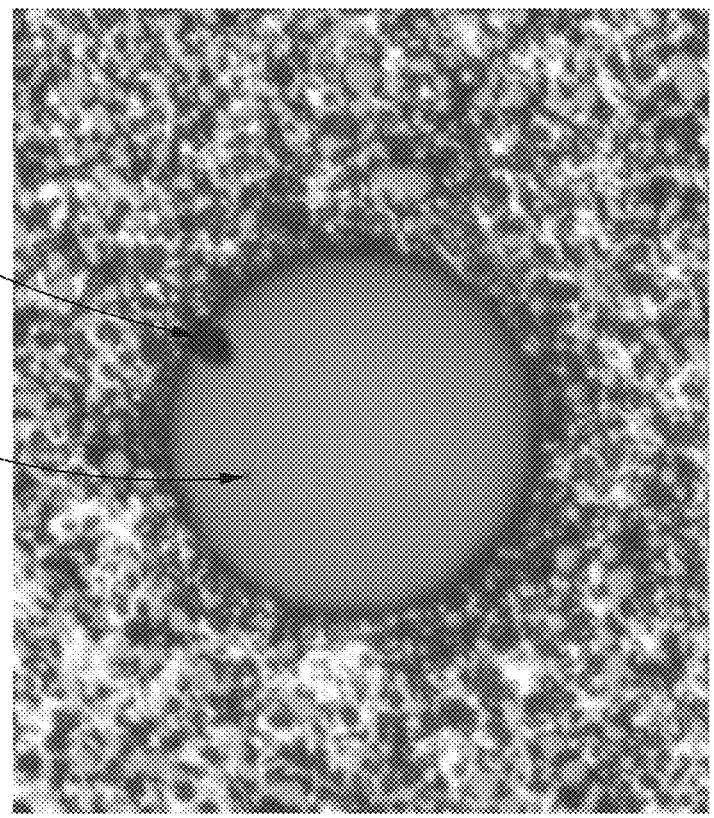
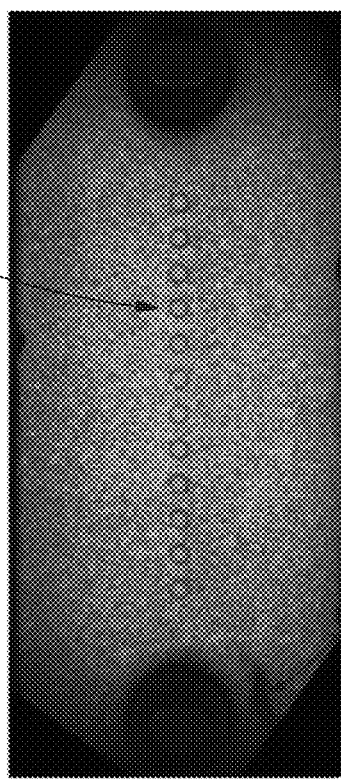
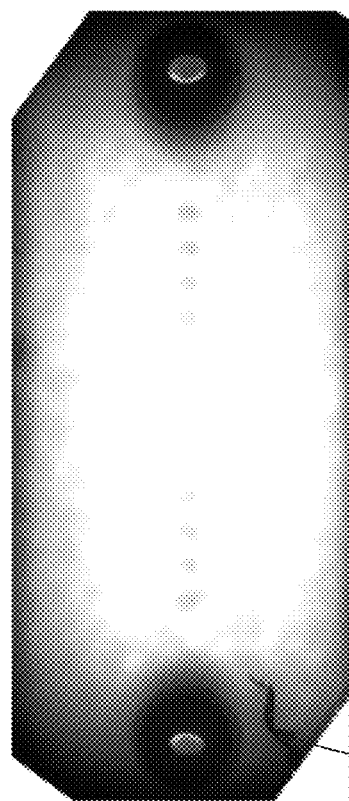
Fig.22C
Fig.22A
Fig.22B

Basic components of Visual Inspection System

Flow Diagram shown algorithms used for a large FOV

```
COMPUTER NAME PLN_FIBER_M1_10
USER NAME CRD - FIBER
DATE      10/04/21   10:41 AM
DEVICE SN 63717
INSPECTOR ID: 0000
CABLE ID: 000
IEC: 61300-3-30: 000
NI/F PC TABLE 4
```

|       | ZONE A                |                | ZONE B                    |                          |                     | 0, MOX        | DECISION |         |
|-------|-----------------------|----------------|---------------------------|--------------------------|---------------------|---------------|----------|---------|
|       | 0<0<5,WCF0            | 6<D MAX 0      | 0<0<5,UNLMTED             | 6<0<10, MAX5             | 70< 0, MOX          |               |          |         |
| FteR  | I D I S I             | I D I S I      | I D I S I                 | I D I S I                | I D I S I           | I D I S I     | EC       | Panduit |
| 1     | 0 0 0 0               | 0 0 0 0        | 0 0 0 0                   | 0 0 0 0                  | 0 0 0 0             | 0 0 0 0       | PASS     | PASS    |
| 2     | 0 0 0 0               | 0 0 0 0        | 0 0 0 0                   | 0 0 0 0                  | 0 0 0 0             | 0 0 0 0       | PASS     | PASS    |
| 3     | 0 0 0 0               | 0 0 0 0        | 0 0 0 0                   | 0 0 0 0                  | 0 0 0 0             | 0 0 0 0       | PASS     | PASS    |
| 4     | 0 0 0 0               | 0 0 0 0        | 0 0 0 0                   | 0 0 0 0                  | 0 0 0 0             | 0 0 0 0       | PASS     | PASS    |
| 5     | 0 0 0 0               | 49 42 0 0      | 42 2 0 0                  | 9 0 0 0                  | 12 0 0 0            | 0 0 0 0       | FAIL     | FAIL    |
| 6     | 0 0 0 0               | 40 33 0 0      | 30 0 0 0                  | 13 0 0 0                 | 15 0 0 0            | 0 0 0 0       | FAIL     | FAIL    |
| 7     | 0 0 0 0               | 46 40 0 0      | 30 4 0 0                  | 17 0 0 0                 | 19 0 0 0            | 0 0 0 0       | FAIL     | FAIL    |
| 8     | 0 0 0 0               | 50 38 0 0      | 37 0 0 0                  | 0 0 0 0                  | 4 0 0 0             | 0 0 0 0       | FAIL     | FAIL    |
| 9     | 0 0 0 0               | 0 0 0 0        | 0 0 0 0                   | 0 0 0 0                  | 0 0 0 0             | 0 0 0 0       | PASS     | PASS    |
| 10    | 0 0 0 0               | 0 0 0 0        | 0 0 0 0                   | 0 0 0 0                  | 0 0 0 0             | 0 0 0 0       | PASS     | PASS    |
| 11    | 0 0 0 0               | 0 0 0 0        | 0 0 0 0                   | 0 0 0 0                  | 0 0 0 0             | 0 0 0 0       | PASS     | PASS    |
| 12    | 0 0 0 0               | 0 0 0 0        | 0 0 0 0                   | 0 0 0 0                  | 0 0 0 0             | 0 0 0 0       | PASS     | PASS    |

Example of Test Report

Fig.26A

Flow diagram of PCM

Circle reduction algorithm.

Flow chart of PDA

Contamination detection for the entire connector (outside fibers).

APPARATUS AND SYSTEM FOR VISUAL INSPECTION OF FIBER ENDS AND IMAGE ANALYSIS TOOL FOR DETECTING CONTAMINATION

CROSS-REFERENCE TO RELATED APPLICATION(S)

This application claims benefit to U.S. Provisional Patent Application No. 63/300,848, filed Jan. 19, 2022, the entirety of which is incorporated by reference herein.

FIELD OF TECHNOLOGY

The present invention relates to the field of optical network interconnection and optical assemblies and, more specifically, to apparatus and methods to inspect optical fiber connector end face while optimizing network installation.

BACKGROUND

Fiber optic links are extremely sensitive to dust, oil, and other contaminants on the mating connector face. In the case of single-mode fiber (SMF) links, contaminated connectors can reduce return loss (increase reflection), increase relative intensity noise, multipath interference, and insertion loss. Moreover, a single particle placed in the fiber core can completely block the optical signal from passing between two connectors.

Due to its larger core size, multimode fiber (MMF) links are less affected by contaminated connectors. Therefore, it is less likely that optical contamination can completely block light from a connector. However, the connector contamination can still significantly impact the channel performance due to increased attenuation, modal power distribution, and modal noise.

As the demand for higher data rates continues to grow, both optical channels SMF and MMF, are exposed to higher transmission penalties and therefore becoming more sensitive to contamination in the connector end faces. An essential issue with contaminated connectors is that they can permanently damage their connector end face and contaminate or damage the mated connector.

It is desirable to verify that the connector end face is cleaned before connection during the network installation. The degree of cleanliness may be determined using a fiber inspection tool, which typically consists of an illuminator, a lens, an image sensor, a focus system, and a display to image the connector's end face.

There are several apparatuses for visual inspection of fiber connectors, where the connectors to be inspected include several types of single, duplex, or parallel optical connectors such as LC, SC, FC, CS, SN, MTP/MPO. Among them, MTP/MPO connectors have the most fiber count and the largest end face. Hence it is more challenging and time-consuming to inspect them. For example, FIG. 1A shows a perspective view of a front portion of a cable assembly that includes a 12-fiber MPO connector. FIG. 1B shows a front-side view of an end face to the 12-fiber MPO connector that includes 12 fiber ends and 2 alignment pins/pinholes on opposite ends of the connector's end face.

To obtain a good image quality on fiber, an inspection apparatus should work at high magnification, which usually corresponds to a limited field of view that can only see one fiber or a couple of fibers. To inspect all 12 fibers, a mechanical moving system may be used to shift the microscope's field of view. For example, a manual shifting mechanism may be used to change the field of view of the inspection apparatus so that its field of view can see 4 fibers simultaneously in a single image, which requires shifting through at least 3 positions to view/inspect all 12 fibers. Therefore, the manual shifting system makes the inspection process very slow and tedious.

A moving scanning system is also prone to making errors in the position and order of the fibers, which can result in some fibers not being captured during the inspection. For example, a device that continuously moves the microscope by changing the angle of pivot of the microscope is known. Such a system automatically controls the moving but still takes time to inspect all 12 fibers. Moreover, the change of the angle of the microscope makes the illumination condition not repeatable for all 12 fibers at once. Hence the image quality may not be consistent for images on each of the 12 fibers.

Moreover, for mechanical scanning solutions the range of mechanical scanning is limited to the fibers in the connector, and thus the contamination present in areas outside the fiber regions cannot be detected. This is problematic because it has been demonstrated that contamination may accumulate outside the fiber region (e.g., near the alignment pins or pin holes of MPO connectors), which then tends to migrate over time towards the fibers when mechanical vibrations are introduced such as the ones present during transportation of the fiber optic cables from manufacturing facilities or warehouses to the customer locations. So identifying contaminates that reside even outside the fiber region of a connector is desirable to more accurately assess and anticipate contaminates on the connector end face that may eventually affect performance of the connector.

BRIEF DESCRIPTION OF THE FIGURES

FIG. 6A illustrates a light beam being transmitted through a portion of the exemplary visual inspection module shown in FIG. 2 that includes a diffuser, a convex lens, and a connector end face.

FIG. 6B illustrates a light beam being transmitted through a portion of the exemplary visual inspection module shown in FIG. 2 that includes a diffuser, a convex lens, and a connector end face.

FIG. 6C illustrates a light beam being transmitted through a portion of the exemplary visual inspection module shown in FIG. 2 that includes a diffuser, a convex lens, and a connector end face.

FIG. 6D illustrates a light beam being transmitted through a portion of the exemplary visual inspection module shown in FIG. 2 that includes a diffuser, a convex lens, and a connector end face.

FIG. 22A illustrates an exemplary image showing a full field of view image captured for a connector end face.

FIG. 22B illustrates an exemplary image showing an image captured for a connector end face that focuses on pins included on the connector end face.

FIG. 22C illustrates an exemplary image showing a single fiber included on a connector end face and contaminates that are present on the fiber.

FIG. 26A illustrates an exemplary report generated by the visual inspection application, according to an embodiment of the present disclosure.

DETAILED DESCRIPTION

Figure 1B:
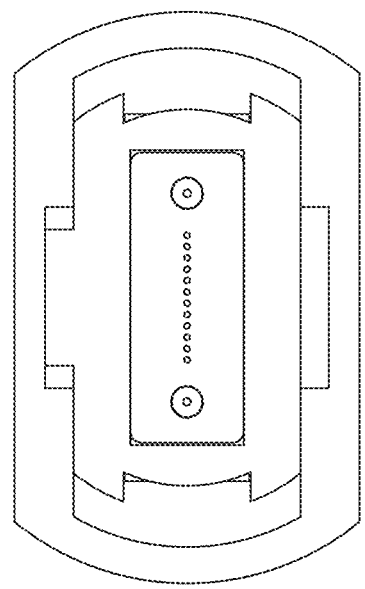
FIG. 1B illustrates a front-side view of a 12-fiber MPO connector.
Figure 1A:
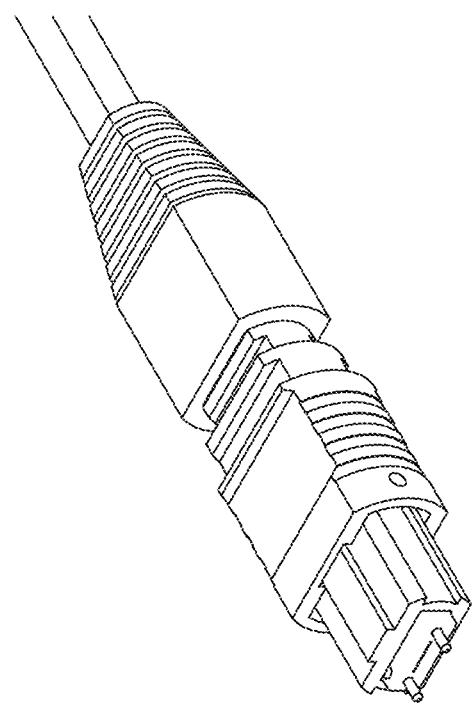
FIG. 1A illustrates a perspective view of a front portion to an exemplary cable assembly that includes a 12-fiber MPO connector.

Therefore, there is a need for an inspection microscope that can see all the 12 fibers (or whatever number of corresponding plurality of fibers within a connector under inspection) and the two pins/pinholes of the connector in a single picture so that the entire connector end face can be inspected consistently and in a short amount of time. To see the 12 fibers and 2 pins/pinholes without degrading image quality, an apparatus and method are disclosed that increase the field of view of the inspection apparatus, including increasing the illuminated area. The disclosed apparatus also increases the size and resolution of the camera sensor.

Disclosed herein is an apparatus and method for fast inspection of optical connectors. The apparatus may include a fiber inspection microscope system including a visual inspection module configured to inspect optical interconnects or patch cord connector end faces. In addition, according to some embodiments the microscope system may inspect and clean patch panels or cassettes adapters.

The visual inspection module disclosed herein provides a vast field of view (FOV) to verify the cleanliness and to ensure that the optical connectors will arrive clean to the customer sites. Ideally, an apparatus that can capture the complete image of the connector end face in a single image capture may help evaluate a large FOV in a relatively short time. Furthermore, the visual inspection module disclosed herein provides the benefits of the larger FOV, while also addressing the known adverse constraints resulting from the increased FOV that would otherwise degrade image quality. For example, increasing the FOV is known to lower the resolution of the captured image. Moreover, the larger the FOV, the more aberrations may be introduced into the captured image, e.g., focus and curvature issues, which may prevent achieving an optimum image focus for all the fibers in the connector end face. Also, the larger the FOV, the more challenging it is to produce a uniform illumination for all the fibers. However, the visual inspection module disclosed herein is configured to achieve the larger FOV while addresses these issues. The visual inspection module disclosed herein is able to achieve these desirable features without relying on mechanical movements or requiring multiple images to capture the connector end face, as described in more detail herein.

The microscope system may include a portable form factor visual inspection system. The visual inspection system may include controllers, displays (LCD, LEDs, or others), processors, and/or communication devices for implementing the features described herein. The microscope system may communicate with external devices using a USB cable. The microscope system may also communicate with external devices using wireless signals. An algorithm from a CPU inside the apparatus or from a remote controller (laptop, desktop, or mobile device) processes the image and identifies the degree of contamination.

It also compares the measured contamination with limits defined by industry standards, e.g., IEC 61300-3-35 (Basic Test and Measurement Procedures Standard for Fiber Optic Interconnecting Devices and Passive Components). In addition, the microscope system may be configured to provide a pass/fail signal following the inspection analysis based on whether contaminants were detected. A fail condition may trigger additional alerts to clean the connectors. The microscope system may be applied to several types of single, duplex, or parallel optical connectors such as LC, SC, CS, SN, or MTP/MPO connectors, where a corresponding connector adapter (e.g., adapter tip) may be provided for each of the different connector types to enable the connector to mate with the microscope system for inspection.

Figure 2:
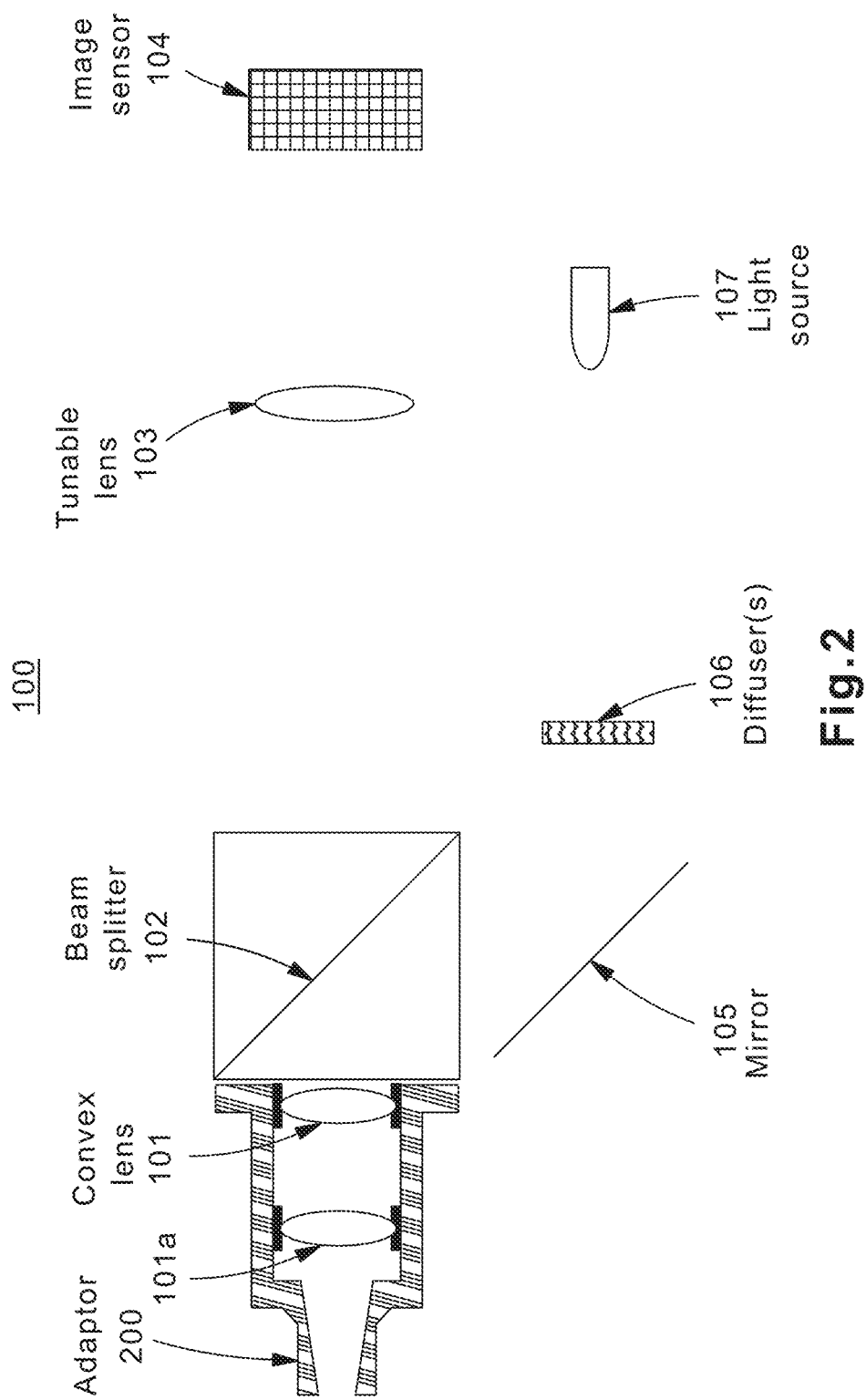
FIG. 2 illustrates an exemplary visual inspection module and connector adapter included with a microscope system, according to an embodiment of the present disclosure.

FIG. 2 shows an exemplary visual inspection module 100 and a connector adapter 200 that may be included in the microscope system described herein. The visual inspection module 100 includes the components to implement the inspection features described herein. The visual inspection module 100 includes at least one image sensor 104 configured to capture a connector end face image at desired wavelengths of interest, e.g., blue spectral region, UV spectral region, or near infra-red spectral (NIR) region. A light source 107 configured to emit at the desired wavelength of interest, e.g., blue LED, or laser is used to illuminate the end face of the connector. The light emitted from the light source 107 is partially transmitted by a partial mirror or beam splitter 102 towards a convex lens 101 that is also included at a mating interface of the visual inspection module 100 and a connector adapter 200 for holding the connector. A mirror 105 reflects the light toward the beam splitter 102, thus allowing the overall microscope system to be more compact. A diffuser 106, which may be representative of a diffuser set including one or more diffusers, may be deployed in front of the light source 107 to assist in creating a more uniform light illumination once passing through the diffuser 106.

The convex lens 101 is used to transmit light from the light source 107 to the end face of the connector under test that is being held within the connector adapter 200. The convex lens 101 is also used to transmit the light reflected from the end face of the connector to the image sensor 104. The convex lens 101 is designed to provide a predetermined optical magnification according to a desirable amount to detect debris and contamination on the connector's end face, e.g., equivalent magnification to an optical microscope, 100×, 200×, or 400×.

The connector adapter 200 is representative of different adapter types that are interchangeable into the microscope system to enable the visual inspection module 100 to inspect various types of fiber optic connectors. For example, the adaptor 200 is uniquely configured for different connector types to position the connector end face at a specified position to achieve a predetermined distance with respect to the optical components of the visual inspection module 100 so that a focused image of the fibers and/or pins on the connector end face can be formed at the image sensor 104. As shown in FIG. 2, and applicable to the other embodiments of the visual inspection module disclosed herein, the connector adapter 200 may further include its own lens 101a for providing a predetermined amount of magnification to achieve a focused image over the fibers and/or pins on the connector's end face when used in combination with the visual inspection module 100. According to some embodiments, the inclusion of the magnifying lens 101a in the connector adapter may be removed.

Figure 3C:
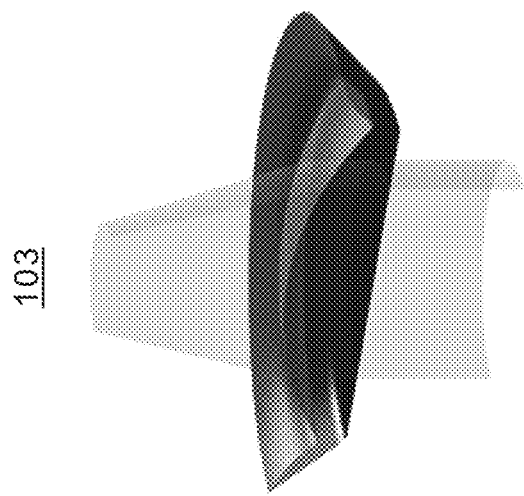
FIG. 3C illustrates the exemplary tunable lens configured in a convex shape, according to an embodiment of the present disclosure.
Figure 3B:
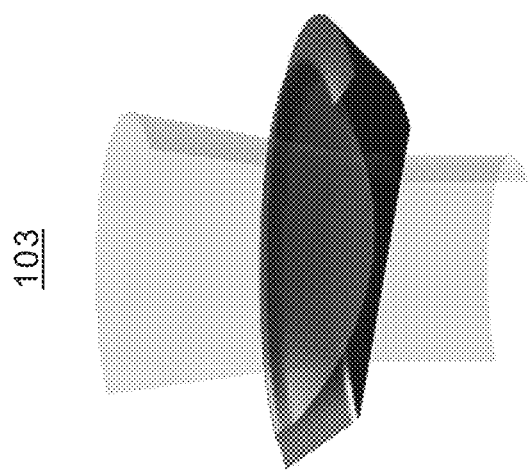
FIG. 3B illustrates the exemplary tunable lens configured in a concave shape, according to an embodiment of the present disclosure.
Figure 3A:
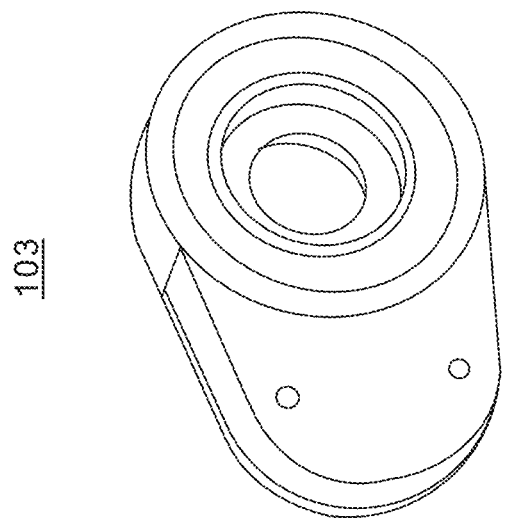
FIG. 3A illustrates a perspective view of an exemplary tunable lens, according to an embodiment of the present disclosure.

The visual inspection module 100 also includes a tunable lens 103 whose focal length is adjustable. The tunable lens 103 is placed before the image sensor 104 to ensure the best focused image is formed on the image sensor. FIG. 3A shows a perspective view of an exemplary tunable lens, which may be representative of the tunable lens 103 included in the visual inspection module 100 according to some exemplary embodiments. The working principle of the tunable lens 103 is based on lens technology of shape-changing polymer lenses. The core that forms the lens in the tunable lens 103 contains an optical fluid, which is sealed off with an elastic polymer membrane as shown in. An electromagnetic actuator is used to exert pressure on the container and therefore changes the curvature of the tunable lens 103 to range from a concave shape (see FIG. 3B) to a convex shape (see FIG. 3C). By changing the electrical current flowing through the coil of the actuator, the optical power of the tunable lens 103 may be controlled. To adjust the focus of the image, the tunable lens 103 should be away from the image sensor 104. As an extreme, if the tunable lens 103 is too close (e.g., substantially adjacent) to the image sensor 104, it may not be able to adjust the focus effectively. However, because the quality of the tunable lens 103 is known to be generally lower than a standard glass lens, the tunable lens 103 is positioned as close to the image sensor 104 as possible while still obtaining a good image quality. As a trade-off, the distance between the tunable lens 103 and the image sensor 104 is configured to be between 5% to 30% of the distance between the convex lens 101 and the image sensor 104.

Figure 4B:
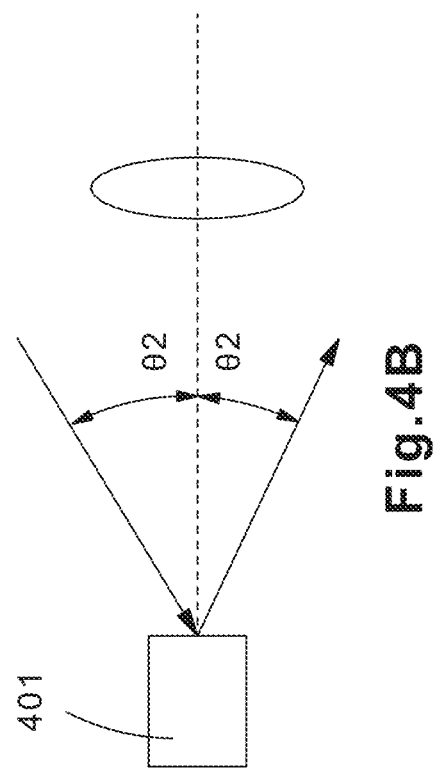
FIG. 4B illustrates a side view of an exemplary incident light reflecting at a second angle off a surface of a fiber end face included in a connector.
Figure 4A:
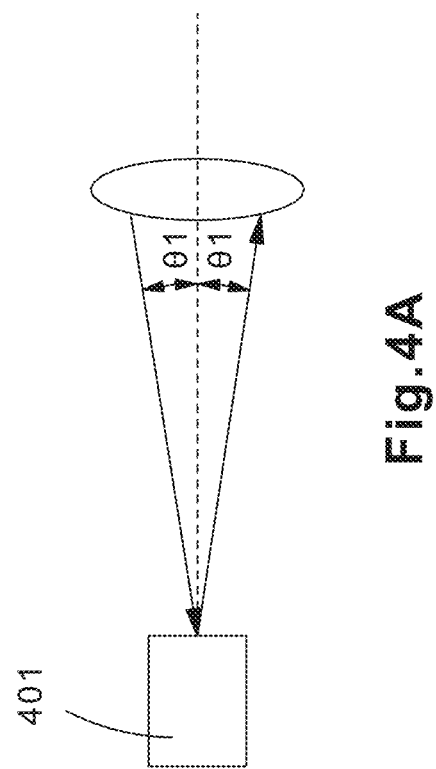
FIG. 4A illustrates a side view of an exemplary incident light reflecting at a first angle off a surface of a fiber end face included in a connector.

The end faces of the 12 fibers included in the connector are precisely polished glass surfaces. They are just like the surface of a glass plate, obeying the law of reflection to any incident light upon them. FIG. 4A shows a first exemplary incident light being close to perpendicular incidence to the connector end face 401, where the incident light is reflected to the convex lens 101 and forms an image on the image sensor 104. However, FIG. 4B shows a second exemplary incident light coming onto the connector end face 401 at a large enough angle such that the incident light is not reflected to the convex lens 101, and thus it does not ever reach the image sensor 104 to form an image. Instead, such incident light that reflects off the connector end face without making it back to the image sensor 104 merely becomes stray light and noise to the image being captured on the image sensor 104.

The end face of an exemplary fiber connector (e.g., MPO connector) may have a rectangular shape. The typical light source and optical elements such as lenses and diffusers all typically have circular shaped symmetry, which translates to the light falling on the connector end face also having a circular shape. So when using such illumination systems that include the typical lens and diffusers having the circular symmetry to try and image the end face of the non-circular connector end face, a lot of light may be wasted (i.e., not energy efficient). This is shown by the exemplary incident light 402 having the circular shape against an MPO type connector end face 401 having the rectangular shape in FIG. 5A, where much of the incident light 402 is left to shine on portions outside the connector outline. Moreover, the wasted light that is not being utilized to capture the image of the connector end face on the image sensor 104 may run into other portions of the inner wall of the connector adaptor 200 and scatter indiscriminately to become stray light and image noise, thus further reducing the image contrast and overall quality. Even when a partial amount of the stray light causes an incident light to be reflected onto the connector end face 401, they may still not be reflected back through the convex lens 101 and back to the image sensor 104, and thus ultimately keep behaving as stray light and noise.

Figures 5A, 5B:
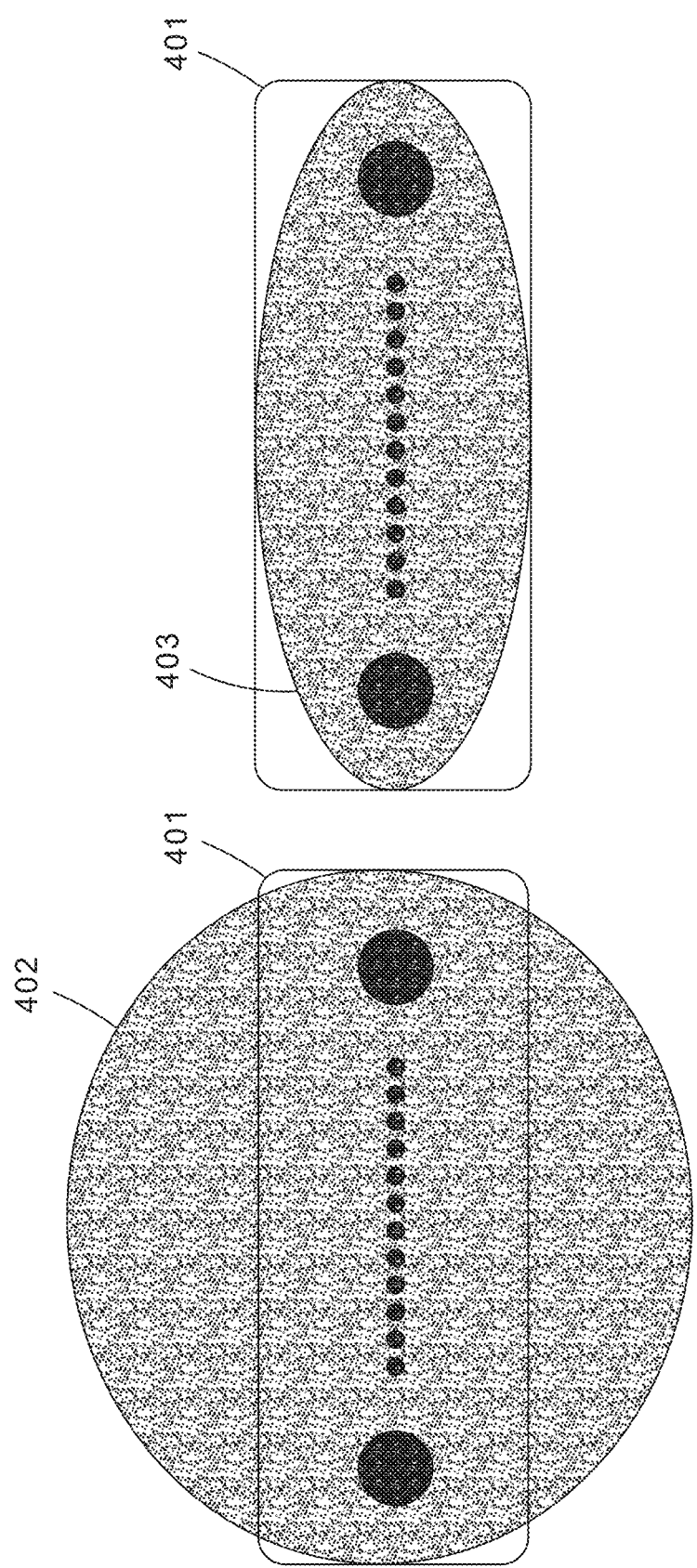
FIG. 5A illustrates an exemplary incident light having a circular shape upon an exemplary connector end face having a rectangular shape.
FIG. 5B illustrates an exemplary incident light having an elliptical shape upon an exemplary connector end face having a rectangular shape.

Thus to provide an effective illumination system, the visual inspection module 100 of the present disclosure is configured to direct light to the important features of the connector end face, while also avoiding the light from being directed to unnecessary areas that may cause the light to become background noise. So FIG. 5B shows an incident light 403 that may be produced from a microscope system of the present disclosure that produces an illumination pattern having an elliptical shaped incident light that efficiently illuminates upon the portions of the MPO connector end face 401 that are of concern. As shown by the pattern of the incident light 403 in FIG. 5B, the components of the present microscope system are configured to create an incident light having the unique elliptical shape such that little, if any, of the incident light 403 illuminates off the MPO connector end face 401. So when the illumination pattern of the incident light focused onto the connector end face 401 is an elliptical shape, improved energy-efficiency and higher contrast to the image may be achieved by the present microscope system. Although the connector end face 401 is described to be an MPO connector, other connector types having different shaped end faces are also within the scope of this disclosure. For different connector types having different shapes to their end faces, the microscope system of the present disclosure may be configured to produce an incident light having an illumination pattern that efficiently covers the end face while producing little, if any, incident light that falls off the surface shape of the connector end face.

FIGS. 6A-6D show representations of an elliptical shaped beam pattern (e.g., spot beam pattern 111) on the diffuser 106 and an elliptical shaped beam spot pattern (e.g., spot beam pattern 112) on the connector end face 401 (e.g., an MPO connector end face) resulting from light propagating through the visual inspection module 100 and being incident on the connector end face 401 and the diffuser 106 at different angles as the incident light travels through the convex lens 101. In particular, FIG. 6A shows light emitted from the light source 107 as it travels through the diffuser 106 and passes through the convex lens 101, after which the light gets focused on the connector end face 401, where the incident light on the connector end face 401 is formed into the beam spot 112 having the elliptical shape. FIG. 6B shows the light from the center of the regular diffuser 106 passing the convex lens 101 and getting focused at the center of the connector end face 401.

Here the numerical aperture (NA) of the convex lens 101 may be calculated as:

NA=sin θ≈θ

The divergent angle of the light falling on the center of the connector end face 401 is 2θ. Hence, the resulting divergent angle is:

Divergent angle≈2 NA

FIG. 6C shows the light coming in at different incident angles from the regular diffuser 106 and passing through the convex lens 101 and getting focused at the center of the connector end face 401. Usually, the uneven surface pattern of the diffuser 106 causes the focused light illuminated onto the connector end face 401 to be nonuniform. In practice, the image of the diffuser 106 should focus on a plane that is slightly positioned off the actual plane of the connector end face 401, as shown in FIG. 6D (e.g., the image of the diffuser 106 is focused slightly behind the physical plane of connector end face 401).

Figure 7:
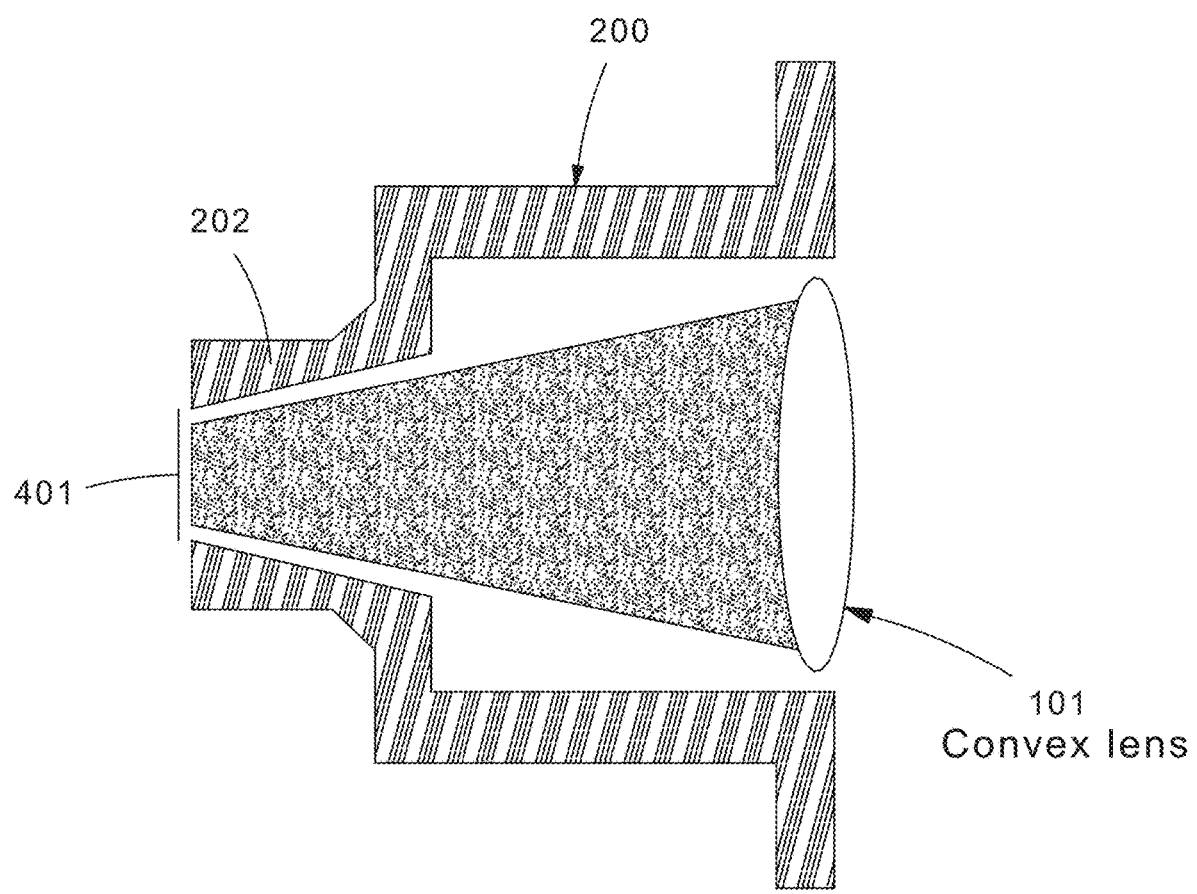
FIG. 7 illustrates a portion of the adapter shown in FIG. 2 that includes a tapered inner portion.

Since the light beam is a cone or a tapered shape after passing the convex lens 101, the adapter 200 includes a tapered inner portion 202 with a shape that matches this cone-like shape of the incident light. The tapered inner portion 202 enables the efficient transmission of the light to the connector end face 401 at the far end of the adapter 200, as shown by the close-up view of the adapter 200 in FIG. 7. Further, FIG. 7 shows the tapered inner portion 202 is configured to match the cone shape of the light beam being transmitted to the connector end face 401 that is positioned at the far end of the adapter 200, so that more of the light beam reaches the connector end fact 401 without hitting an inner surface of the adapter 200. As shown in FIG. 7, the shape of the tapered inner portion 202 reduces an amount of stray light that would otherwise result from light bouncing off the inner surface of the adapter 200. Such light that does not directly reach the connector end face 401 would otherwise add to the image noise of the connector end face 401 produced at the image sensor 104. Thus, the resulting image of the connector end face 401 that is formed at the image sensor 104 will have a better contrast based at least in part on the shape of the tapered inner portion 202.

Figure 8B:
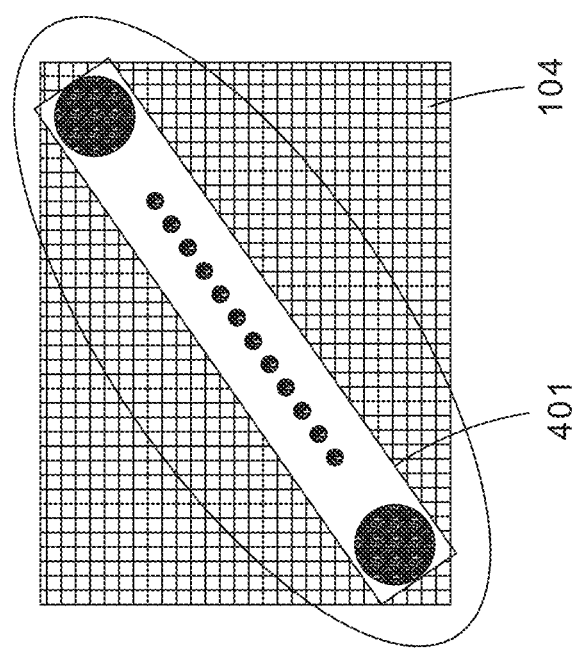
FIG. 8B illustrates a second exemplary orientation of a connector end face with respect to an image sensor, according to an embodiment of the present disclosure.
Figure 8A:
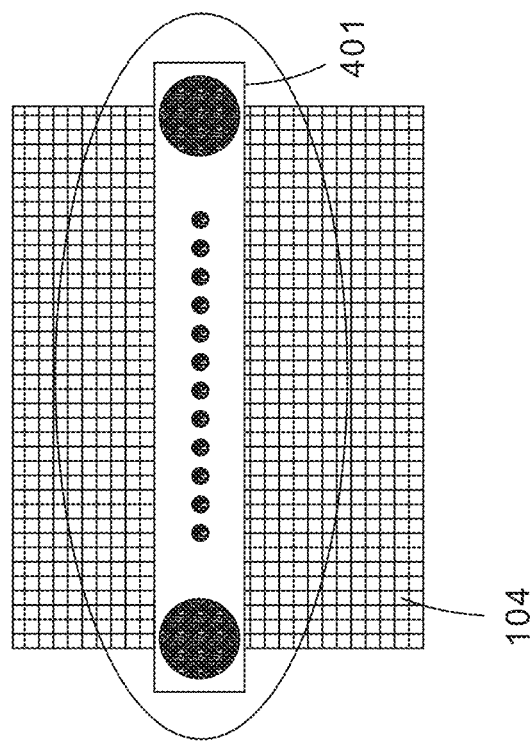
FIG. 8A illustrates a first exemplary orientation of a connector end face with respect to an image sensor, according to an embodiment.

FIGS. 8A and 8B shows an exemplary orientation of the connector end face 401 superimposed onto the image sensor 104. FIG. 8A shows an embodiment where a long side of the connector end face 401 is oriented parallel to a long side of the image sensor 104, and FIG. 8B shows an embodiment where the long side of the connector end face 401 is oriented diagonal to the long side of the image sensor 104. In the diagonal orientation shown in FIG. 8B, the image sensor is able to capture more useful information of the connector end face 401, such as the two pins or pinholes at the far ends of the connector end face 401, which is more preferable.

While other solutions resort to using two cameras in an attempt to widen the viewing area to capture more of a connector end face, these solutions require more equipment such as the additional image sensor and a beam splitter positioned before the image sensors. Adding a beam splitter may add multiple reflections in the light path and degrade the image quality, especially the image contrast. It follows that the present solution that includes just the single image sensor 104, achieves a more effective/efficient solution to produce the wider viewing area for capturing the connector end face 401 without the need to add larger devices, by utilizing the existing components and features described within the visual inspection module 100.

Figure 9:
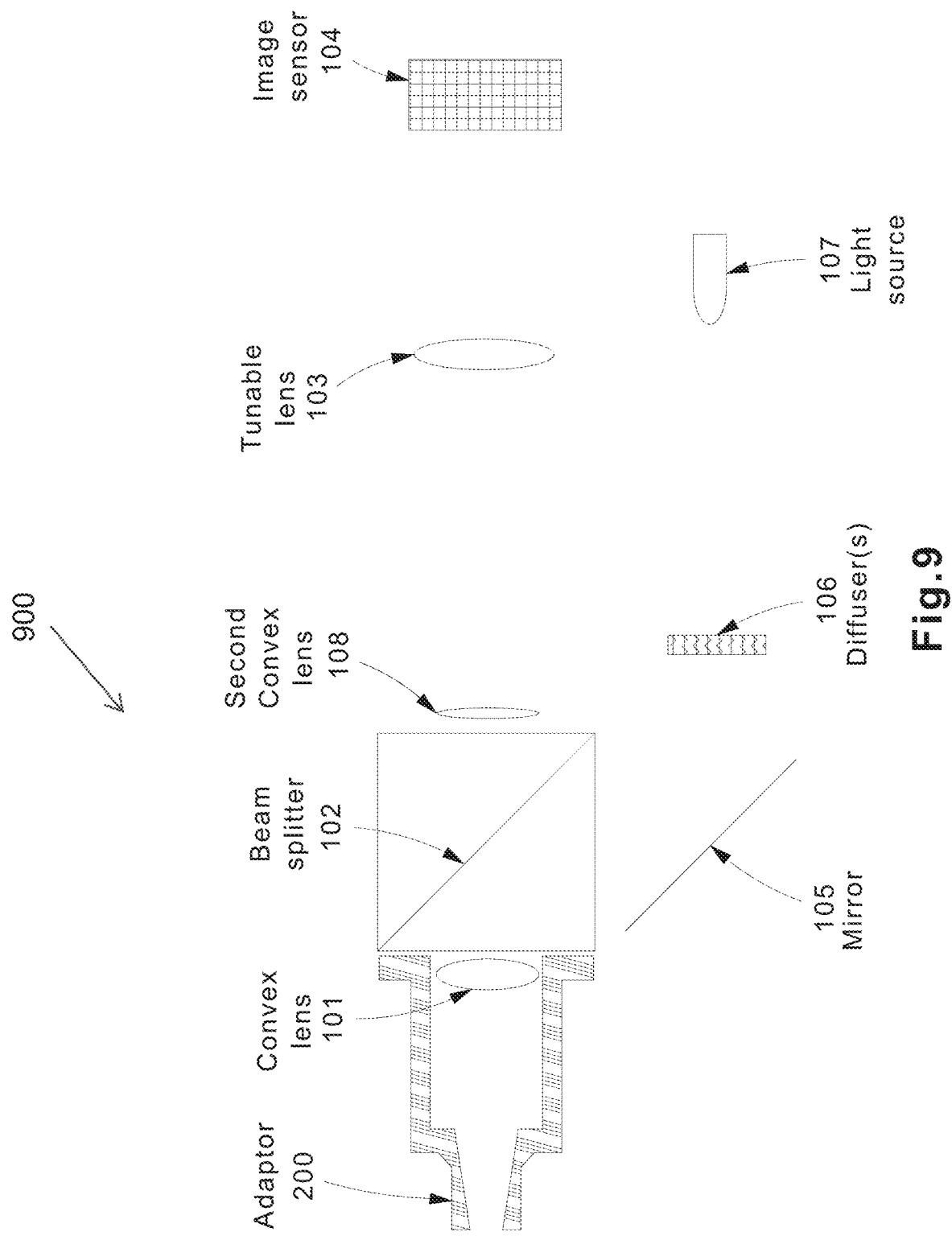
FIG. 9 illustrates an exemplary visual inspection module and connector adapter included with a microscope system, according to an alternative embodiment of the present disclosure.

FIG. 9 shows an exemplary visual inspection module 900 that includes a different combination of components from the visual inspection module 100 described earlier, while still using the same connector adapter 200, according to an alternative embodiment. The visual inspection module 900 may also be included in the microscope system described herein. The visual inspection module 900 includes some of the same components from the visual inspection module 100, and additionally includes a second convex lens 108 placed between the first convex lens 101 and the image sensor 104, and more specifically placed between the beam splitter 102 and the tunable lens 103. The image sharpness and contrast are improved by including the second convex lens 108 where it is positioned within the visual inspection module 900.

Figure 10:
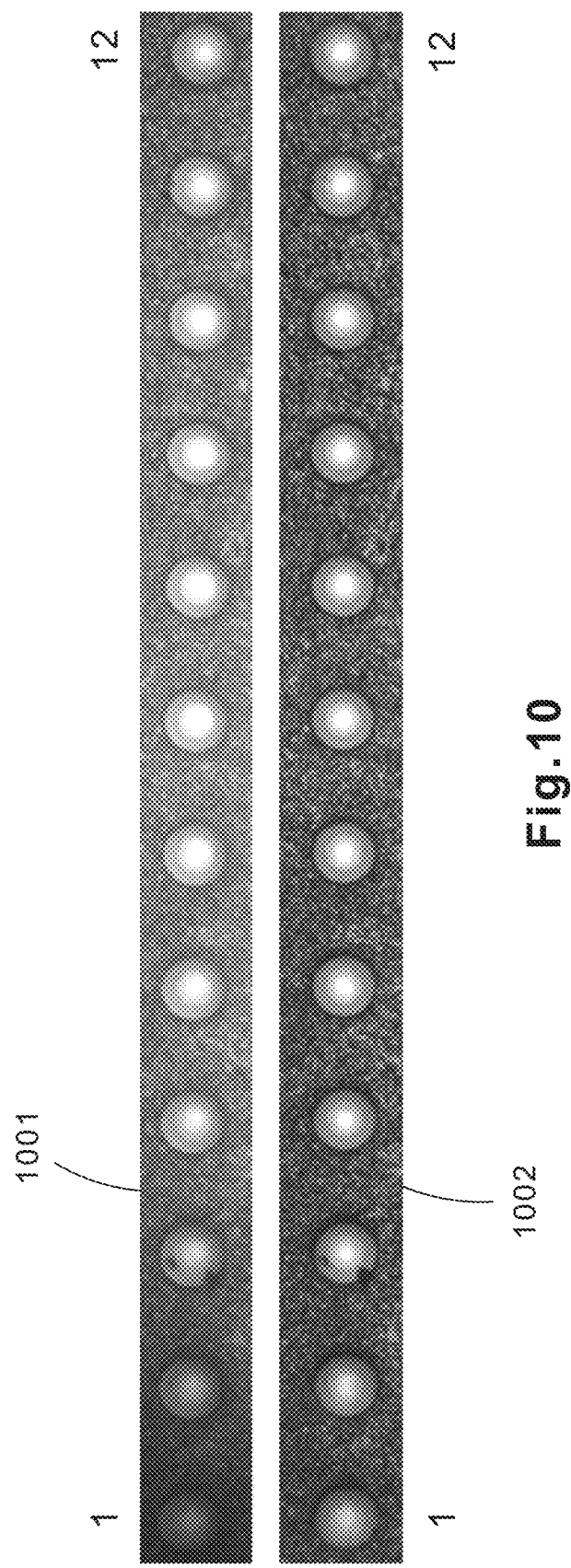
FIG. 10 illustrates an exemplary first image captured by an image sensor included in the visual inspection module from FIG. 2, and also illustrates an exemplary second image captured by an image sensor included in the visual inspection module from FIG. 9.

FIG. 10 shows an exemplary first image 1001 of the fiber ends from the connector end face 401 where the visual inspection module 100 does not include the second convex lens 108, and FIG. 10 shows an exemplary second image 1002 where the visual inspection module 900 includes the second convex lens 108. The comparison of the first image 1001 and the second image 1002 shows the image quality, including image contrast, resolution, and illumination uniformity, improves in the second image 1002 where the visual inspection module 900 includes the second convex lens 108.

Figure 11A:
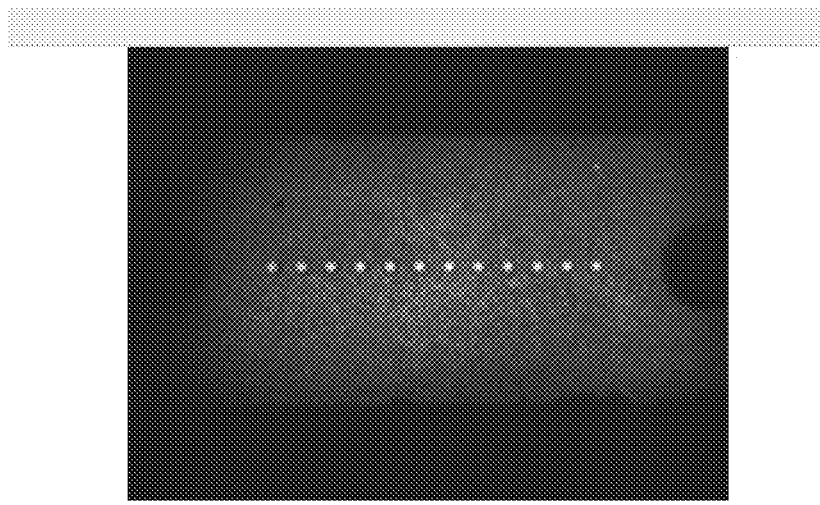
FIG. 11A illustrates an exemplary image captured by a microscope system including the visual inspection module shown in FIG. 9, where a connector end face is oriented according to a first orientation with respect to an image sensor.
Figure 11B:
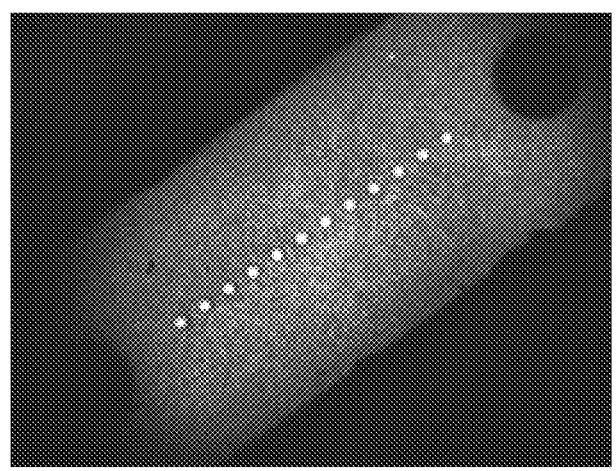
FIG. 11B illustrates an exemplary image captured by a microscope system including the visual inspection module shown in FIG. 9, where a connector end face is oriented according to a second orientation with respect to an image sensor.
Figure 11C:
FIG. 11C illustrates an exemplary image captured by a commercial fiber inspection microscope system, where the captured image does not include all features of a connector end face being captured.
Figure 11D:
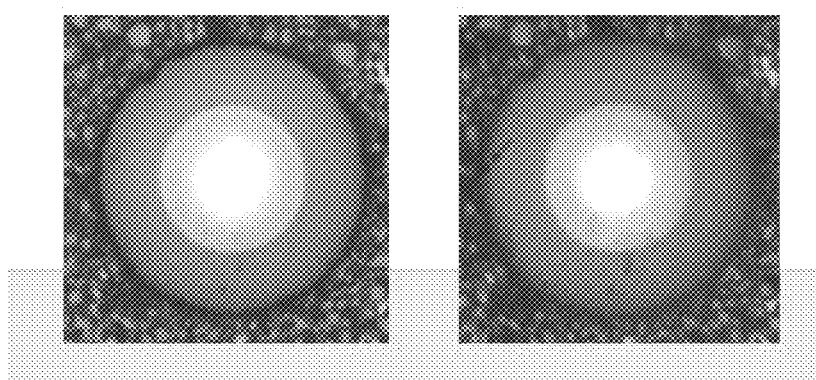
FIG. 11D illustrates a comparison of an image captured by the commercial fiber inspection microscope system and an image captured by the microscope system including the visual inspection module shown in FIG. 9, where the image captured by the microscope system including the visual inspection module shown in FIG. 9 is shown to have a higher quality.

FIG. 11A shows an exemplary image taken using a microscope system that incudes the visual inspection module 900, where the 12 fibers included in the connector end face 401 are aligned in the horizontal direction (e.g., long side of the connector end face 401 is oriented parallel relative to a long side of the image sensor 104). FIG. 11B shows an exemplary image taken using a microscope system including the visual inspection module 900, where the 12 fibers included in the connector end face 401 are aligned in are aligned in the diagonal direction (e.g., long side of the connector end face 401 is oriented diagonal relative to the long side of the image sensor 104). FIG. 11C shows an exemplary image captured using a typical commercial fiber inspection microscope system that does not include the more efficient/effective features of the visual inspection module 900, where the field of view provided by such typical microscopes do not enable the entire end face of the connector to be captured in a single image. FIG. 11D shows a comparison of a first image captured by the typical commercial microscope system (left) and the microscope system including the visual inspection module 900 shown in FIG. 9 (right), where the image from the microscope system including the visual inspection module 900 is shown to have a higher quality. From analyzing these exemplary images shown in FIGS. 11A-11D, the microscope system including the visual inspection module from FIG. 9 is shown to offer a much larger field of view and provide better image contrast, which allows it to see defects that other commercial microscope are not able to detect/see.

Field curvature is a common optical problem that causes a flat object to appear sharp only in a particular part(s) of the frame instead of being uniformly sharp across the frame. This happens due to the curved nature of optical elements, which project the image in a curved manner rather than flat. Since all digital image sensors are flat, they cannot capture the entire image in perfect focus. Field curvature can be reduced by adding a lens with a focal length close to the existing lens in the system but having an opposite curvature sign.

Figure 12:
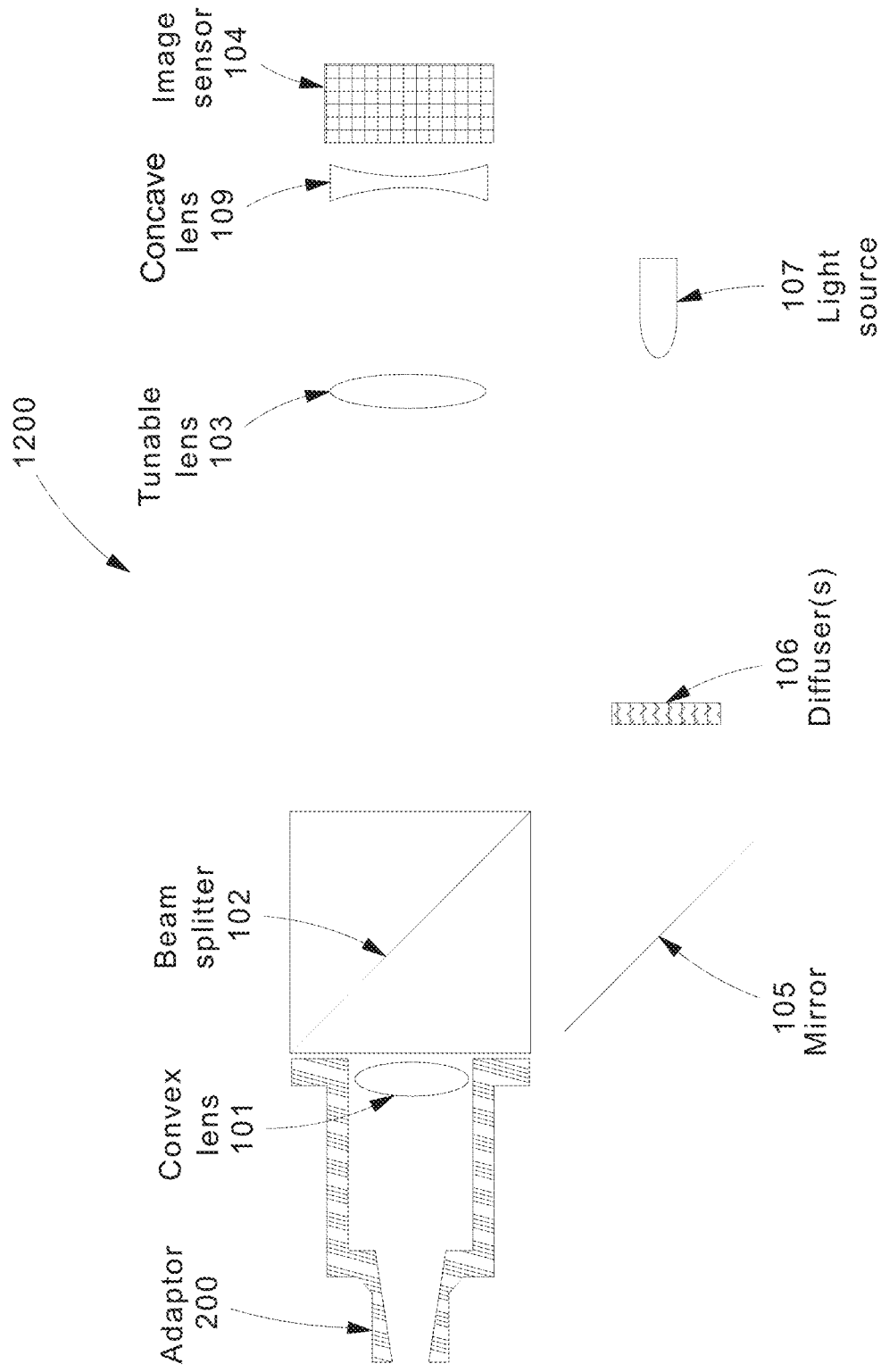
FIG. 12 illustrates an exemplary visual inspection module and connector adapter included with a microscope system, according to an alternative embodiment of the present disclosure.

FIG. 12 shows an exemplary visual inspection module 1200 that includes a different combination of components from the visual inspection module 100 described earlier, while still using the same connector adapter 200, according to an alternative embodiment. The visual inspection module 1200 may also be included in the microscope system described herein. The visual inspection module 1200 includes some of the same components from the visual inspection module 100, and additionally includes a concave lens 109 placed between the tunable lens 103 and the image sensor 104, and more specifically placed closer to the front of the image sensor 104. The concave lens 109 preferably has a focal length close to, or the same, as a focal length of the convex lens 101. In this way, the overall focal length of the visual inspection module 1200 is changed little, if at all, as the light propagates between the connector end face 401 attached to the adapter 200 and the image sensor 104. The inclusion of the concave lens 109 also has the desired benefit of the field curvature being dramatically reduced.

Figure 13:
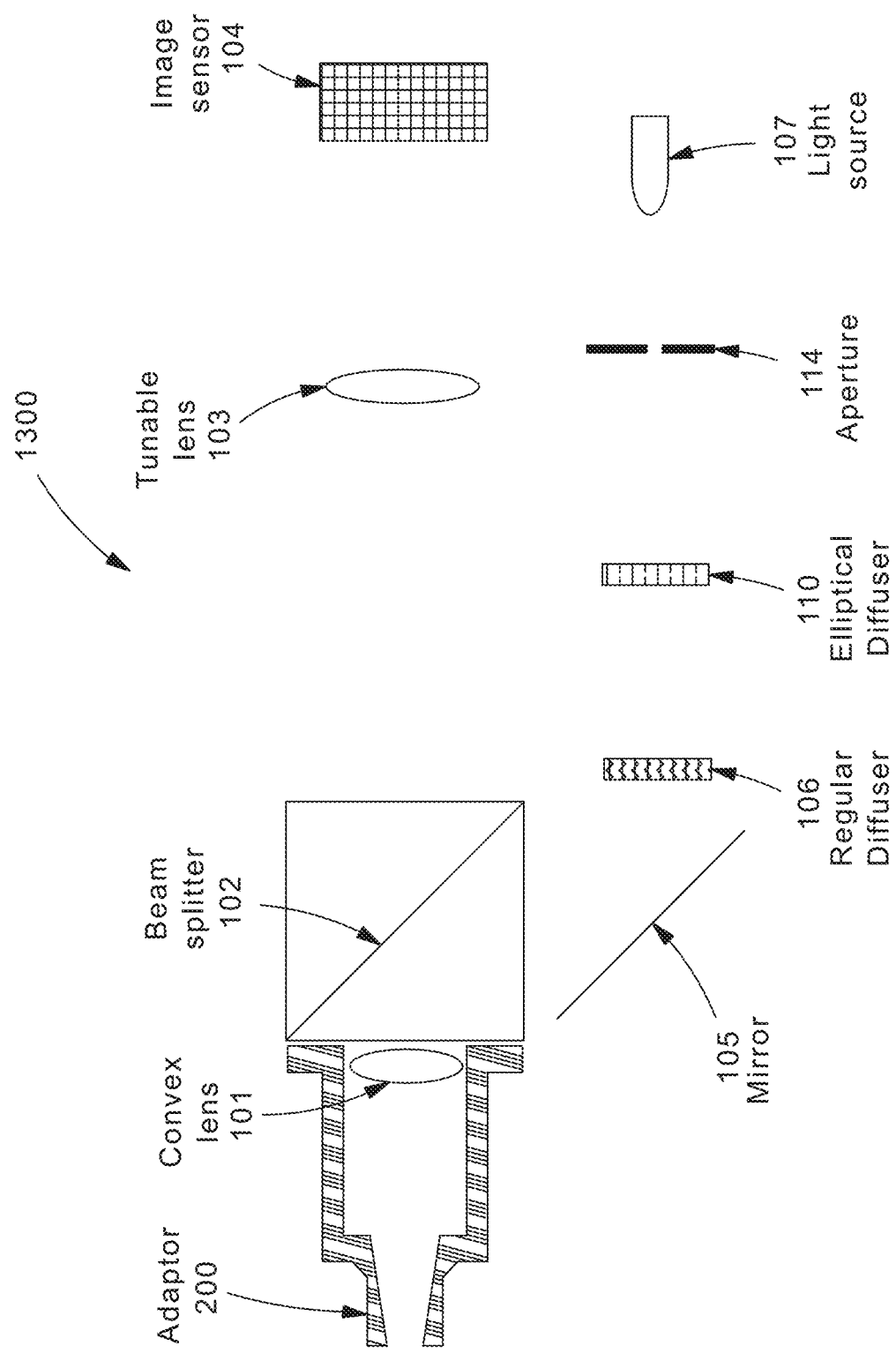
FIG. 13 illustrates an exemplary visual inspection module and connector adapter included with a microscope system, according to an alternative embodiment of the present disclosure.

FIG. 13 shows an exemplary visual inspection module 1300 that includes a different combination of components from the visual inspection module 100 described earlier, while still using the same connector adapter 200, according to an alternative embodiment. The visual inspection module 1300 may also be included in the microscope system described herein. The visual inspection module 1300 includes some of the same components from the visual inspection module 100, and additionally includes an elliptical diffuser 110 and an aperture 114 that are positioned between the light source 107 and the diffuser 106 along a light path of a light emitted from the light source 107. Light emitted from the light source 107 travels through the aperture 114, then becomes incident on the elliptical diffuser 110 before reaching the diffuser 106 (e.g., non-elliptical diffuser).

Figure 14:
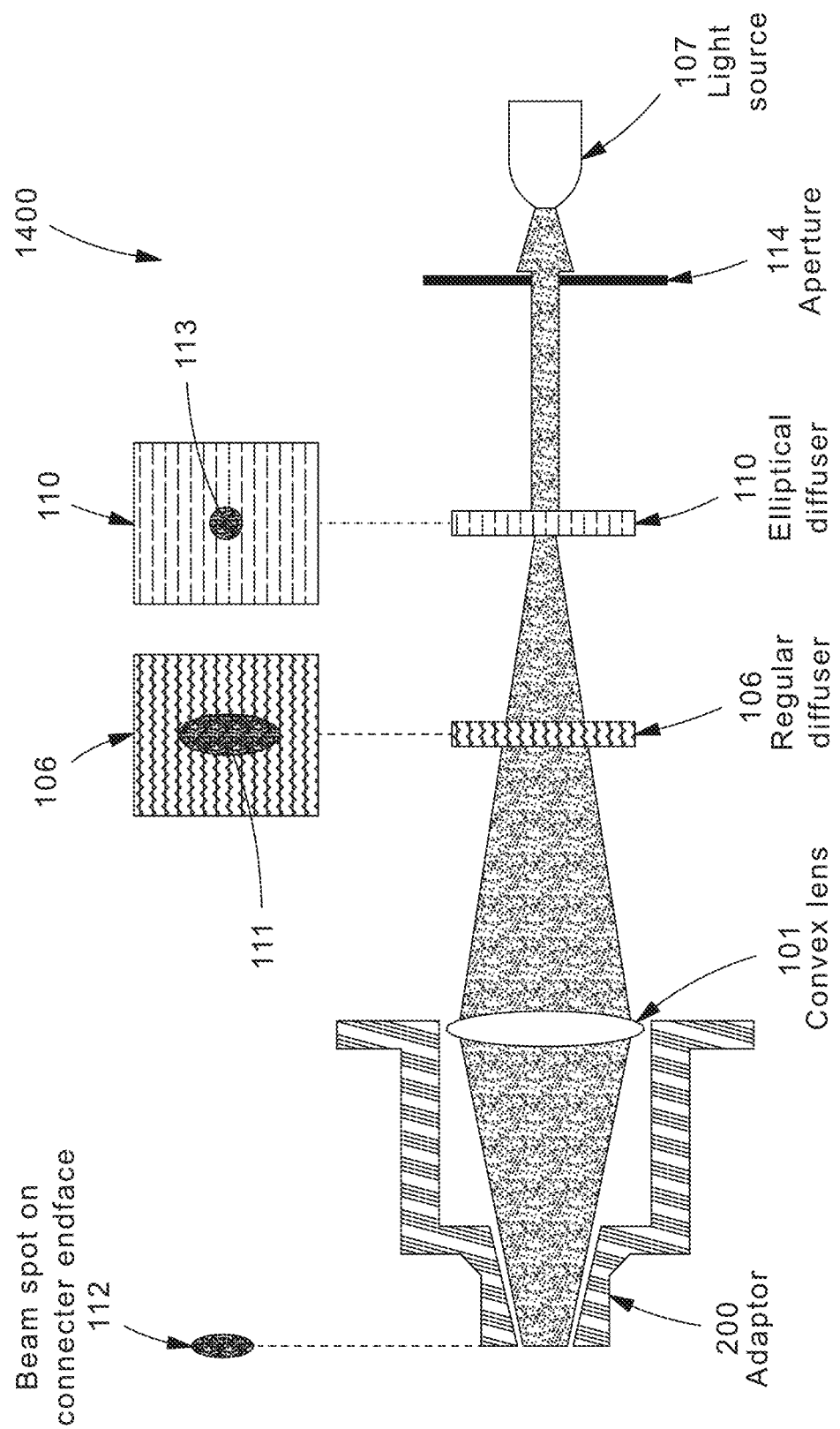
FIG. 14 illustrates a system diagram representing an exemplary light path taken by light propagating within the visual inspection module shown in FIG. 13.

FIG. 14 shows an exemplary system diagram 1400 that is representative of the light path taken by light emitted from the light source 107 in the visual inspection module 1300 including the elliptical diffuser 110. The system diagram 1400 may include some, but not necessarily all, the components included in the visual inspection module 1300 for exemplary purposes. When the light is incident on the elliptical diffuser 110, it forms a circular spot-shaped beam pattern 113 on the elliptical diffuser 110. After passing through the elliptical diffuser 110, the light creates an elliptical shaped beam pattern 111 on the regular diffuser 106, and eventually forms the elliptical shaped beam pattern 112 on the connector end face 401 residing in the adapter 200. As discussed earlier, the adaptor 200 includes a tapered inner portion 202 to allow the light to pass through the adapter 200 without hitting an inner surface of the adaptor 200 to avoid stray light within the adapter 200, and thus producing better image contrast.

Figure 15A:
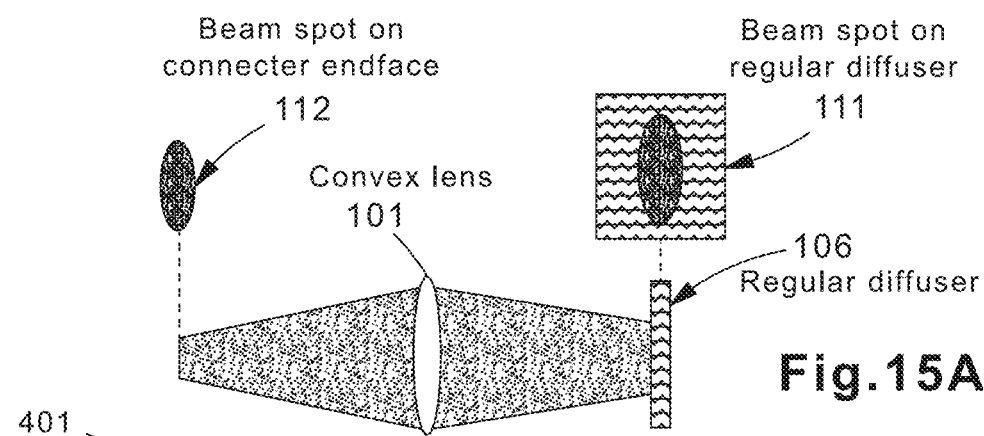
FIG. 15A illustrates a light beam being transmitted through a portion of the exemplary visual inspection module shown in FIG. 13 that includes a diffuser, a convex lens, and a connector end face.
Figure 15B:
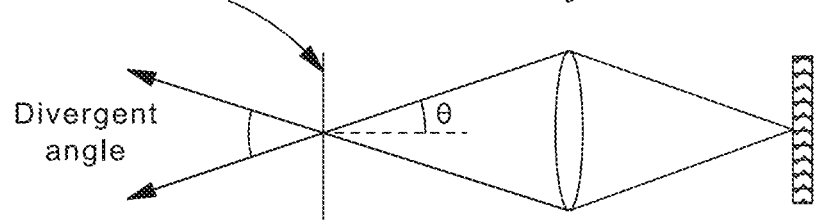
FIG. 15B illustrates a light beam being transmitted through a portion of the exemplary visual inspection module shown in FIG. 13 that includes a diffuser, a convex lens, and a connector end face.

FIGS. 15A-15D show representations of an elliptical shaped beam pattern (e.g., spot beam pattern 111) on the diffuser 106 and an elliptical shaped beam spot pattern (e.g., spot beam pattern 112) on the connector end face 401 (e.g., an MPO connector) resulting from light propagating through the visual inspection module 1300 and being incident on the connector end face 401 and the diffuser 106 at different angles as the incident light travels through the convex lens 101. In particular, FIG. 6A shows light emitted from the light source 107 as it travels through the diffuser 106 and passes through the convex lens 101, after which the light gets focused on the connector end face 401, where the spot beam pattern 112 formed on the connector end face 401 is formed into the elliptical shape. FIG. 15B shows the light from the center of the regular diffuser 106 passing the convex lens 101 and getting focused at the center of the connector end face 401.

Here the numerical aperture (NA) of the lens is:

$$NA = \sin\theta \approx \theta$$

The divergent angle of the light fall on the center of the connector end face 401 is $2\theta$. Hence the resulting divergent angle is:

$$\text{Divergent angle} \approx 2\,NA$$

Figure 15C:
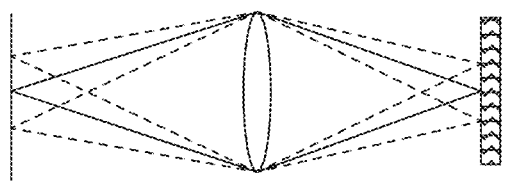
FIG. 15C illustrates a light beam being transmitted through a portion of the exemplary visual inspection module shown in FIG. 13 that includes a diffuser, a convex lens, and a connector end face.
Figure 15D:
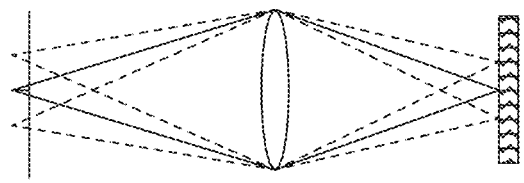
FIG. 15D illustrates a light beam being transmitted through a portion of the exemplary visual inspection module shown in FIG. 13 that includes a diffuser, a convex lens, and a connector end face.

FIG. 15C shows the light coming in at different incident angles from the regular diffuser 106 and passing through the convex lens 101 and getting focused at the center of the connector end face 401. Usually, the uneven surface pattern of the diffuser 106 causes the focused light illuminated onto the connector end face 401 to be nonuniform. In practice, the image of the diffuser 106 should focus on a plane that is slightly positioned off the actual plane of the connector end face 401, as shown in FIG. 15D (e.g., the image of the diffuser 106 is focused slightly behind the physical plane of connector end face 401).

Figure 16:
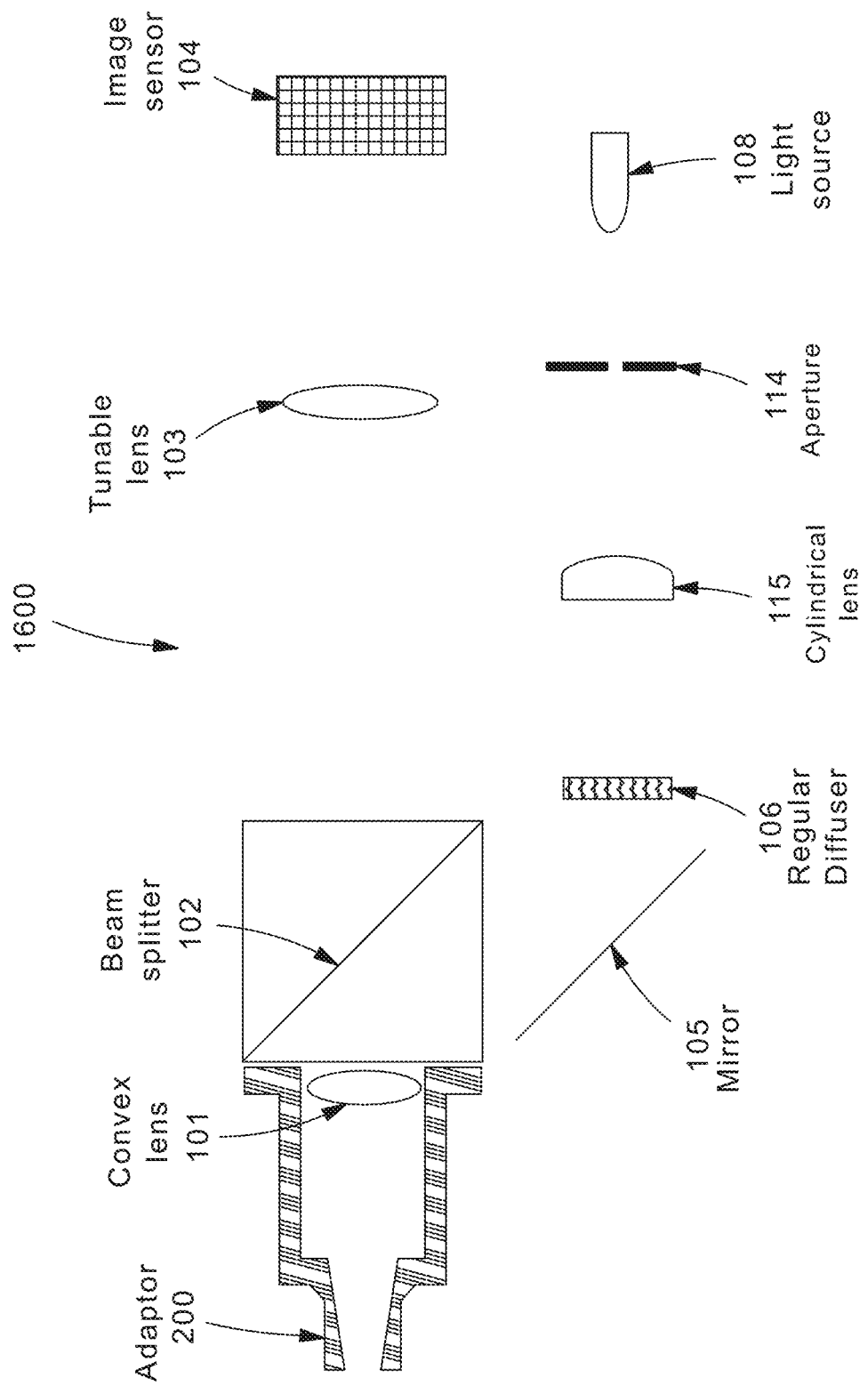
FIG. 16 illustrates an exemplary visual inspection module and connector adapter included with a microscope system, according to an alternative embodiment of the present disclosure.

Besides the elliptical diffuser 110, other optical components may also produce an asymmetrical pattern with a width much longer than the height. These other optical components may include, but are not limited to, a cylindrical lens, or an optical grating or prism array, FIG. 16 shows an exemplary visual inspection module 1600 that includes a different combination of components from the visual inspection module 100 described earlier, while still using the same connector adapter 200, according to an alternative embodiment. The visual inspection module 1600 may also be included in the microscope system described herein. The visual inspection module 1600 includes some of the same components from the visual inspection module 100, and additionally includes a cylindrical lens 115 and an aperture 114 that are positioned between the light source 107 and the diffuser 106 along a light path of a light emitted from the light source 107. Light emitted from the light source 107 travels through the aperture 114, then becomes incident on the cylindrical lens 115 before reaching the diffuser 106 (e.g., non-elliptical diffuser).

Figure 17:
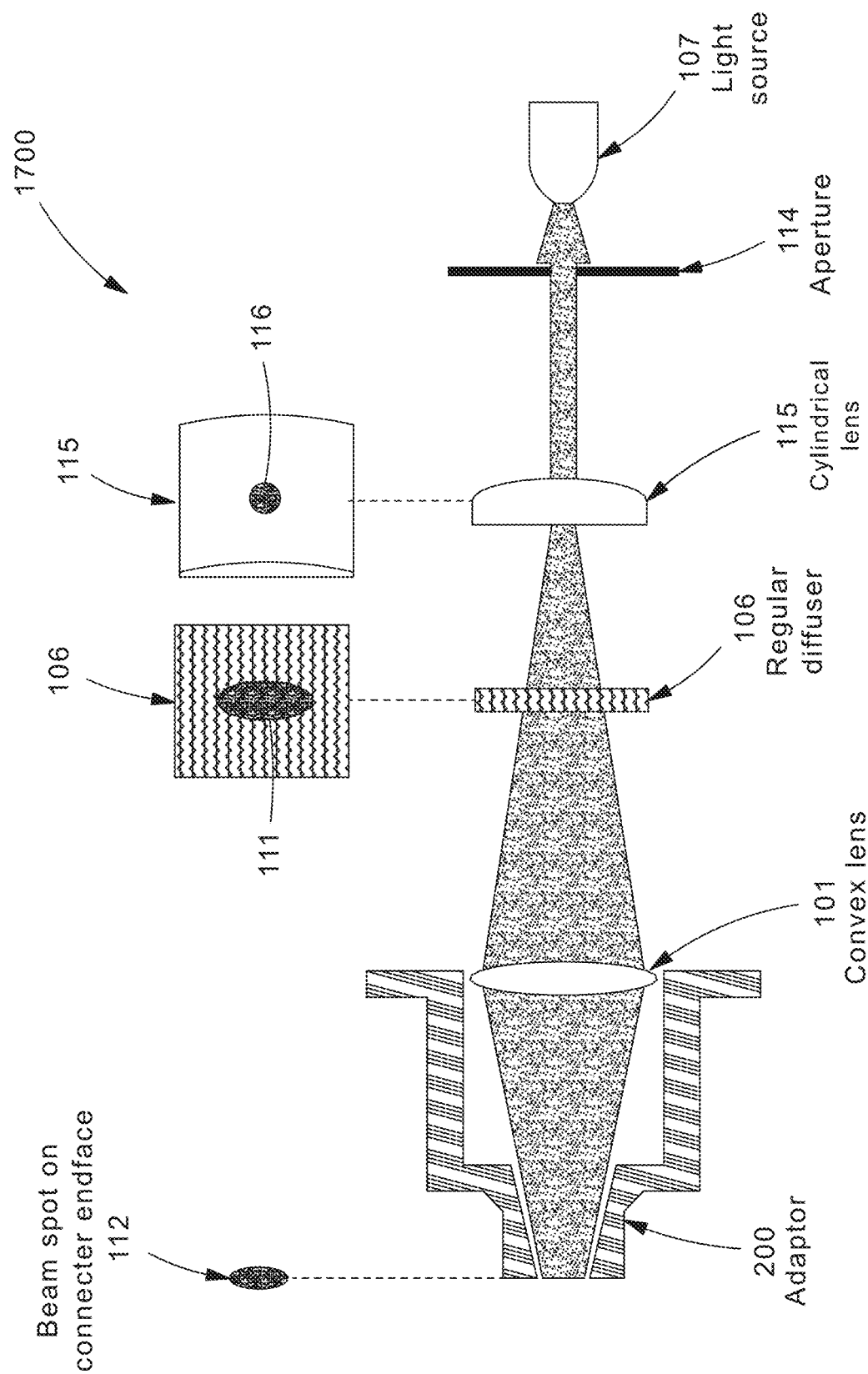
FIG. 17 illustrates a system diagram representing an exemplary light path taken by light propagating within the visual inspection module shown in FIG. 16.

FIG. 17 shows an exemplary system diagram 1700 that is representative of the light path taken by light emitted from the light source 107 in the visual inspection module 1600 including the cylindrical lens 115 and the aperture 114. The system diagram 1700 may include some, but not necessarily all, the components included in the visual inspection module 1600 for exemplary purposes. When the light incidents on the cylindrical lens 115, it forms a circular spot-shaped beam pattern 116 on the cylindrical lens 115. After passing through the cylindrical lens 115, the light creates an elliptical shaped beam pattern 111 on the regular diffuser 106 and eventually forms the elliptical shaped beam pattern 112 on the connector end face 401 residing in the adapter 200.

Figure 18:
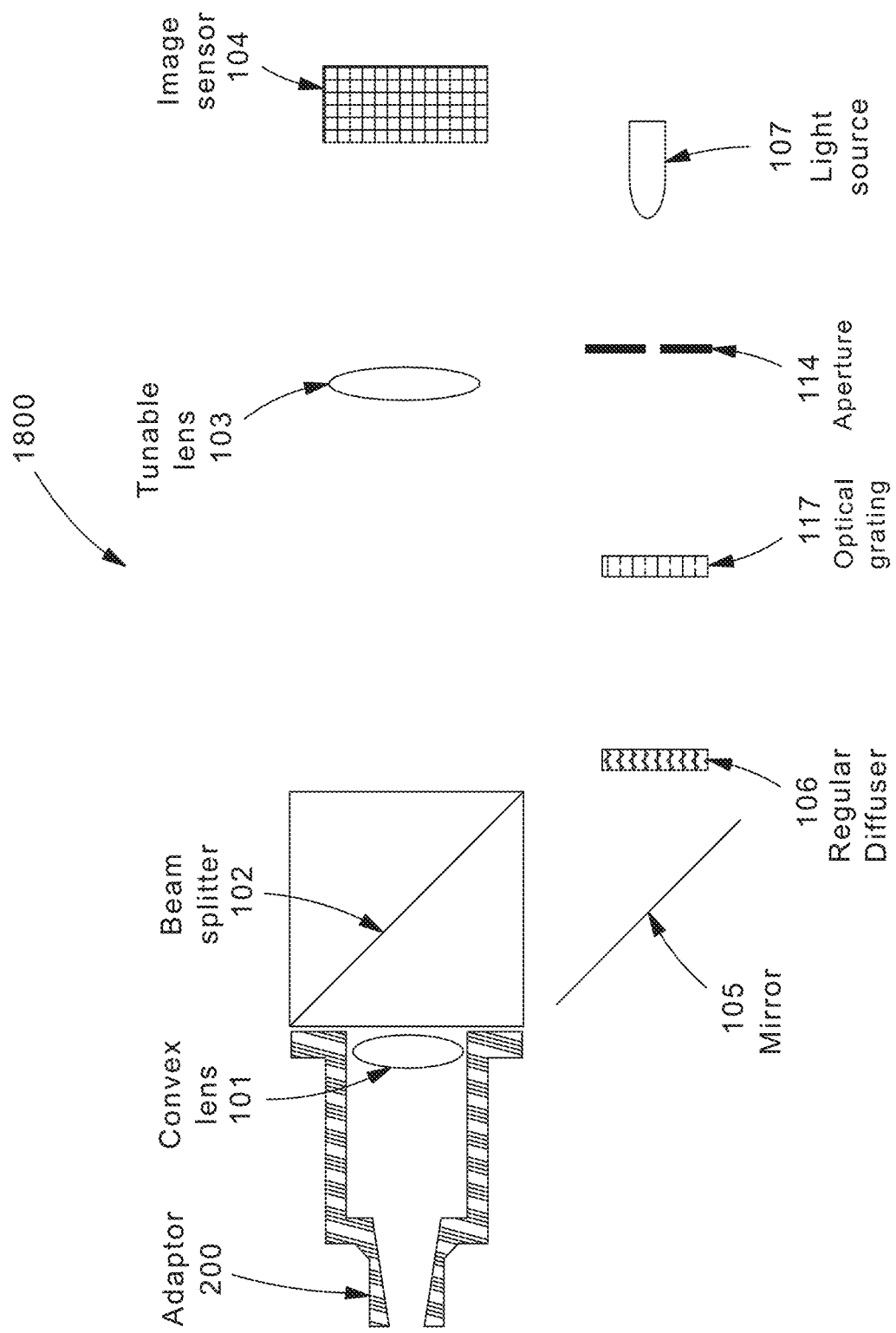
FIG. 18 illustrates an exemplary visual inspection module and connector adapter included with a microscope system, according to an alternative embodiment of the present disclosure.

FIG. 18 shows an exemplary visual inspection module 1800 that includes a different combination of components from the visual inspection module 100 described earlier, while still using the same connector adapter 200, according to an alternative embodiment. The visual inspection module 1800 may also be included in the microscope system described herein. The visual inspection module 1800 includes some of the same components from the visual inspection module 100, and additionally includes an optical grading 117 (e.g., prism array) and an aperture 114 that are positioned between the light source 107 and the diffuser 106 along a light path of a light emitted from the light source 107. Light emitted from the light source 107 travels through the aperture 114, then becomes incident on the optical grading 117 before reaching the diffuser 106 (e.g., non-elliptical diffuser).

Figure 19:
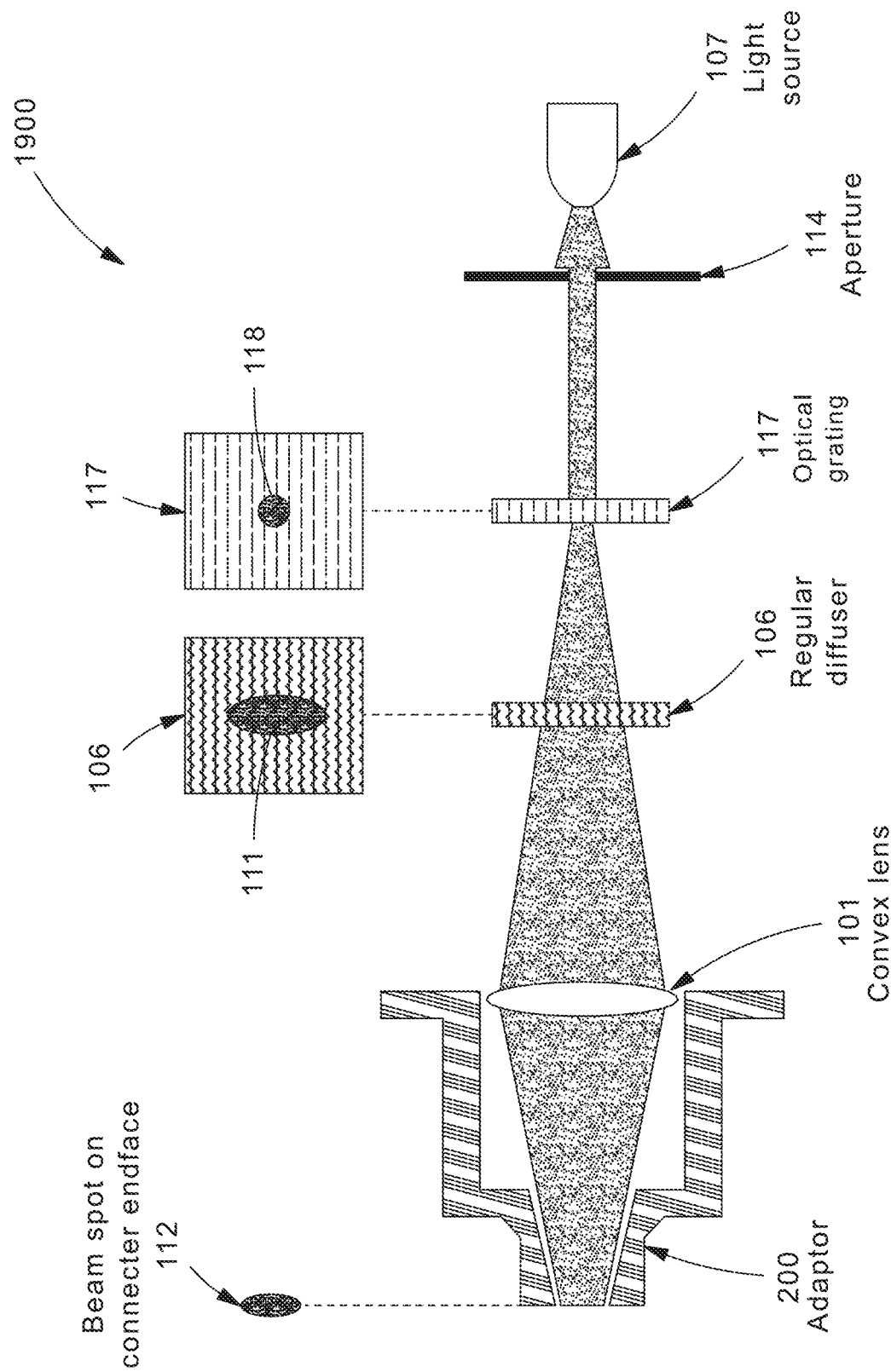
FIG. 19 illustrates a system diagram representing an exemplary light path taken by light propagating within the visual inspection module shown in FIG. 18.

FIG. 19 shows an exemplary system diagram 1900 that is representative of the light path taken by light emitted from the light source 107 in the visual inspection module 1800 including the optical grading 117 and the aperture 114. The system diagram 1900 may include some, but not necessarily all, the components included in the visual inspection module 1800 for exemplary purposes. When the light incidents on the optical grading 117, it forms a circular spot-shaped beam pattern 118 on the optical grading 117. After passing through the optical grading 117, the light creates an elliptical shaped beam pattern 111 on the regular diffuser 106 and eventually forms the elliptical shaped beam pattern 112 on the connector end face 401 residing in the adapter 200.

Figure 20:
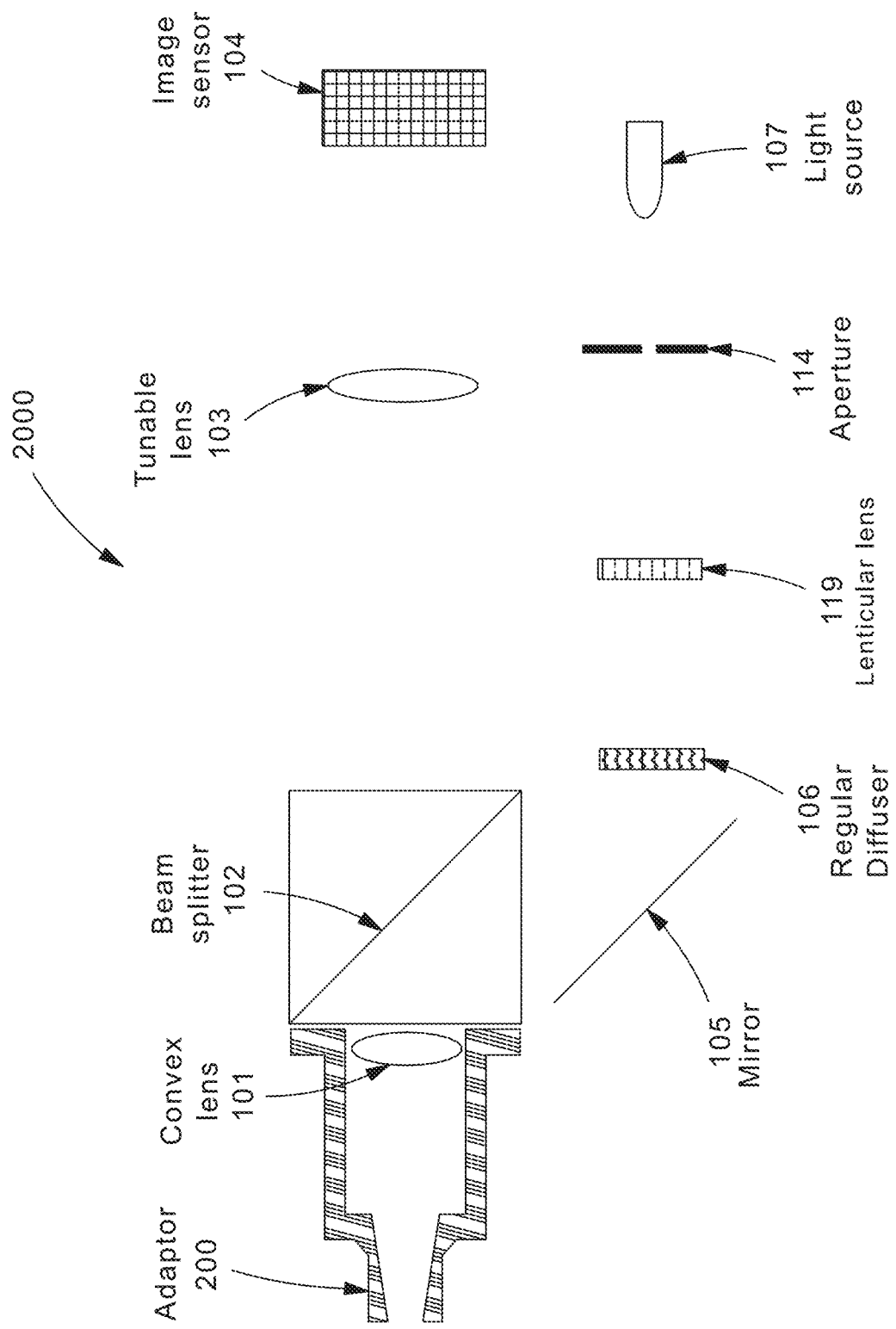
FIG. 20 illustrates an exemplary visual inspection module and connector adapter included with a microscope system, according to an alternative embodiment of the present disclosure.

FIG. 20 shows an exemplary visual inspection module 2000 that includes a different combination of components from the visual inspection module 100 described earlier, while still using the same connector adapter 200, according to an alternative embodiment. The visual inspection module 2000 may be included in the microscope system described herein. The visual inspection module 2000 includes some of the same components from the visual inspection module 100, and additionally includes a lenticular lens 119 and an aperture 114 that are positioned between the light source 107 and the diffuser 106 along a light path of a light emitted from the light source 107. Light emitted from the light source 107 travels through the aperture 114, then becomes incident on the lenticular lens 119 before reaching the diffuser 106 (e.g., non-elliptical diffuser).

Figure 21:
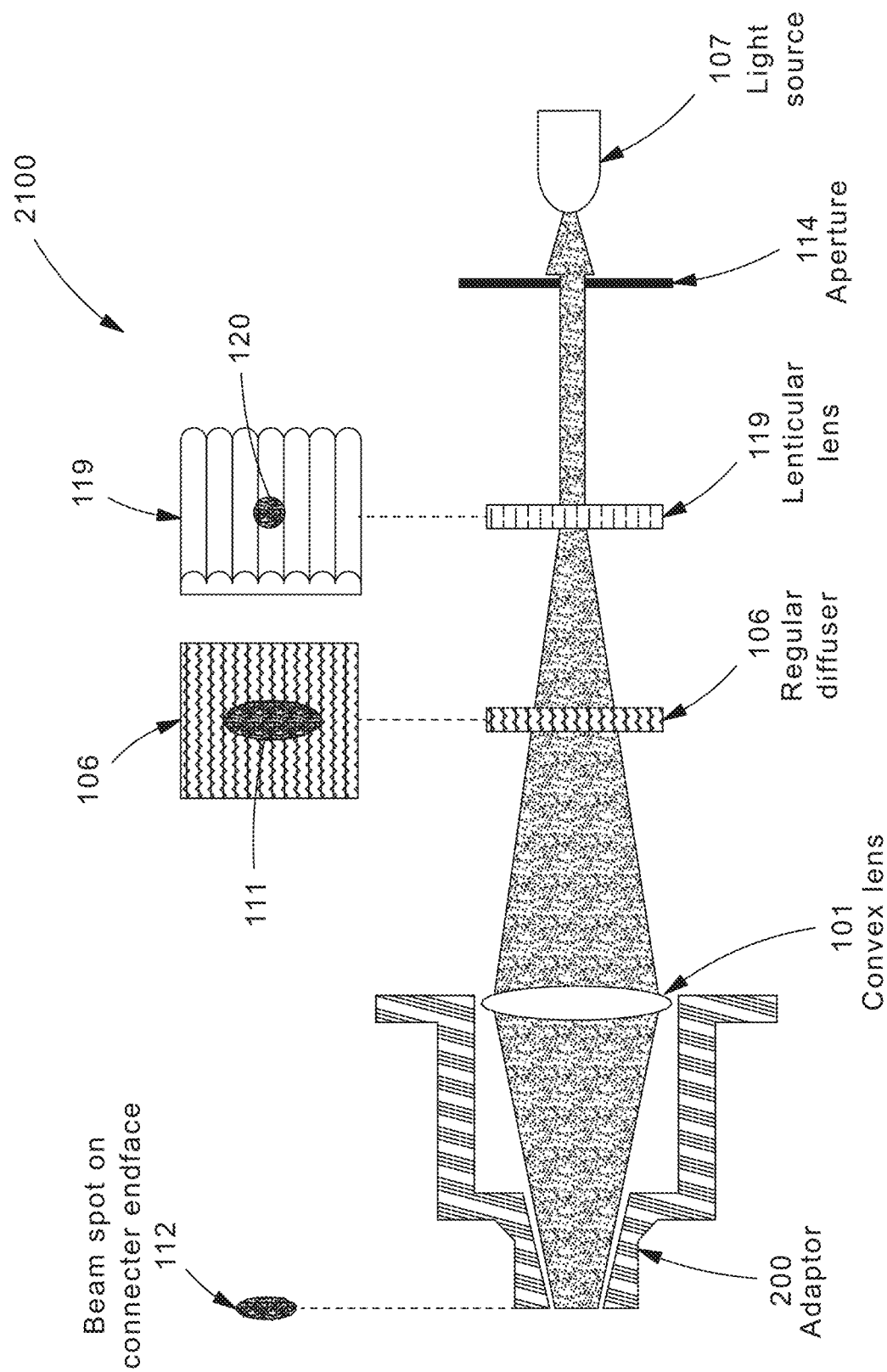
FIG. 21 illustrates a system diagram representing an exemplary light path taken by light propagating within the visual inspection module shown in FIG. 20.

FIG. 21 shows an exemplary system diagram 2100 that is representative of the light path taken by light emitted from the light source 107 in the visual inspection module 2000 including the lenticular lens 119 and the aperture 114. The system diagram 2100 may include some, but not necessarily all, the components included in the visual inspection module 2000 for exemplary purposes. When the light incidents on the lenticular lens 119, it forms a circular spot-shaped beam pattern 120 on the lenticular lens 119. After passing through the lenticular lens 119, the light creates an elliptical shaped beam pattern 111 on the regular diffuser 106 and eventually forms the elliptical shaped beam pattern 112 on the connector end face 401 residing in the adapter 200.

Using the visual inspection modules described herein, a larger field of view may be accomplished for a microscope system to capture most, if not all, of the connector end face using only a single image sensor. For example, FIG. 22A shows an exemplary image including the important features of the connector end face (e.g., both pins and all the fibers), where the image is captured in a single image using the larger field of view enabled by the visual inspection modules described herein. FIG. 22B shows an exemplary image using the visual inspection modules described herein, where the visual inspection module has been configured to focus on the pins located on opposite far ends of the connector end face. The visual inspection modules are able to capture images with higher contrast to better identify defects 221 as shown in magnified view of the isolated fiber in FIG. 22C, as well as FIGS. 22A-22B.

The visual inspection module described herein overcomes the resolution and FOV limitations by using the setup with multiple lenses, at least one fixed, and at least one variable, and a uniform illuminator. The uniform illuminator is achieved using a set of asymmetric/symmetric diffusers, and light emitting diodes (LEDs) can be used as light sources to efficiently direct the light to the regions of interest of the connector. The visual inspection module described herein provides a larger FOV, e.g., 2.6X or more area than known commercially available visual inspection systems, while also maintaining high resolution and similar or better resolutions. Using the disclosed visual inspection module, the FOV can be large enough to produce clear images of the holes or pins on the connector end face, while at the same time, the fibers can be seen with high resolution and contrast.

In addition to the visual inspection module for capturing the desired image, an image analysis application is also disclosed herein for controlling the apparatus and applying image analysis techniques for detecting contaminants from the captured images. For example, the image analysis application may include one or more image analysis solutions for applying specific image recognition techniques.

Regarding control of the magnification function in the visual inspection module, the image magnification has some residual dependence on focus, and therefore, the position of the fibers, as seen in the camera, changes while the system tries to focus. Moreover, each fiber's best focus depends on its position, and since this is changing, it requires an iterative process for optimization. In addition, traditional methods for circle Hough detection often fail when used with large FOV images captured in nonideal conditions, such as contamination or defective connectors. In those cases, traditional image detection solutions (e.g., image detection algorithms) can miss fibers that are present in the connector, or they can incorrectly detect non-existing fibers.

Therefore, new image detection solutions capable of using multiple images to map the best focus for each fiber position in the connector end face are provided by the image analysis application disclosed herein. Also, new image detection solutions configured to find the fibers in large FOV contaminated images are provided by the image analysis application disclosed herein.

Moreover, the image analysis application is configured to execute these image detection solutions in such a way that the inspection time is not increased beyond a reasonable amount of time, e.g., 15 seconds. The image analysis application disclosed herein may be representative of the hardware, software (e.g., set of machine-executable instructions configured to be executed by a processor), middleware, application programming interface (API), circuitry, and/or other component used to implement the corresponding features attributed to the image analysis application.

Disclosed are image analysis solutions that are executed as part of the image analysis application by visual inspection microscope systems on images captured using a large FOV. The term large FOV may be understood as a FOV that covers almost the full connector end face of a traditional MPT/MPO connector, including all the fibers and holes or pins that are included on the end face. The solutions described herein optimize the focus per location in the image sensor and utilize image detection solutions to detect fibers in contaminated images and debris and contamination in the found fibers, as shown by the exemplary images illustrated in FIGS. 22A-22C. Also disclosed are methods to implement those image detection solutions in parallel using multicore CPUs in order to reduce inspection time.

Disclosed are image analysis solutions for fast inspection of optical connectors, including large FOV images, where the fibers' location and degree of contamination are detected with high accuracy. The methods described herein may inspect optical interconnects or patch cords connector end faces. Alternatively, the disclosed methods may be applied to inspect patch panels or cassettes adapters.

Figure 23:
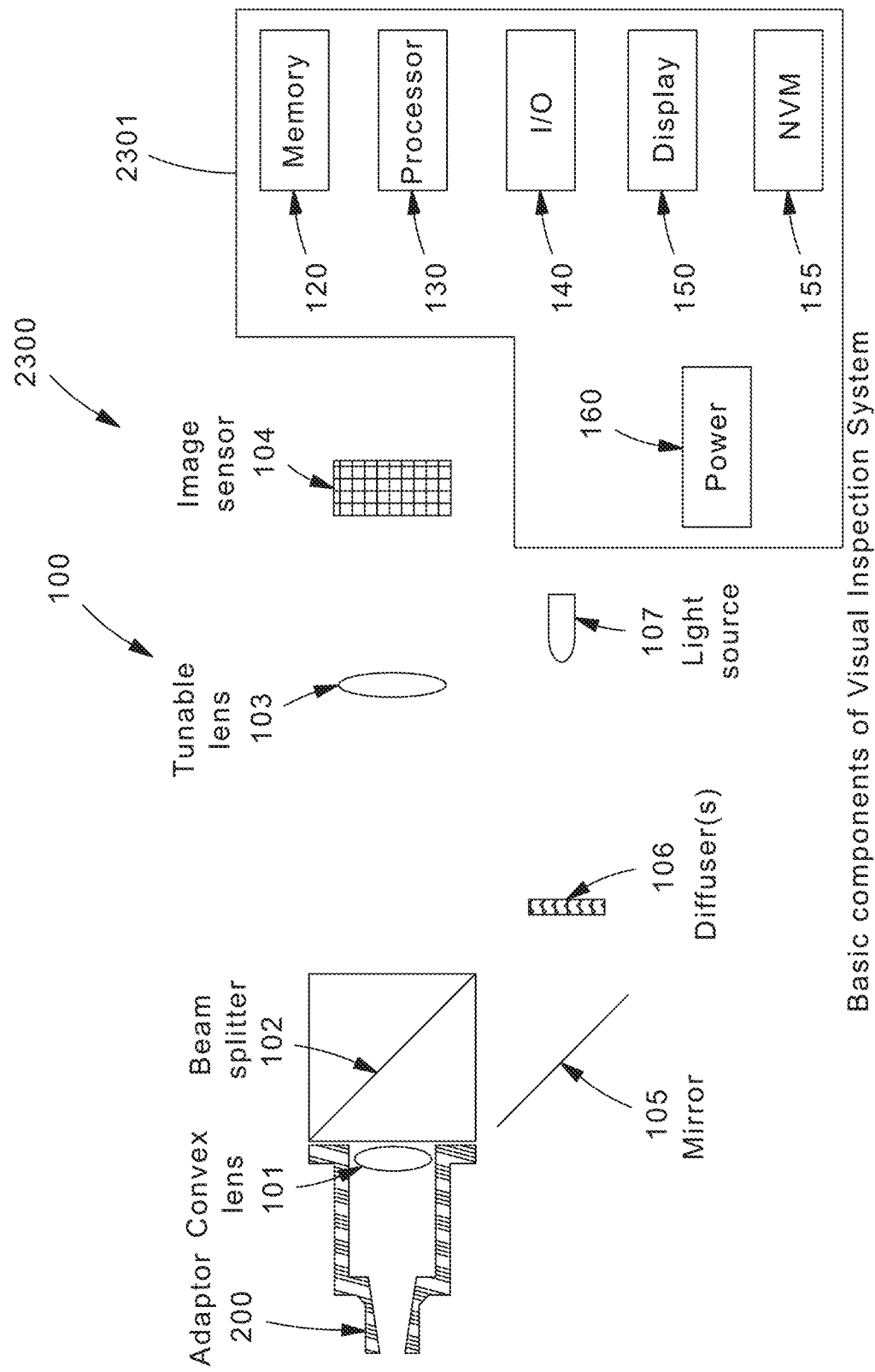
FIG. 23 illustrates an exemplary visual inspection microscope system that includes a visual inspection module and a computing system, according to an embodiment of the present disclosure.

A brief description of the apparatus where the disclosed solutions may be applied is further provided. FIG. 23 shows an exemplary embodiment of the visual inspection microscope system 2300. The microscope system 2300 may include one of the visual inspection modules described herein (e.g., visual inspection module 100), as well as a computing system 2301. The visual inspection module 100 works together with at least one adaptor 200, and includes a lens 101, a beam splitter 102, a tunable lens 103 (optical power of which is controlled by a current or voltage, where the optical power is related to the lens curvature and it may be measured in diopters), an image sensor 104, a light source 107 at the desired wavelength of interest, and diffuser 106 (which may be representative of one or more diffusers). In embodiments where the system 2300 is a portable device, it may include the computing system 2301. The computing system 2301 includes a power unit 160 (battery and/or plug-in), a memory 120, a processor 130 (e.g., CPUs/GPUs), input and output interfaces 140 (e.g., keyboard, mouse, touchpad, microphone, speaker, etc.), a display 150, and non-volatile memory 155. In other embodiments, one or more components of the computing system 2301 may be removed from the system 2300 and provided by an external computer or tablet connected to the apparatus using wired or wireless connections (e.g., USB wired connections, or Bluetooth wireless connections).

The image analysis solutions disclosed in the next section optimize a process for having all fibers in an image of a connector end face captured using the large FOV at the best focus by combining two or more images taken at different foci.

Accurate detection of each fiber location is critical for inspection of the connector. Minor errors in the fiber positions, e.g., a few microns, produce significant failures in the contamination detection. However, accurate detection of the fibers is challenging due to errors in finding optimum focus, illumination inhomogeneities, and defects or contamination of the connector. In general, the end face surfaces are not identical, even for connectors from the same supplier. For example, MPO connectors can show different ferrule surface reflectivity due to the ferrule's material differences or variations in the polishing processes. Therefore, the intensity of the light source 107, or the exposure time of the light source 107, may be tuned to compensate for illumination variations. The image analysis solution is configured to control the exposure time for fine-tuning the amount of illumination that is transmitted to the connector end face.

To achieve large FOV and high resolution, selecting the proper image sensor in terms of size, sensitivity, speed, and resolution is essential. According to exemplary embodiments, camera sensors from a few Megapixels to 40 Megapixels may be used in the visual inspection module. Although the spatial resolution of higher megapixels' cameras helps to improve image quality, cameras with 40 Megapixels require a much higher exposure time. The increase in exposure time, the transfer from the image sensor to the processor, and the process of a large image could increase the testing time to nonacceptable levels. Therefore, the image sensor 104 included in the visual inspection modules disclosed herein provide 16 or 20 Megapixel, or somewhere between, to provide high quality and contrast, while also enabling reasonable processing time of the captured images by the computing system 2301.

Circle Hough Transform (CHT)

As mentioned above, it is challenging to identify fibers in contaminated and low reflectivity optical fiber connectors. Using traditional methods for detecting circles (i.e., fibers in the captured image) in imperfect images such as the circle Hough transform (CHT), or probabilistic circle Hough methods, inconsistencies have been found. For example, depending on the sensitivity thresholds, using CHT to detect fibers from the captured images of the connector end face may find circles where fibers are not present. Although reducing false positives is possible by using less sensitive CHT parameters, there are no unique set values that can be used for all types of connectors. The variety of images from connectors' end faces is mainly a consequence of material or process differences among vendors or even among product lines.

The inconsistencies of CHT results are exacerbated when the connector end face has scratches or debris blocking the fibers or when the fibers' boundaries are distorted or blurred due to bad polish or the shaded surrounded regions of the epoxy used to glue the fibers. In other cases, some degree of tilt in the connector end face produces shadows or minor distortions that can also cause circle detection errors.

It has been found that CHT alone may not provide the degree of confidence required to detect all the fibers, without false negatives or positives, in an MPO/MPT or another contaminated connector with multiple fibers. Therefore, two additional image analysis solutions (e.g., algorithms) may further be implemented in the disclosed image analysis application to strengthen the efficacy of detecting the fibers in the connector end faces.

Periodic-CHT Method (PCM) and Polar Detection Algorithm (PDA)

The first additional image analysis solution is referred to herein as the Periodic-CHT Method (PCM), and takes advantage of the relative periodic separation of the fiber array, e.g., 200 microns or 250 microns, to improve the accuracy of the detection of the fibers. The initial steps of PCM detect the spatial periodicity of the fiber locations in the connector using Fourier techniques. Further steps of PCM discriminate among all potential circles found by CHT based on the found periodicity. Even after the use of PCM, some degree of false-positive could occur, which promotes the use of applying a second image analysis solution to the overall image analysis application for detecting fibers from the captured image, referred to herein as the polar detection algorithm (PDA), to select the fibers among all the candidates provided by PCM.

Additional algorithms were developed to detect hole and pin areas in the connector, detect the degree of contamination, and provide an evaluation and verdict for a pass or fail based on international standards for connector cleanliness.

Figure 24:
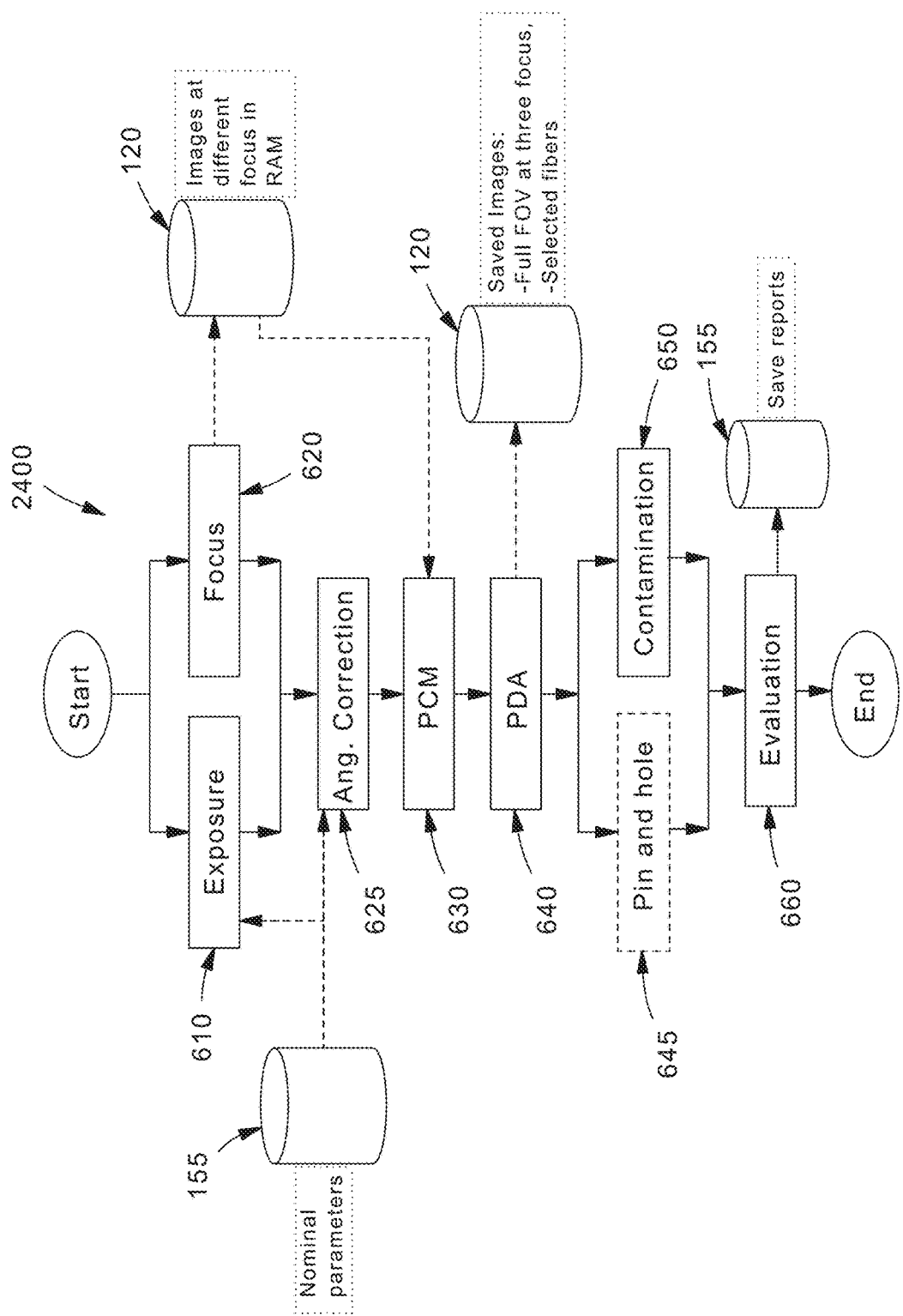
FIG. 24 illustrates an exemplary flow diagram describing a process implemented by a visual inspection application being executed by the visual inspection microscope system shown in FIG. 23, according to an embodiment of the present disclosure.

FIG. 24 shows a flow diagram 2400 describing processes implemented by an image analysis application that includes the implementation of the PCM and PDA solutions to operate large FOV visual inspection microscope systems 2300 to detect fibers and/or other characteristics from the captured image of the connector end face. The visual inspection process provided by the image analysis application, which involves the operator's interaction with the apparatus algorithms, may be controlled by a graphical user interface (GUI), such as the GUI 2500 shown in FIG. 25A. In the GUI shown in FIG. 25A, field 210 is used to identify a number of fibers for the connector, e.g., 8, 12, 16, 24, or 32, which can be automatically detected during the test. The fields 220 and 225 are inputs provided by a user to identify the operator and the cable (or cassette), respectively. Alternative functions may utilize scanners, or other machine readers, for reading 1D or 2D code labels placed on the cassettes or cables and inputting corresponding identification information into field 225.

The system also automatically captures the dates, program version, CPU, or GPU capabilities, among many other parameters. Field 230 allows the user to select the standard for evaluation and its respective tables—for example, IEC 61300-3-35 Table 2 for SMF with APC connectors. Button 240 allows to get the image on focus and run and show it on screen. Button 245 performs the tests that can include refocusing, detection of fibers, the degree of contamination of each one, the degree of contamination of the ferrule end face outside the fiber region, anomalies around the hole or pin areas, and evaluation of the connector for pass/fail based on the related standards, such as IEC 61300-3-35.

Figure 26B:
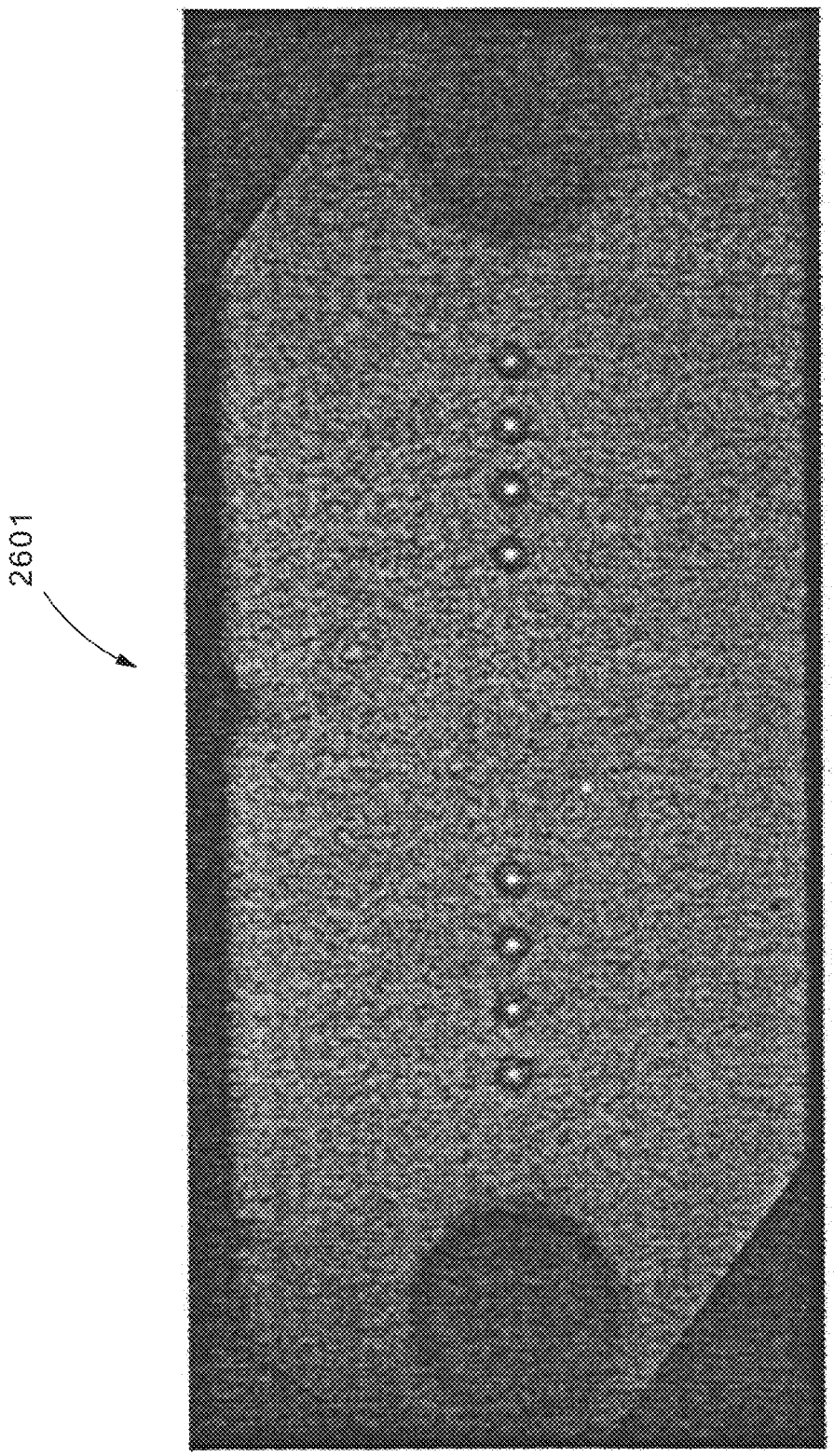
FIG. 26B illustrates an exemplary image of a connector end face captured by the visual inspection application, according to an embodiment of the present disclosure.
Figure 26C:
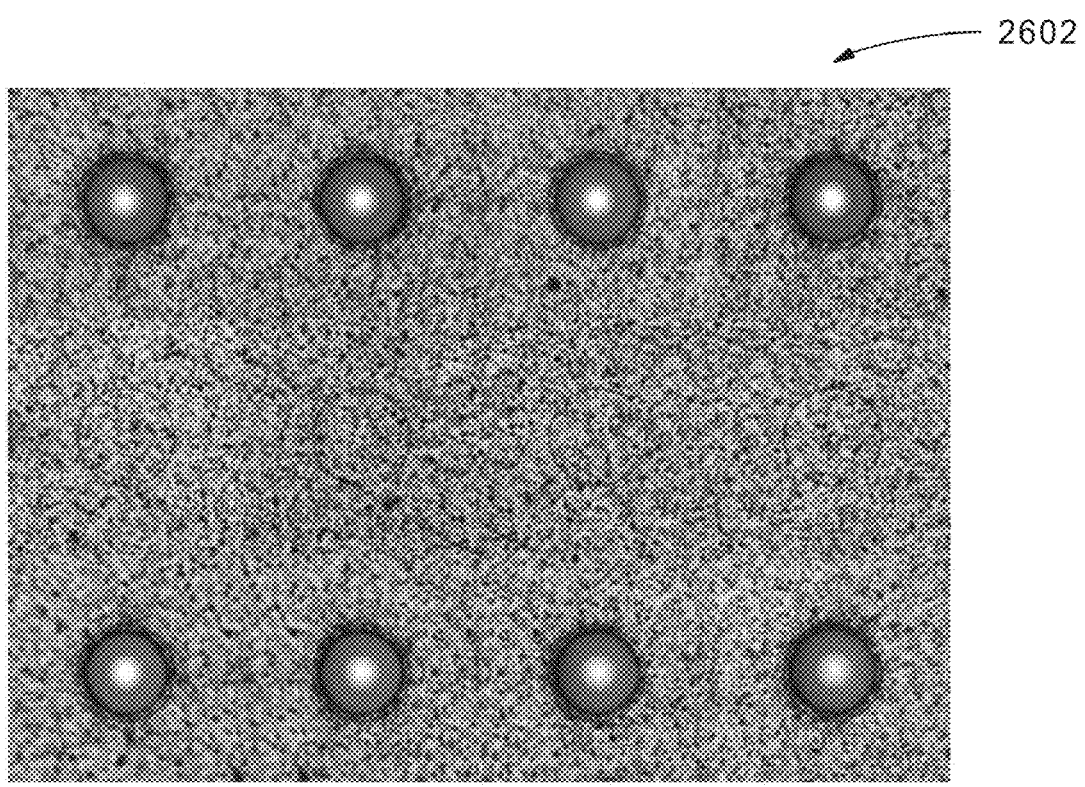
FIG. 26C illustrates an exemplary image of fibers included on a connector end face captured by the visual inspection application, according to an embodiment of the present disclosure.
Figure 26D:
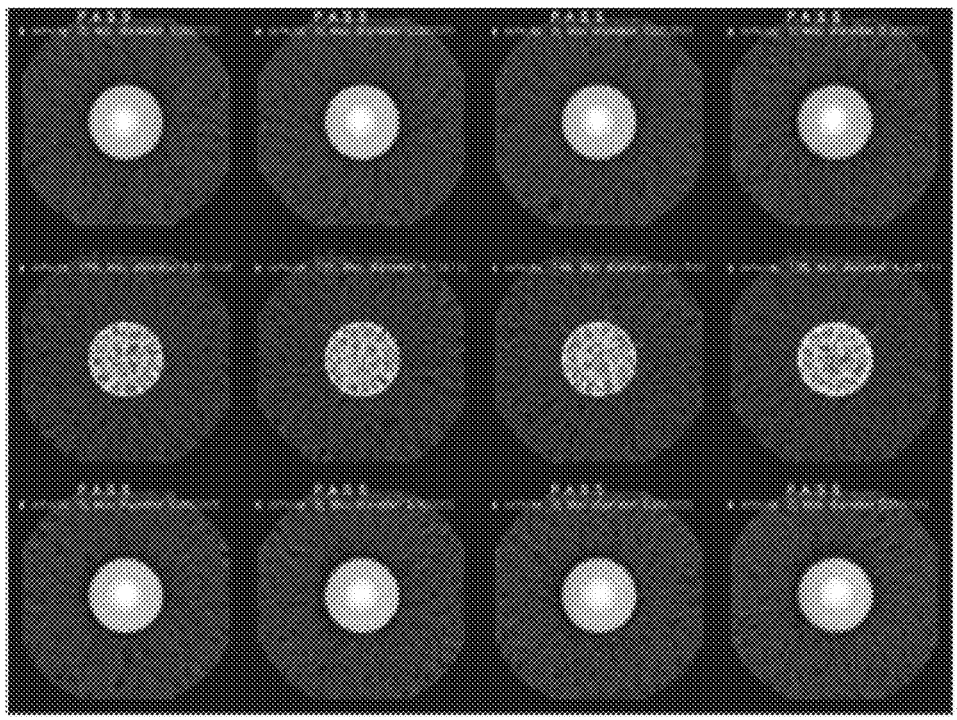
FIG. 26D illustrates an exemplary image of fibers analyzed by the visual inspection application and a result of the analysis, according to an embodiment of the present disclosure.

After the test is performed, several full-resolution images at various foci are saved. Also, a summary report is produced. The report provides the number and size of contamination particles in different zones for each fiber, as shown by the exemplary report 2600 shown in FIG. 26A. The report may also include a full-FOV image of the connector end face, as shown by the exemplary image 2601 shown in FIG. 26B. The report may also include an image of just the fibers, as shown by image 2602 in FIG. 26C, and/or an image showing a close-up view of the fibers having the detected contamination and a pass/fail decision result or recommendation superimpose onto the fiber image, as shown by the image 2603 shown in FIG. 26D.

Figures 25A, 25B:
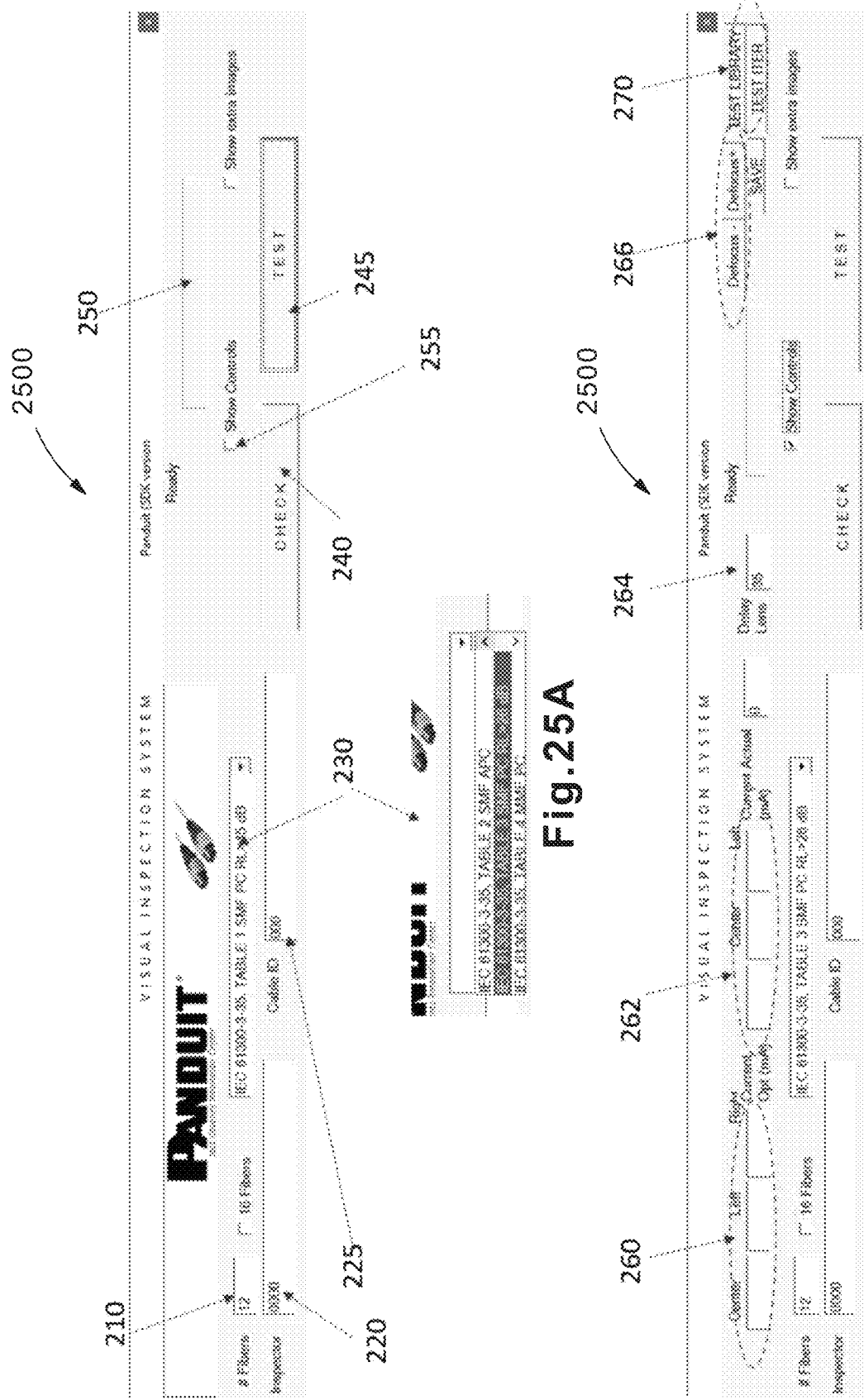
FIG. 25A illustrates an exemplary graphical user interface generated by the visual inspection application, according to an embodiment of the present disclosure.
FIG. 25B illustrates an exemplary graphical user interface generated by the visual inspection application, according to an embodiment of the present disclosure.

Taskbar 250, shown in the GUI 2500 in FIG. 25A, indicates the progress for all the focus and evaluation processes. For example, Taskbar 250 shows that the focusing process ended, typically taking a few seconds after button 245 is pressed. The GUI 2500 and image analysis application may provide more functionalities. For example, by clicking the check box control 255, more buttons and text fields may show, such as fields 260, 262, 264 and buttons 266, 270 shown in FIG. 25B. The fields labeled 260 will indicate the optimum values for the focus metric that will be described later in this document. The fields labeled 262 show the currents in mA used by the tunable lens 103 for the optimum focus of different connector sections. Field 264 displays the delays of the variable focus lens (used for calibration). Button 266 allows manual control of the focusing process. The check box also assigns functions to a mouse to enable movement inside any section of the connector image while providing zoom-in capabilities. In this mode of operation, the system corrects in real-time defocus aberrations or residual illumination nonuniformities, allowing the inspector to get the best image of any part of the connector. Buttons 270 are used for repeatability and reproducibility evaluation and calibration purposes.

Reverting back to the description of the flow diagram 2400, the exposure process 610 and the focus process 620 optimize the exposure time and find focus for a captured image, respectively. These processes may run in parallel to reduce execution time, as depicted in the flow diagram 2400 illustrated in FIG. 24. During the execution of the exposure process 610 and the focus process 620, the microscope system 2300 may capture an image of a rotated version of the connector end face. The rotation, the size of the image sensor 104, and the degree of magnification designed in the microscope system 2300 enable the capture of a larger area of the connector end face.

Figure 27:
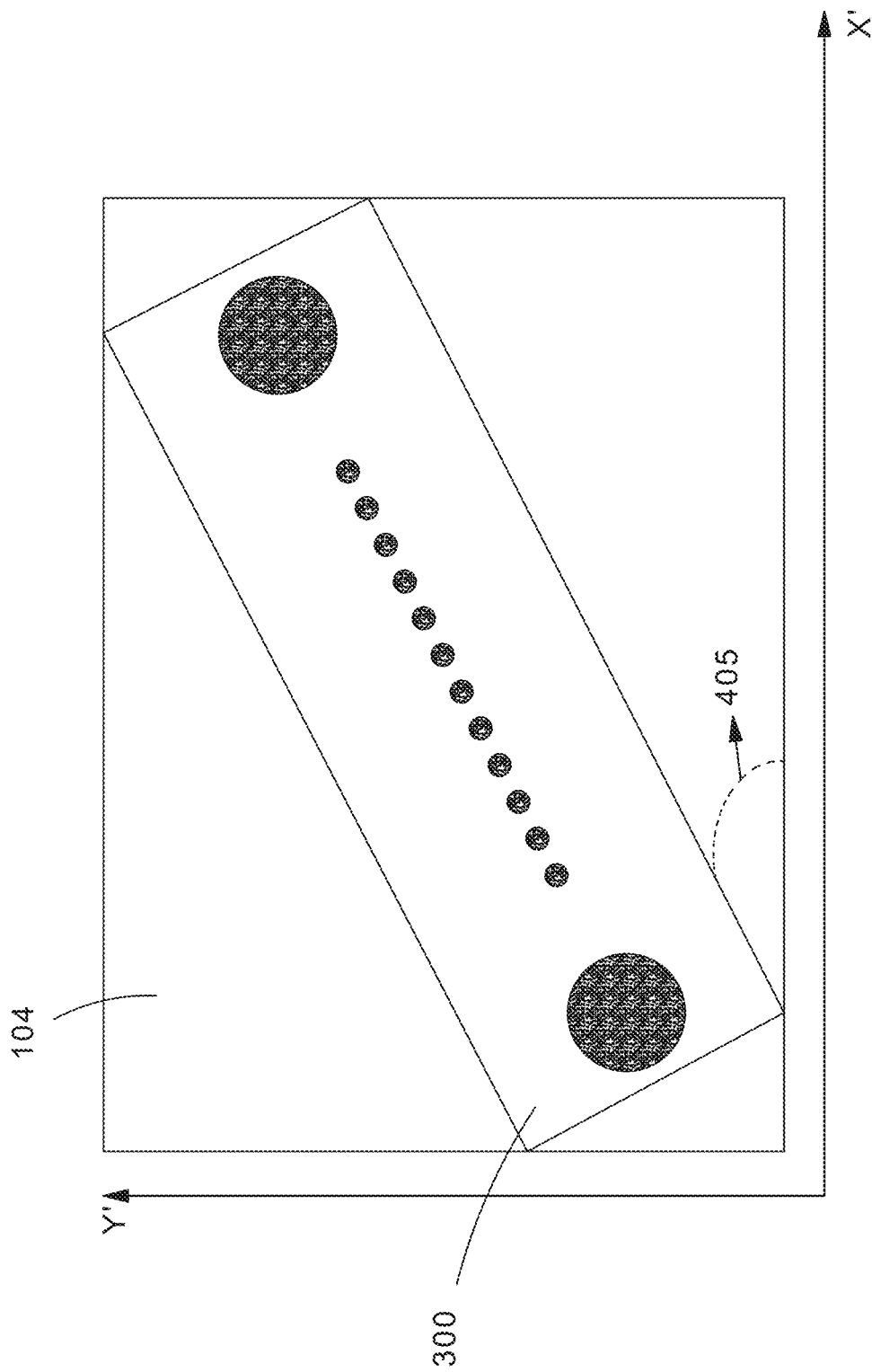
FIG. 27 illustrates an exemplary representative image of a connector end face superimposed over a representation of an image sensor, according to an embodiment of the present disclosure.

FIG. 27 shows an exemplary illustration of an image 300 that has been captured of the connector end face 401, where the image 300 is juxtaposed over a representation of the image sensor 104. The image 300 of the connector end face 401 is shown to have a diagonal tilt relative to the image sensor 401. The nominal value of the relative tilt 405, is measured during calibration. The parameter of the relative tilt 405 and others, such as apparatus offsets, camera nominal exposure, gain, and nominal specifications of the connector types, and apparatus serial number are loaded to memory 120 from a file stored in the non-volatile memory 155.

At step 625 in the flow diagram 2400, the image is corrected based on the relative tilt 405 that is measured during calibration. The residual angle error after this correction is typically much lower than 1.5 degrees. At step 630, the PCM process is executed to detect the fibers in the captured image 300 of the connector end face 401. In some embodiments, depending on the processor 130, images with half or a quarter of the maximum resolution are used to operate faster. After the PCM process is executed, the position of the fiber candidates can still have small offsets relative to the actual fibers.

Then the PDA process is applied at step 640, which is used to improve the fiber's position accuracy, achieving tolerances≤1 micron.

At step 645, a process is optionally implemented to find the pins or holes included in the image 300 of the connector end face 401. The process at step 650 then evaluates the degree of contamination identified from the image 300 of the connector end face 401. The process at step 660 is an evaluation step that compares the detected levels of contamination to the ones allowed in the standards of proprietary specs of the manufacturers, and determines or recommends whether the connector should be accepted or not based on whether the detected level of contamination is above (fail) or below (pass) a predetermined threshold. A more detailed description of some of the processes included in the flow diagram 2400 is described below.

Step 620: Focus

An apparatus with a large FOV such as the one disclosed here introduces some degree of focus-position dependence. Therefore, the tunable lens 103 requires finding multiple foci for imaging different regions of the connector end face.

Figure 28:
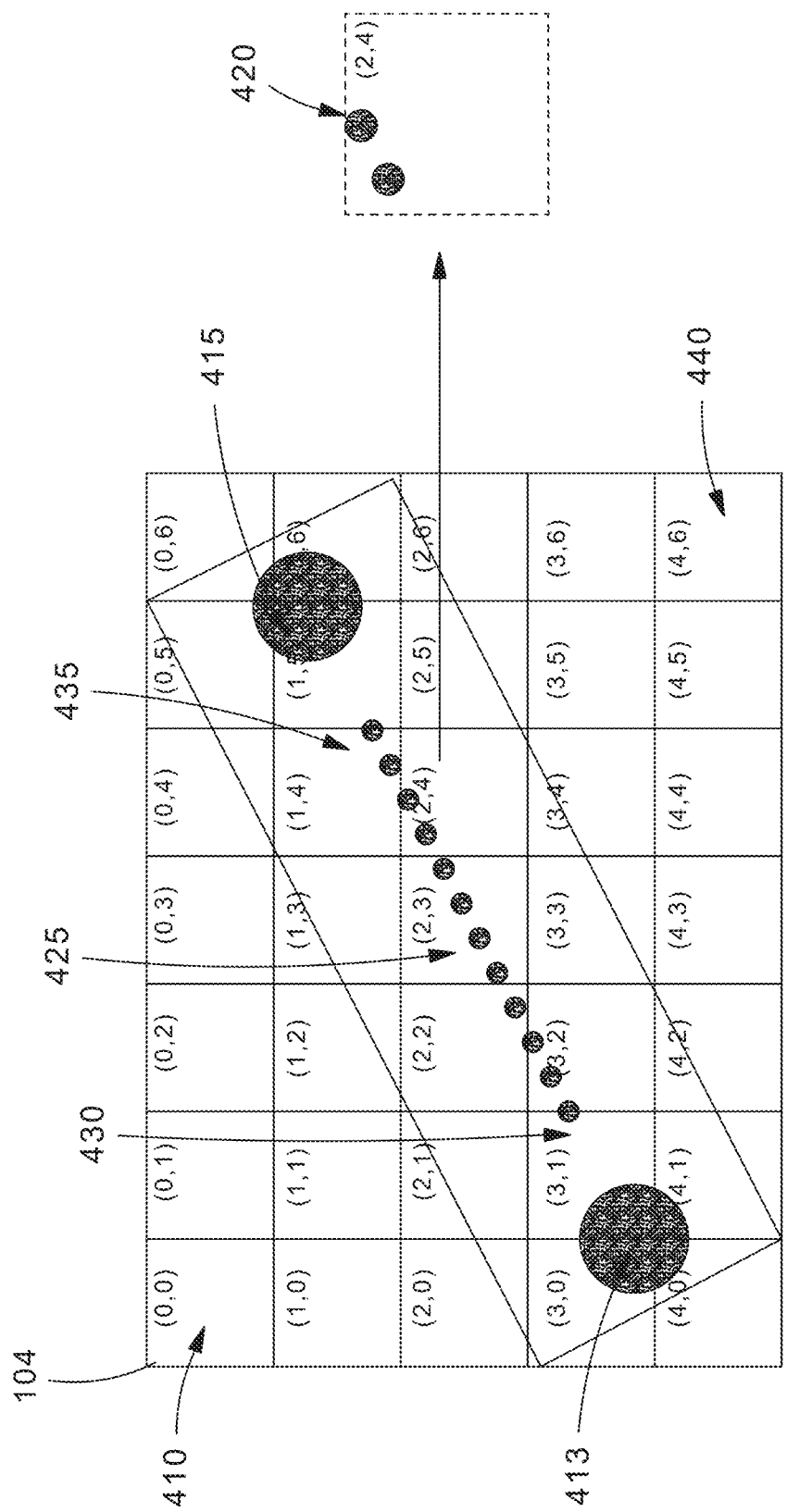
FIG. 28 illustrates an exemplary representative image of the connector end face superimposed over a representation of the image sensor from FIG. 27 where the image sensor area is partitioned into tile areas, according to an embodiment of the present disclosure.

To achieve high accuracy in determining the optimum focus, the sensor area of the image sensor 104 is divided into regions or tiles, as shown by the exemplary tile configuration in FIG. 28. The number of tiles, $N_x$ for the horizontal and $N_y$ for the vertical, are configurable. In this example, we use $N_x=7$, $N_y=5$ producing 35 tiles, where 410 and 440 are the first and last tiles, respectively. Those tiles which do not contain any characteristics that provide information about the connector end face 401 are still useful to estimate the image sensor's noise and background noise due to spurious illumination. Tiles 413 and 415 are shown to contain most of the left and right pin or hole area. Therefore, optimum foci of these tiles are used to image the pin or hole. Tile 420 is shown to contain two fibers, images of which will be captured using the optimum focus for this tile. In general, after the microscope system 2300 is calibrated for an MPO including 12 fibers, tiles 430 and 435 will contain the edge fibers, first and twelfth fibers, whereas tile 425 will contain the center fibers of the connector.

Figure 29:
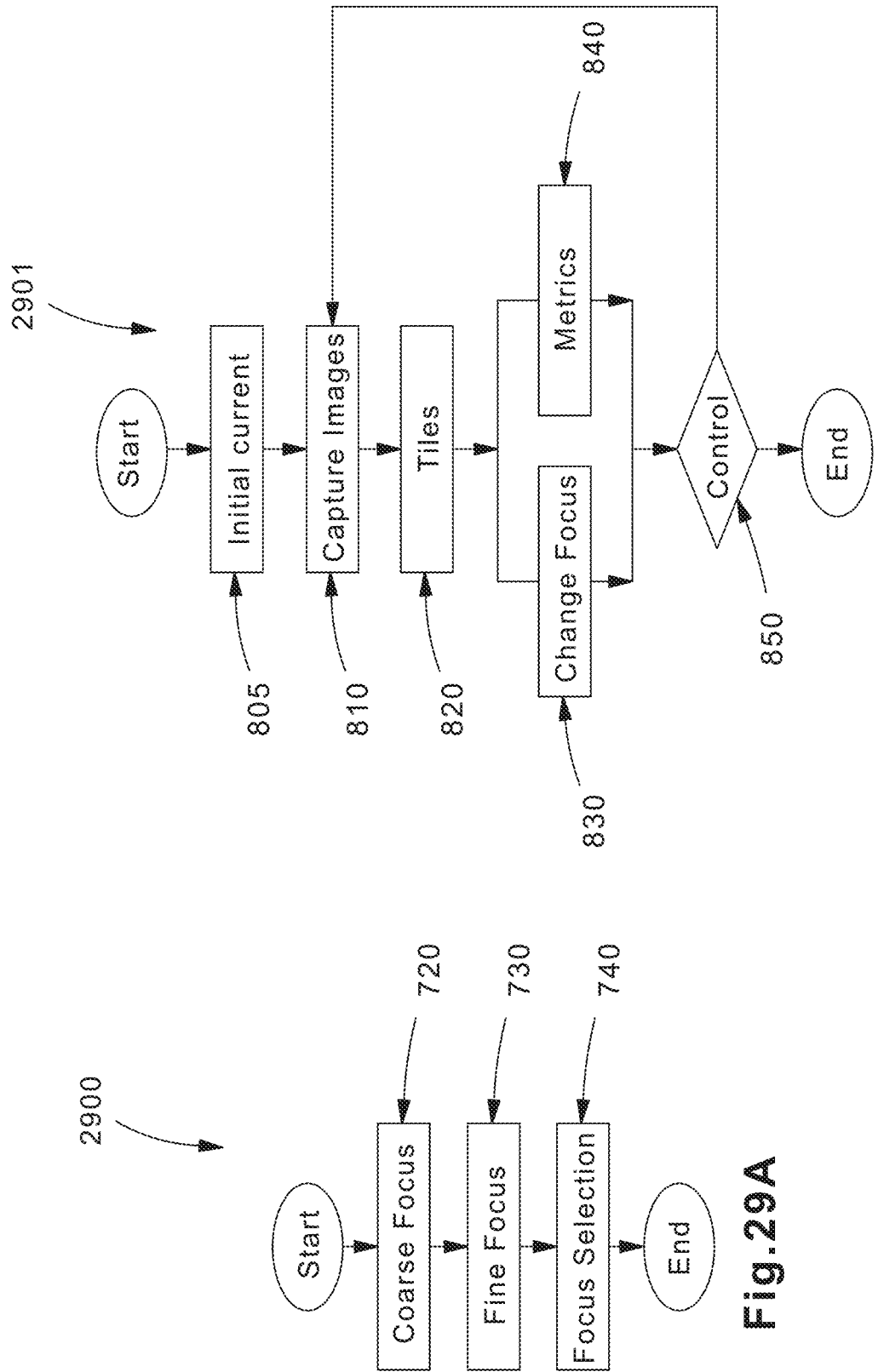
FIG. 29A illustrates an exemplary flow diagram describing an exemplary image focusing process implemented by the visual inspection application, according to an embodiment of the present disclosure.
FIG. 29B illustrates an exemplary flow diagram describing an exemplary optimal image focusing process implemented by the visual inspection application, according to an embodiment of the present disclosure.

FIG. 29A shows the flow diagram 2900 describing exemplary steps included in the focus process step 620 from flow diagram 2400 using references to the tile segmentation strategy mentioned above. The focus process represented by the flow diagram 2900 may be repeated at least two times for a coarse focus process 720 and a fine focus process 730. The coarse focus process 720 is an estimation that modifies the optical power of the tunable lens 103 to a fixed range of focus for the connectors under test. The range is obtained from the connector dimensions defined in standards, e.g., TIA FOCIS 5 for MTP connectors, plus any additional margins that are determined to be needed so that focused images of nonstandard compliant connectors may be captured. For connectors outside that range, where a well-focused image of the connector end face 401 cannot be captured, the processor 130 may flag the connector as defective.

For the fine focus process 730, the best center and edge focus found in the coarse focus process 720 are used as the initial focus. A gradient descent method or equivalent optimization method is used to find the best focus in the range defined by the center and edge focus from the coarse focus process 720 plus additional margins. From the focus processes 720 and 730, the resulting focus metrics may be stored in a matrix that is used to select the best focus per fiber in process 740. Both focus processes 720 and 730 have a similar flow chart 2901 to the one shown in FIG. 29B. The difference is the way the search for optimum focus is controlled in step 850.

Starting with the coarse focus process 720, at step 805, an initial nominal focus current is used to set up the initial optical power of the tunable lens 103. This initial value represents the distribution mean of typical connector samples tested by the apparatus during calibration. At step 810, the images of the connector end face 401 are captured and transferred to the memory 120, which is accessible to the processor 130. At step 820, the captured image is divided into tiles that are representative of the tile portion areas of the image sensor 104, as shown in FIG. 28. Adjacent tiles could have a small overlap, e.g., <10%, to smooth the transitions.

At step 830, the processor 130 sends the next current to the tunable lens 103 to change the focus of the tunable lens 103. For coarse tuning, the current is changed in a fixed step value, where the steps are given by the range of focus currents observed during calibration divided by the number of focus steps. The number of focus steps in the coarse tuning process 720 determines the duration of the process. In practice, this number may be kept below 16 steps. Delays of several tens of milliseconds may occur between the time the lens change and become stable. Therefore, in parallel, processor 130 may start the computation of the focus metrics for all the tiles for that given current, at step 840. Depending on the number of cores and multithreading capabilities of the processor, several tiles' metrics may be computed simultaneously or nearly simultaneously.

There are several metrics for focus that may be applied in the process at step 840. A metric, mf, is implemented that improves resolution and reduced computation time. The metric uses the acquired image I(x,y) and computes a smoothed (low pass filtered) function $I_s(x,y)$. The smoothed function is normalized and then divided by the maximum value of I(x,y). The focus metric is computed as, $$m_f = A\Sigma I_s(x,y) \cdot dI(x,y)/dx + B\Sigma I_s(x,y) \cdot dI(x,y)/dy \qquad (1),$$

where A and B are constants that depend on the type of connector. For one row, MPO connectors A=1 B<0.5.

The metrics from Eq. (1) are computed for all the tiles and stored in a matrix Mt(i,j) where i,j are the tile indices as shown in FIG. 28.

For the coarse focus process 720, the process at step 850 evaluates whether the focus range was covered. If not, it returns to 810 to capture the image of the next focus. Then the fine focus process 730 starts after the coarse focus process 720, where the fine focus process 730 shares many of the same functionalities as the coarse focus process 720, with the exception that for the fine focus process 730 the initial values in 805 are the best focus obtained for central and edge positions in the connector end face, and the changes in the focus current are not fixed. There is an optimization algorithm, such as gradient descent, that guides the selection of the currents that are sent to the tunable lens 103. Also, there is a maximum number of steps for the fine focus process 730, but when the focus metrics are high enough, a decision at step 850 may terminate the execution of the fine focus process 730.

In total, there are $N_{coarse}+N_{fine}$ focus steps. During the execution of the focus processes 720 and 730, the metrics values for each location in the sensor and for each current are stored in a 3D array, in which the total number of elements is given by $N_x \cdot N_y \cdot N_{fine}$. Also, the processor may store the full images, or the tile's images, in the memory 120.

During the focus selection process at step 740, a standard search algorithm may select the best focus for each tile and create a 2D array, $M_{index}$, where it stores the image index (1 to $N_{fine}$) of each best tile's focus image. For example, for tile 410, the best focus image may correspond to stored image 1, whereas for tile 415 to stored image 5. The array $M_{index}$ and the stored images are used by the PCM process 630 described in the following sections.

Step 625: Process for Angular Rotation

At step 625 in the flow diagram 2400, an image rotation and interpolation method is employed for captured images that have the best focus in tile 425, which is considered the nominal center. Also, rotation and interpolation may be applied to tiles 430 and 435. All these rotations are performed according to the nominal angle 405.

Step 630: Periodic CHT Method (PCM)

Figure 30:
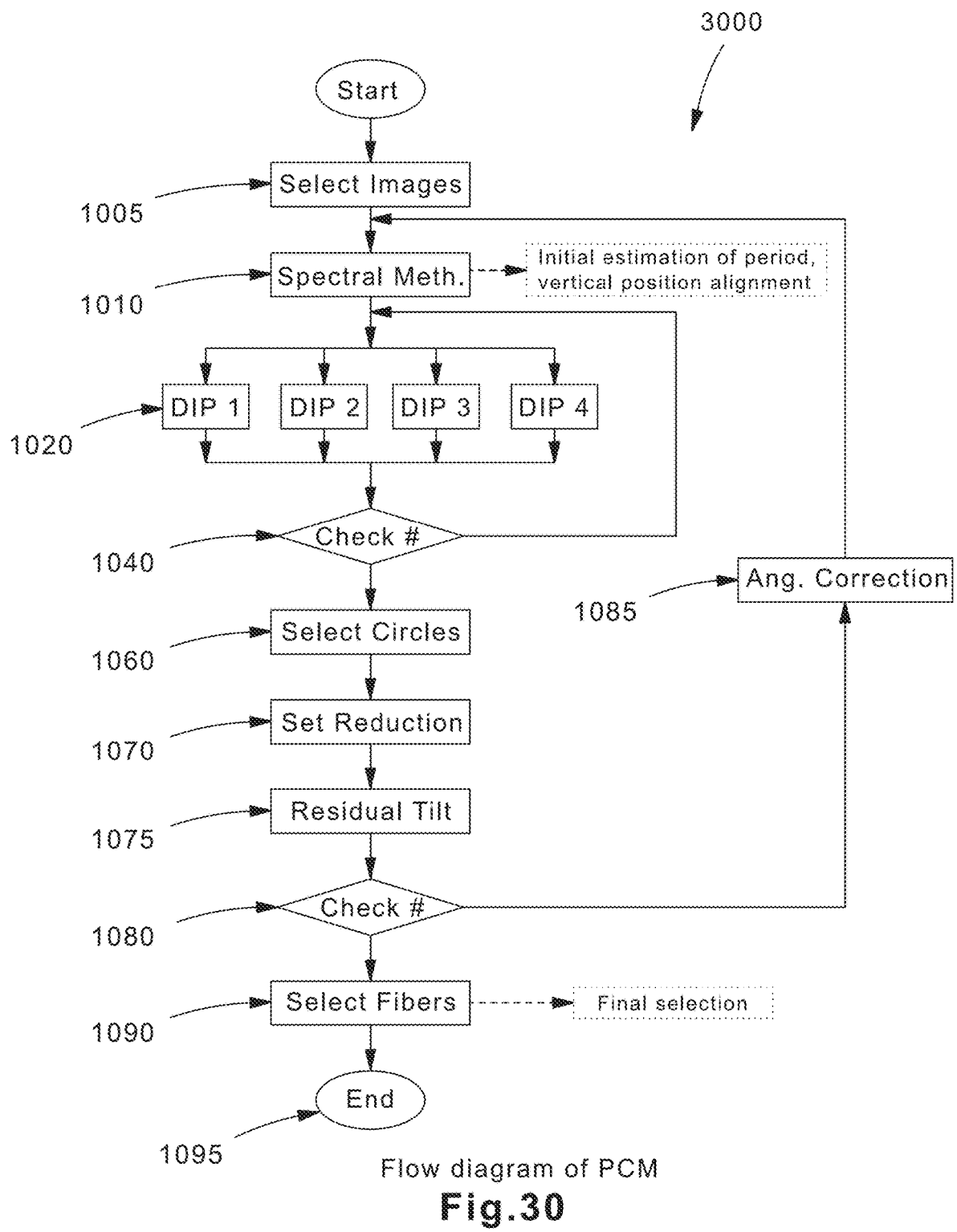
FIG. 30 illustrates an exemplary flow diagram describing an exemplary Periodic-CHT Method (PCM) process implemented by the visual inspection application, according to an embodiment of the present disclosure.

The PCM process 630 may follow the steps described in the flow diagram 3000 shown in FIG. 30. At step 1005, the rotated image with the best focus for center tile, 425, is selected. In some cases images with the best foci for tiles 430 and 435 are used when the focus metric of 425 cannot reach acceptable values for some connectors such as an eight-fiber MPO that do not have fibers at the center of the connector. For illustrative purposes, here we describe PCM assuming that only one image is selected.

Figure 31B:
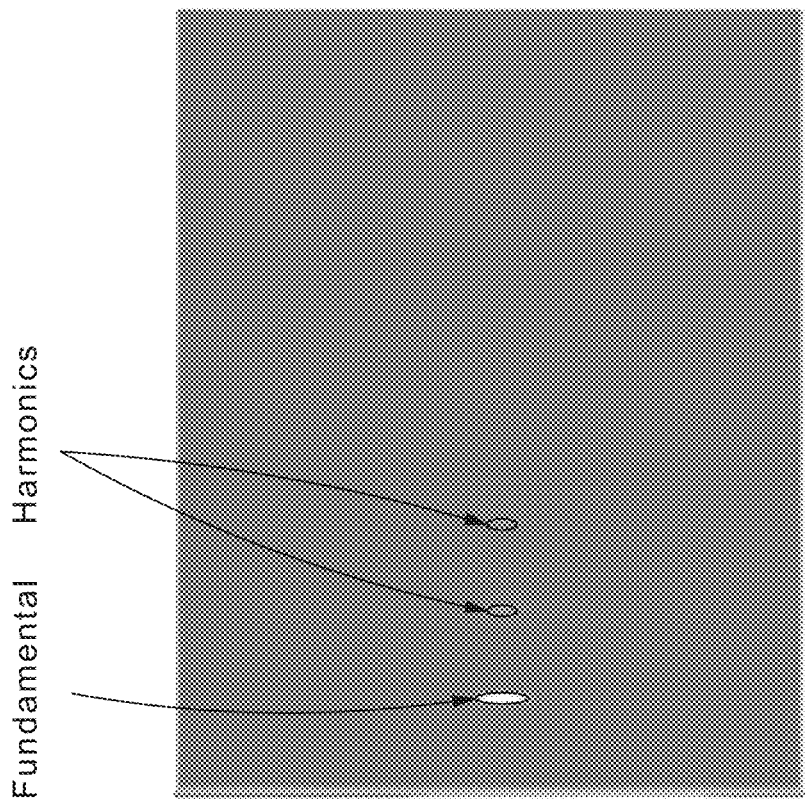
FIG. 31B illustrates an exemplary image presented in the discrete cosine transformation (DCT) domain, according to an embodiment of the present disclosure.
Figure 31A:
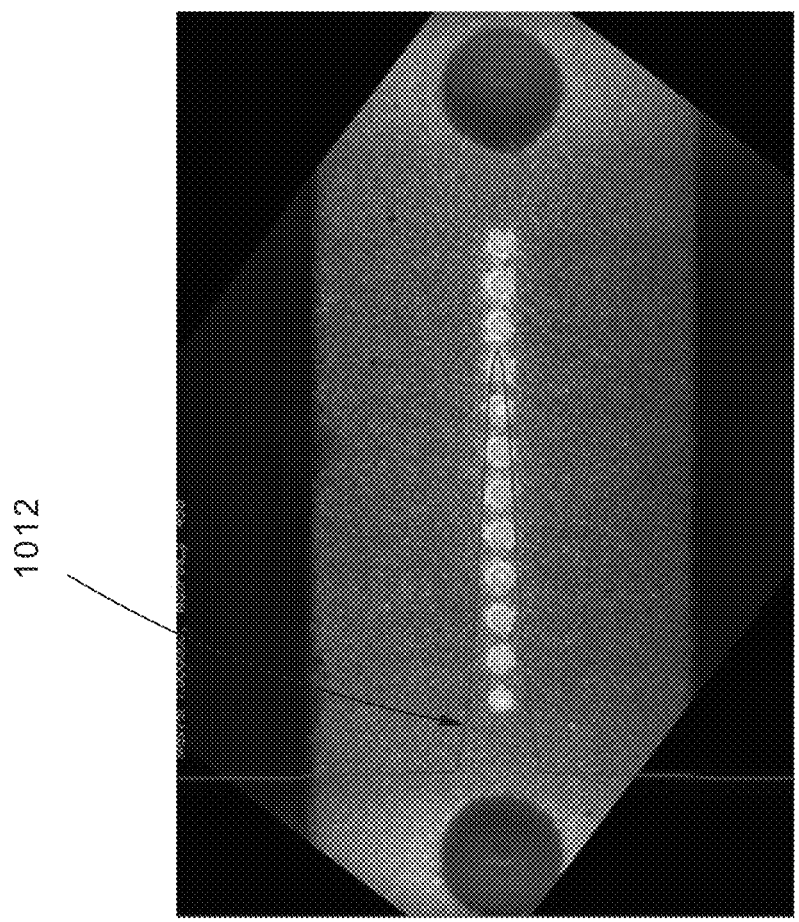
FIG. 31A illustrates an exemplary image captured of a connector end face by the visual inspection application, according to an embodiment of the present disclosure.

At step 1010, spectral methods, such as Fast 1D Fourier transform or Discrete Cosine Transform (DCT), are applied to each row of the image. FIG. 31A shows an example of tile 425 of an end face image of an MPO with 12 fibers. The image shown in FIG. 31B has the DCT applied to show the spectral peaks caused by the fiber periodicity. The period of the fiber array, e.g., 250 microns, can be obtained from the fundamental and harmonic distances in the Fourier or DCT domain. The power ratio among harmonic and fundamental depends on the type of connector, e.g., angled physical or physical contact, and can provide information about the connector end face polishing quality. A weighted sum of those peaks for all the rows produces a profile 1012, which may be overlaid the image shown in FIG. 31A, where the profile 1012 may identify the vertical coordinates of the row(s) that contain the fibers. Identifying the vertical fiber coordinates allows having smaller regions of interest (ROI), which reduces the computation tasks of the following algorithms described here.

At step 1020 of the flow diagram 3000, the ROI of the image that contains the fibers is selected, and the images are replicated $N_p$ times. Each replicated image is filtered using linear or non-linear processes. The diversity of replicated images increases the likelihood of CHT for detecting the fibers. In the flow diagram, $N_p=4$. However, in practice, typical values of $N_p=8$ may be used since it allows the processes to be assigned to a four-core processor with two threads each. A different set of linear and not linear-digital image processing (DIPs) may be applied to each image. For example, for DIP1, a high pass filter may be applied. For DIP2, thresholding and morphological open filter may be applied. For DIP 3, a close morphological filter may be applied. For DIP 4, Canny edge detection may be used. Other image processing techniques such as Laplace or Fourier filtering or histogram equalization may also be implemented when a larger $N_p$ is used.

After the image is transformed, each DIP may execute the CHT process with a different set of thresholds. At step 1040 in the flow diagram 3000, the processor 130 verifies that a population of circles higher than the nominal value of fibers, $N_{nf}$ is found. The circles that have the largest offsets relative to the vertical position found in 1010 are eliminated. If the number of surviving circles, $N_s$, is lower than $N_{nf}$, the process is repeated. If the process is not capable of providing the required number of circles after several iterations (e.g., a predetermined number of iterations), processor 130 displays a message of connector contaminated or defective and stops the PCM process.

At step 1060, the position coordinates and radius of the Ns surviving circles are organized in arrays. At this stage, the number of circles is likely to be larger than the detected fibers' number, $N_s > N_{nf}$.

Figure 32:
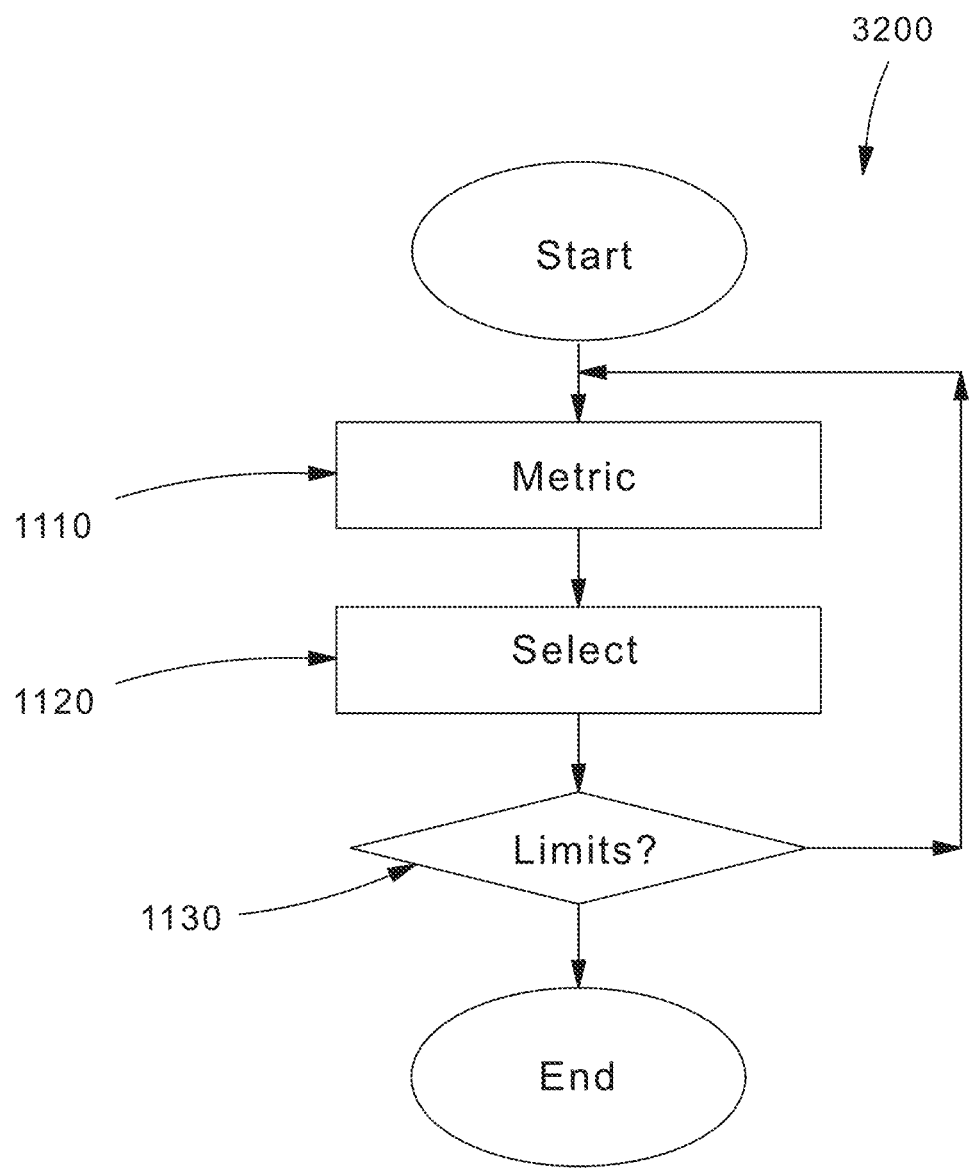
FIG. 32 illustrates an exemplary flow diagram describing an exemplary circle reduction process implemented by the visual inspection application, according to an embodiment of the present disclosure.

At step 1070, the population of circles is reduced using the circle reduction process described in the flow diagram 3200 shown in FIG. 32, which we will describe below. At step 1110 the processor 130 computes a metric that estimates the errors in the circle selection as shown below, $$m_c = \text{STD}\{V_i\} \quad (2),$$

Where STD represents the standard deviation operation, i is the index and take values from 1 to $N_s$, and the vector V has $N_s$ elements computed as, $$V_i = \sin\left(\frac{2\pi}{P_x}x_i + k_{c2}(x_i)^2 + k_{c3}(x_i)^3 + \theta_x\right), \quad (3)$$

where $P_x$ is the period that minimizes $m_c$, xi represents the horizontal position of the circles, $k_{c2}$ and $k_{c3}$ represent the chirp or distortion due to the large FOV. The metric $m_c$ is minimized by finding the optimum values of $P_x$, $k_{c2}$, and $k_{c3}$. A numerical search, such as gradient descent algorithms, can be used. The algorithm requires high accuracy for the $P_x$ values, which can increase the processing time. However, the process can be accelerated by implementing a parallel search processing, in which each CPU core or thread uses as initial value a slight variation of the $P_x$ value found in the spectral process at step 1010.

At step 1120 in the flow diagram 3200, the mean of $V_i$ was computed $\overline{V}$, and circles that depart from the mean beyond a given tolerance are eliminated. The tolerance and the number of iterations of this process are related. Applying tighter acceptance tolerances, e.g., 5%, at the beginning of the process can eliminate circle candidates that correspond to actual fibers. Loose acceptance tolerances, e.g., 20%, require a larger number of iterations, $N_{ite}$, to correctly select the fibers from the found circles. A variable set of tolerances on the order of 15% at the beginning to 5% at the end allows using of a reasonable number of iterations, e.g., $N_{ite} \leq 4$. At step 1120, the population of closely grouped circles is also reduced by averaging their position or selecting the ones $V_i$ closer to it $\overline{V}$.

Alternatively, $V_i$ may be computed as:

$$V_i = \mod\left(\frac{2\pi}{P_x}x_i + k_{c2}(x_i)^2 + k_{c3}(x_i)^3 + \theta_x, 2\pi\right) \quad (4)$$

and all the other steps 1110 and 1120 are followed as previously described.

At step 1130 in the flow diagram 3200, when the number of iterations, k, is reached, $k=N_{ite}$, the process stops and returns to step 1075 in the flow diagram 3000. Otherwise, it continues to the next iteration of step 1110.

Figure 33:
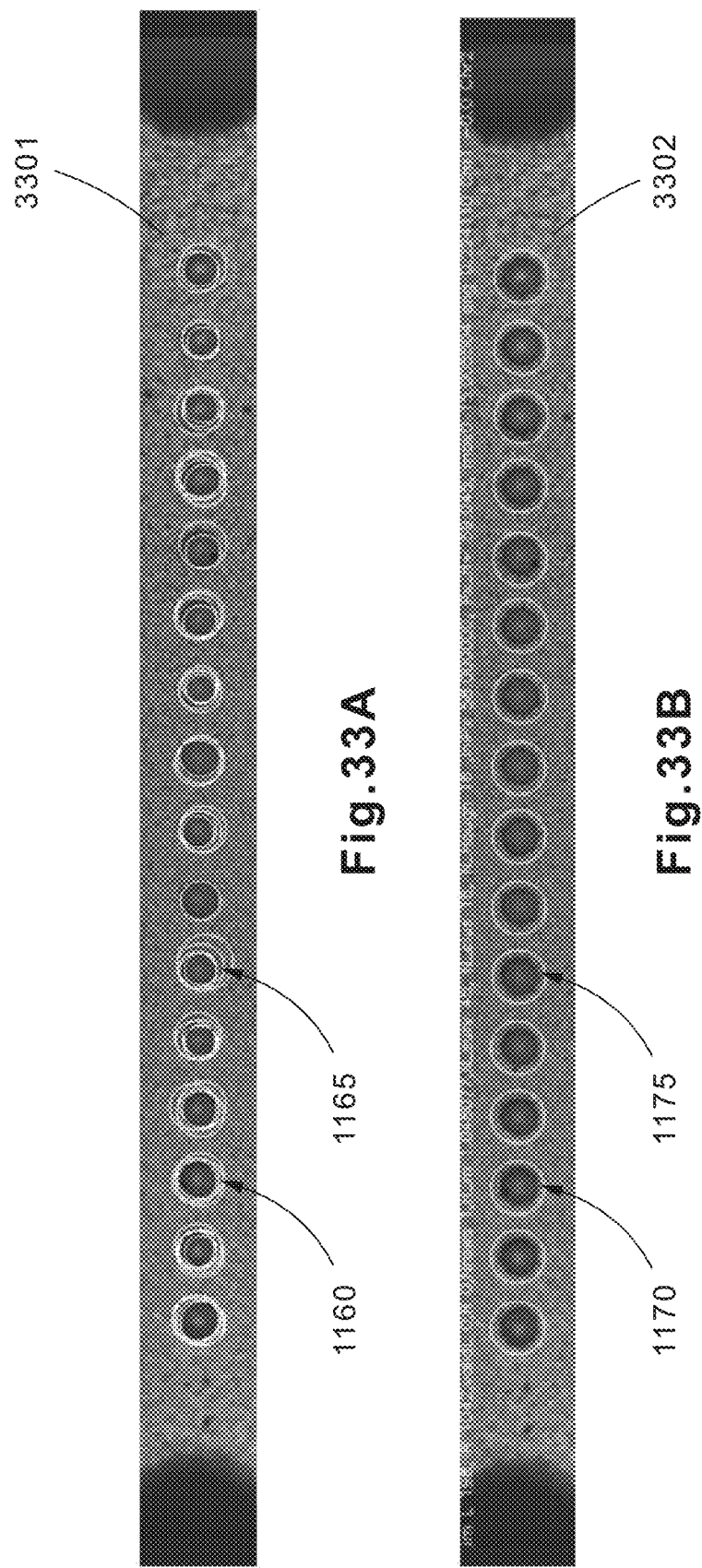
FIG. 33A illustrates an exemplary image showing an implementation of a circle reduction process implemented by the visual inspection application to assist in the identification of fiber faces in a connector end face, according to an embodiment of the present disclosure.
FIG. 33B illustrates an exemplary image showing the results of a circle reduction process implemented by the visual inspection application to assist in the identification of fiber faces in a connector end face, according to an embodiment of the present disclosure.

An example of the circle reduction results for a connector with 16 fibers is provided by the images shown in FIGS. 33A-33B. In FIG. 33A, the initial Ns circles from the processes implemented at steps 1005 to 1060 are presented on the image 3301. The resultant circles after the processes implemented in step 1170 are presented on the image 3302 shown in FIG. 33B. In both FIGS. 33A and 33B, the radius of the circles has been slightly increased for illustrative purposes. As expected, it may be observed that in FIG. 33A the number of circles is higher than the nominal number of fibers, 16, and each fiber may be associated with more than one circle. For example, fiber #3 has a tight set of circles 1160, and fiber #6 has a broad spread set of circles 1165. According to some embodiments, the sensitivity of the CHT may be reduced to avoid multiple circles per fiber.

Unfortunately, for reasons explained previously in this application, although optimum CHT tuning can be done for one (compliant and clean) connector, the same parameters cannot be used for other connectors or the same connector with contamination.

At step 1075 in the flow diagram 3000, a least square regression line is obtained from the circles' coordinates obtained after step 1070, and the residual tilt angle is computed from the slope. If the residual tilt is greater than a given tolerance, e.g., 0.2 degrees, the method is repeated. Otherwise, at step 1090 the information of the circles (positions and radius) is stored in memory, and the PCM process stops.

Figure 34:
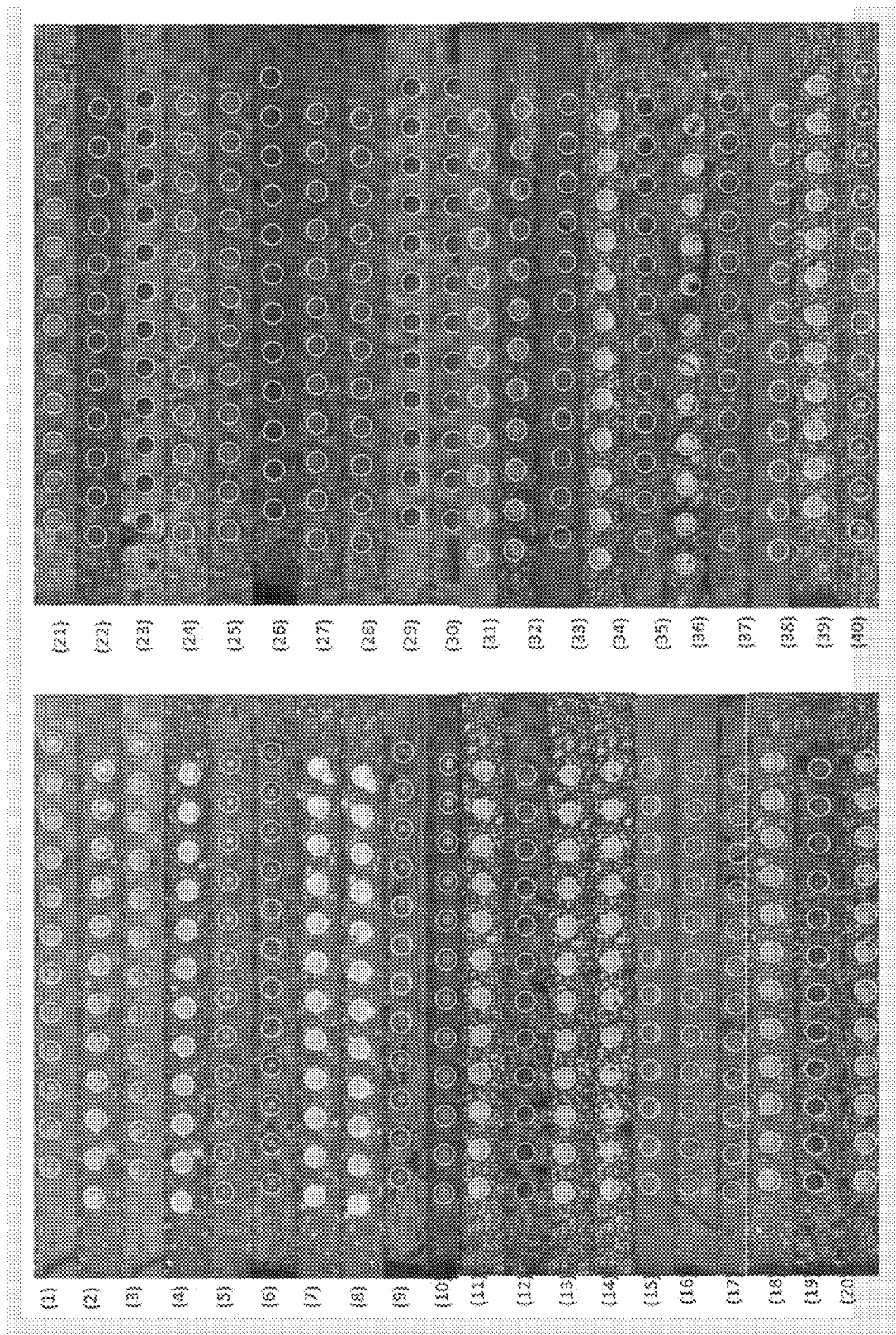
FIG. 34 illustrates an exemplary image showing the results of a polar detection algorithm (PDA) process implemented by the visual inspection application to assist in the identification of fiber faces in a connector end face, according to an embodiment of the present disclosure.

Examples of the effectiveness of the PCM process before the residual tilt correction 1070 are shown by the images in FIG. 34. The images from FIG. 34 present results for 40 MPO connectors with different degrees of residual tilt, offset, and degree of contamination. The set comprises a combination of angled physical contact connectors and physical contact connectors. Using the same population of connectors, CHT alone produced significant false positives or negatives. The PCM process results indicate that the fibers can be detected with good accuracy at this stage.

Step 640: Polar Detection Algorithm

Figure 35:
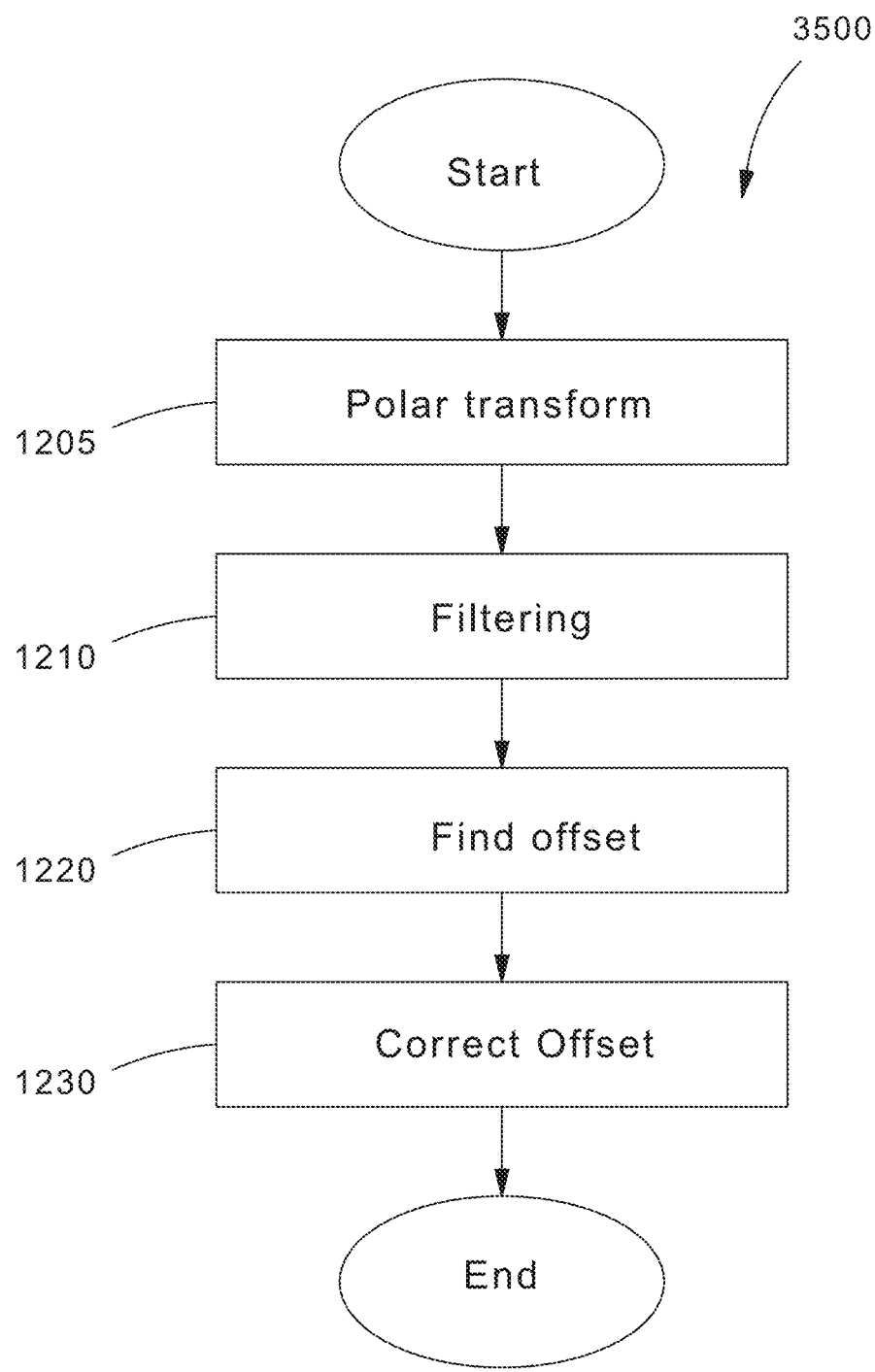
FIG. 35 illustrates an exemplary flow diagram describing an exemplary PDA process implemented by the visual inspection application, according to an embodiment of the present disclosure.

Despite the results shown in FIG. 34, there are some errors, specifically offsets between the actual fiber and the detected circles. The PDA described here utilizes the previous estimation of the fiber position from the PCM process at step 630 and corrects the residual offsets using the flow diagrams shown in FIG. 35. At step 1205 in the flow diagram 3500, a polar transform of the found fibers is performed, and the processor 130 replicates the polar images for parallel processing.

Figure 36A:
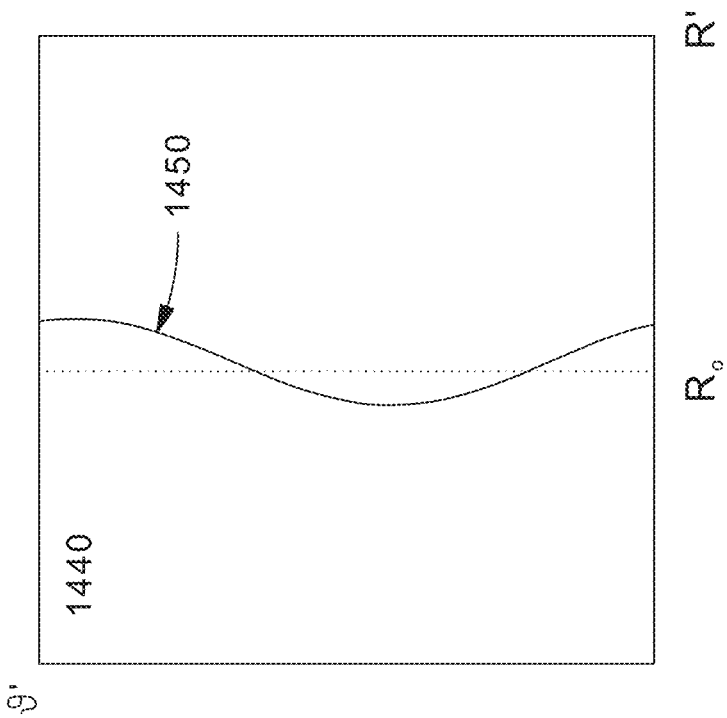
FIG. 36A illustrates an exemplary schematic of a polar transform applied to an image of a fiber end face identified from a captured image of a connector end face by the visual inspection application, according to an embodiment of the present disclosure.

FIG. 36A shows a schematic of this polar transform. In that figure, X' and Y' are the original coordinates of the fiber in a selected image region 1400. Circle 1430 represents the fiber found from the PCM process at step 630, a fiber that is centered at 1420 and has a radius, Ro. Center 1420 has cartesian coordinated $(x_c, y_c)$. The center of region 1400, labeled 1410, has cartesian coordinates $(x_r, y_r)$. As depicted in the figure, after the PCM process at step 630, a residual offset between the center of the region and the center of the circle could occur. The magnitude and orientation of the offset can be computed as, $$r = \sqrt{(x_c-x_r)^2+(y_c-y_r)^2} \quad (5),$$

$$\beta = a\tan((y_c-y_r)/(x_c-x_r)) \quad (6),$$

Figure 36B:
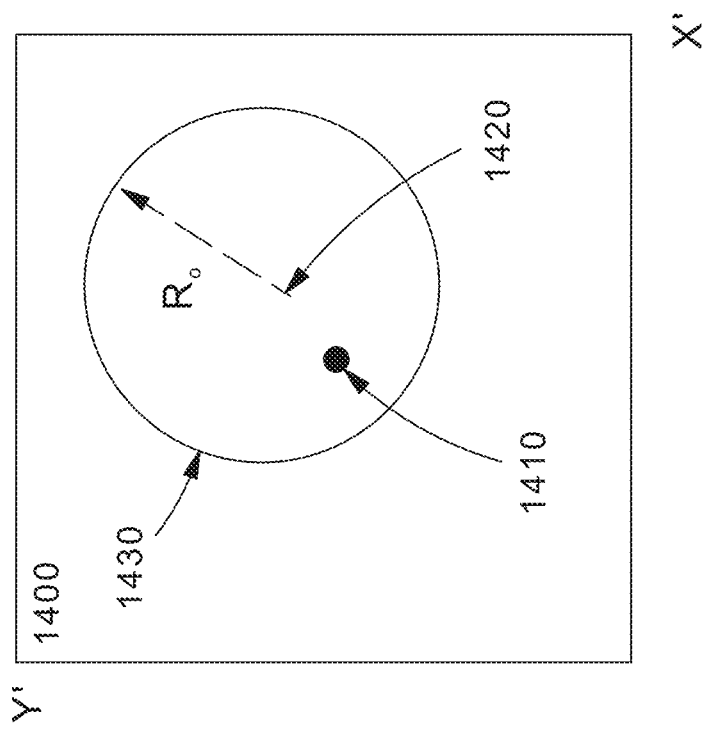
FIG. 36B illustrates an exemplary chart resulting from a polar transform applied to an image of a fiber end face identified from a captured image of a connector end face by the visual inspection application, according to an embodiment of the present disclosure.

FIG. 36B shows the results after the polar transform, where the circle 1430 is transformed to a curve 1450, which can be represented by the following equation, $$R^2 = R_o^2 + 2rR\cos(\vartheta-\beta)+r^2 \quad (7),$$

It may be assumed that $r<<R_o$, since the residual offsets after the PCM process at step 630 are small, e.g., r<6 microns. This allows us to rewrite Eq. (7) as, $$R(R_o,r,\beta,\vartheta) \approx R_o + 2r\cos(\vartheta-\beta) \quad (8)$$

At step 1210, an edge detection process is applied to one of the polar image replicas using traditional methods such as Canny edge detection algorithms. For other replicas, asymmetric filters are applied. For example, a high pass filter can be applied to the R' axis and a low pass filter to the $\vartheta'$ axis. The filtered image, using linear or non-linear asymmetric methods, is labeled $I^{(r)}_{polar}(R,\vartheta)$, where r represents the replication index.

At step 1220, the parameters $R_o$, r and $\beta$ are varied, and for each replicated image the metric $m_{PDA}$, shown below is numerically computed, $$m_{PDA}(R_o,r,\beta) = \int I_{polar}(R(Ro,r,\beta,\vartheta),\vartheta)d\vartheta \quad (9).$$

This equation quantifies the degree of overlap between a circle of radius $R_o$, with offset magnitude and orientation r and $\beta$ radius and one of the filtered polar images. Gradient descent can be used to find the optimum $R_o$, r, and $\beta$ values that maximize the metric $m_{PDA}$. The highest value of all the polar metrics is selected, and the optimum parameters r and $\beta$ are used in 1220 to determine the offset $(x_{offset}, y_{offset})$ as shown, $$x_{offset} = r\cos(\beta) \quad (10),$$

$$y_{offset} = r\sin(\beta) \quad (11),$$

At step 1230 the offset of the fibers was corrected in the cartesian images, and images of each fiber are stored for further analysis.

Figure 37A:
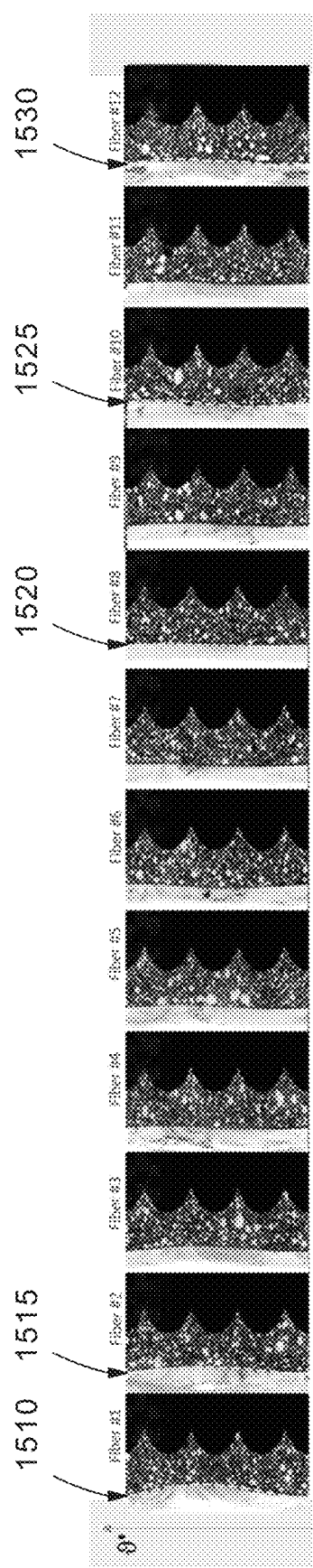
FIG. 37A illustrates an exemplary set of images after a polar conversion is applied for identifying traces by the visual inspection application, according to an embodiment of the present disclosure.
Figure 37B:
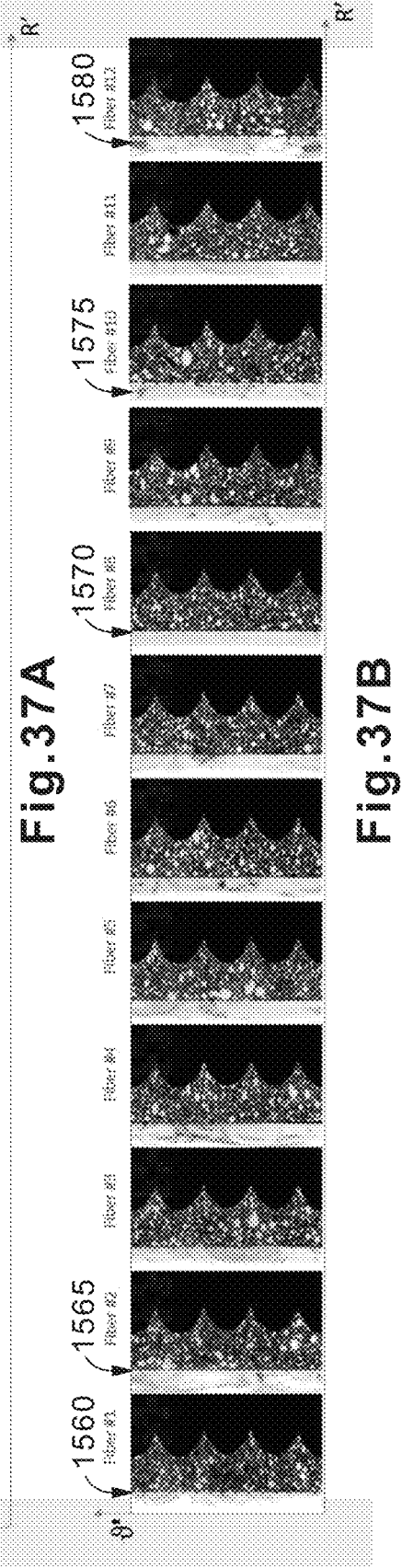
FIG. 37B illustrates an exemplary set of images after a PDA correction is applied to the images from FIG. 37A by the visual inspection application, according to an embodiment of the present disclosure.

FIGS. 37A and 37B shows an exemplary set of images that represent the images of the twelve fibers of an MPO connector in polar coordinates before and after the PDA process is applied at step 640 for correction. FIG. 37A shows the image after the polar conversion where the traces 1450 are identified (e.g., as shown in FIG. 36B). In this example, the traces 1450 of fibers 1, 2, 8, 10, and 12 are labeled as 1510, 1515, 1520, 1525, and 1530, respectively, in FIG. 37A. The traces 1510 and 1515 have a higher degree of curvature, which indicates that although the PCM process from step 630 identified the correct fiber location, there were some residual errors in the calculated position of the fiber center. The maximum and minimum of traces 1510, 1515, 1520, 1525, and 1530 are different, indicating that the offsets' orientation p is different for the fibers on the left and right of the connector. Trace 1520 has the minimum curvature, indicating that the errors in the position were very small. FIG. 37B shows the traces of the same fibers after the PDA correction is applied at step 640. In this case, all traces 1510, 1515, 1520, 1525, and 1530 that were shown to have some degree of curvature are converted to traces 1560, 1565, 1570, 1575, and 1580 with negligible curvature. These traces, which look similar to straight lines, indicate that r, in Eq. (8), and the offsets computed using Eqs. (10) and (11), are negligible.

Figure 38A:
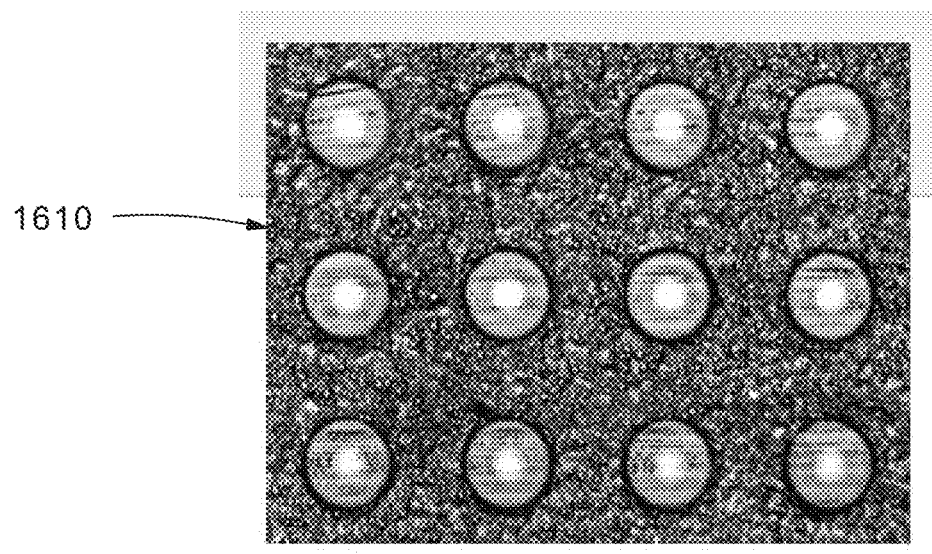
FIG. 38A illustrates an exemplary image showing fibers in a connector end face after a PDA process is applied by the visual inspection application to a first connector, according to an embodiment of the present disclosure.
Figure 38B:
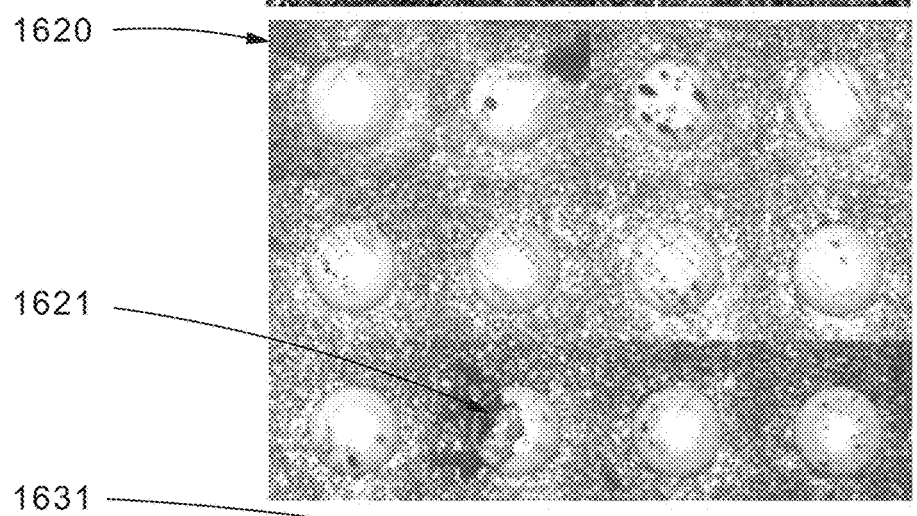
FIG. 38B illustrates an exemplary image showing fibers in a connector end face after a PDA process is applied by the visual inspection application to a second connector, according to an embodiment of the present disclosure.
Figure 38C:
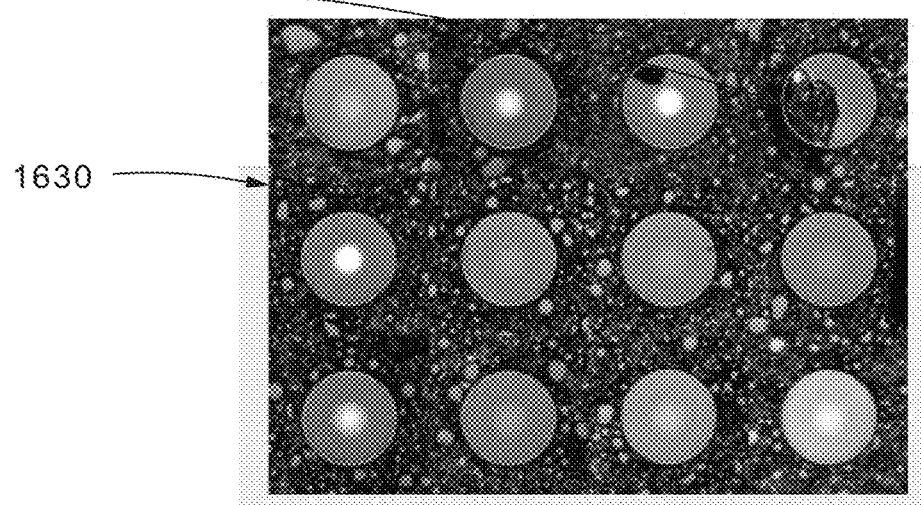
FIG. 38C illustrates an exemplary image showing fibers in a connector end face after a PDA process is applied by the visual inspection application to a second connector, according to an embodiment of the present disclosure.

FIGS. 38A-37C show exemplary images that display the results from a test of the PDA process being applied at step 640 and the PCM process being applied at step 630 for three connectors 1610, 1620, and 1630. The connectors are subject to different degrees of contamination, tilts, and illuminations. For example, oil was applied to a first connector end face 1610 and a second connector end face 1620 as shown in the images from FIGS. 38A and 38B, respectively. In the image of the second connector end face 1620, a fiber #10 1621 is shown to include both poorly polished areas and debris covering edges of the fiber face. Also, the exposure time was increased in the image capturing the second connector end face 1620 to simulate a connector with high reflectivity. In the third connector end face 1630, a fiber #4 1631 is shown to include debris that blocks almost 40% of the fiber's face. By applying both the PDA process after applying the PCM process enables the estimation of all the fibers' locations with minimal (i.e., insignificant) errors, and the fibers may be located with high accuracy, as shown by the colored circles around the fibers shown in FIGS. 38A-38B.

Step 645: Alignment Holes or Pins Detection

Figure 39:
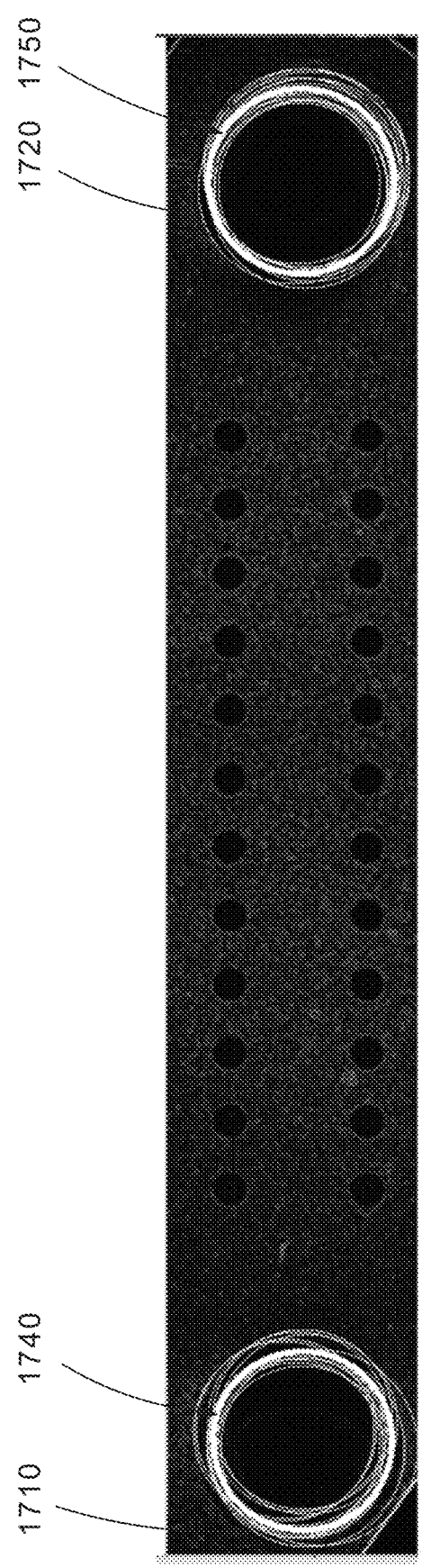
FIG. 39 illustrates an exemplary image showing circles that are calculated according to a hole/pin detection process applied by the visual inspection application to identify the holes/pins included on a connector end face, according to an embodiment of the present disclosure.

This process utilizes the best focused images for tiles 413 and 415 and generates a set of circle candidates using the CHT process. It also utilizes information from connector specifications to limit the range of possible radius of those circles. For example, for an MPO connector, the hole diameters are approximately 700 microns for connectors with 8, 12, and 24 fibers. A process of elimination of candidates starts by rejecting circles that are outside the possible range of vertical coordinates, defined by the fiber array. Another source of elimination is the distance between the holes or pins cannot depart much from the nominal distance defined in standards. The location of surviving circles may then be averaged. FIG. 39 shows an exemplary image displaying results from this alignment hole/pin detection process for an MPO connector including 24 fibers. The plurality of white circles are circle candidates 1710 and 1720 (e.g., with small trace thickness) that represent circle candidates that are generated and survived after applying the location constraints mentioned above. The set of circle candidates 1710 and 1720 may be reduced based on knowledge of the hole dimensions. The resulting prediction circles 1740 and 1740 (e.g., with larger trace thickness) represent the alignment hole/pin and are positioned based on a computation of the average position of the surviving candidate circles 1710 and 1720.

Step 650: Contamination Detection

At step 650 in the flow diagram 2400, the contamination of the connector end faces is evaluated in two steps. First, the images for each fiber on the connector end face 401, which were located with high accuracy at step 640, are evaluated. The process can be run in parallel for each fiber. Minor variations on the intensity indicate possible candidates for contamination, The shape and reflectivity of the suspected region helps to determine the type of contamination. For example, scratches tend to be very thin (<1 micron) and large (>10 microns), and brighter than their surrounded areas. The utilization of a multi-wavelength type of light source 107 may help to identify the nature of the contamination. The detection of the contamination may be made in the cartesian or polar coordinate system. The latter makes it easy to detect the polar images after the PDA process at step 640 may be used directly. Moreover, the polar images can also provide information about the radial position of the contamination. The radial position is the critical parameter since it indicates the contamination position relative to the fiber core that transmits the information. The angular position of the defect is, in most cases, irrelevant.

Figure 40B:
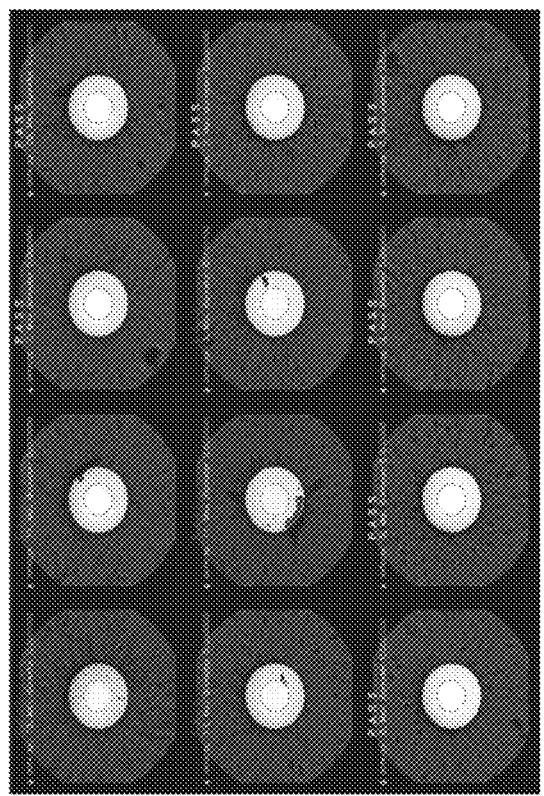
FIG. 40B illustrates an exemplary image showing contaminants on fibers identified by the visual inspection application, according to an embodiment of the present disclosure.
Figure 40A:
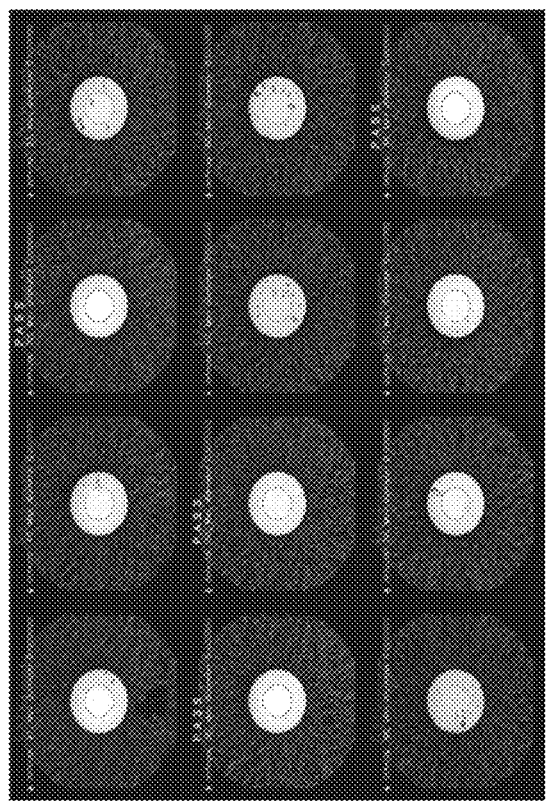
FIG. 40A illustrates an exemplary image showing contaminants on fibers identified by the visual inspection application, according to an embodiment of the present disclosure.

The results are reported and compared with standards specifications such as IEC 61300 3-35. An exemplary report that may be generated by the image analysis application is shown in FIG. 26A. FIGS. 40A and 40B show exemplary images of the contamination detection for two fibers of two connectors that may be produced by the image analysis application.

The detection of contamination outside the fiber region is also important since it can migrate to the fiber when the connectors are moved. Different types of processes are required to detect the contamination outside the fiber. As mentioned, the contamination detection focused on the fibers becomes less complex when the location of the fibers is found with accuracy. This was achieved by the disclosed processes at steps 630 and 640. These processes combine different image processing techniques in a novel way to detect the fiber. However, this does not directly assist in detecting contamination that may exist outside the fiber region.

Figure 41:
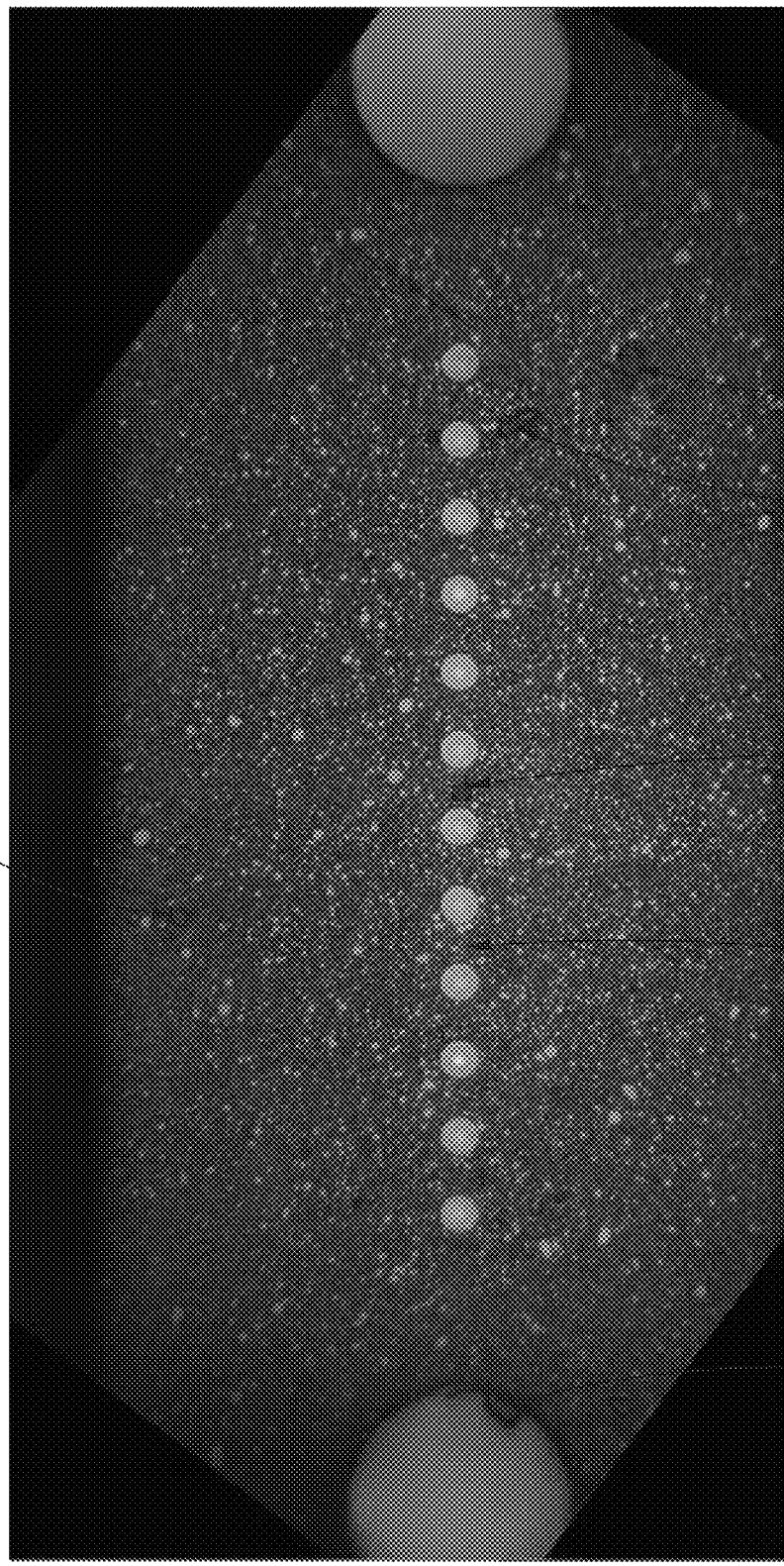
FIG. 41 illustrates an exemplary image showing contaminants on an face of a connector, according to an embodiment of the present disclosure.

Here we implement a process that detects the change of reflectivity relative to surrounding areas but also changes on patterns. The results of this process is shown by the exemplary image provided in FIG. 41. In the image shown in FIG. 41, a number of defects 2010, 2015, 2020, 2025, 2030, and 2035 are detected outside the fibers for a patch cord with MPO connectors. Defect 2010 shows contamination near an alignment hole. This contaminant could produce a minute shift on the horizontal axis and increase connector losses. The other defects 2015, 2020, 2025, 2030, and 2035 are contaminants that may migrate when the cable or cassette is moved and block some of the twelve fibers of the connector.

While the particular embodiments described herein have been shown and described, it will be obvious to those skilled in the art that changes and modifications may be made without departing from the teaching of the features described herein. For example, the visual inspection module may include different combinations of the components described herein and still be within the scope of this disclosure. The matter set forth in the foregoing description and accompanying drawings is offered by way of illustration only and not as limitation. The actual scope is intended to be defined in the following claims when viewed in their proper perspective.

What is claimed is:

1. A visual inspection device comprising:
   a light source configured to emit a light transmission;
   a diffuser configured to receive the light transmission from the light source;
   a lenticular lens positioned between the light source and the diffuser;
   a mirror configured to reflect the light transmission from the diffuser;
   a beam splitter configured to reflect the light transmission from the mirror;
   an adapter configured to hold a connector end face and direct the light transmission from the beam splitter onto the connector end face, wherein the light transmission reflects off the connector end face and back through the beam splitter;
a tunable lens configured to receive and direct the light transmission from the beam splitter; and
an image sensor configured to receive the light transmission from the tunable lens and capture an image of the connector end face.

2. The visual inspection device of claim 1, wherein the adapter includes a first convex lens and a magnifying lens, wherein the magnifying lens includes a predetermined amount of magnification for corresponding to a type of connector intended by the adapter.

3. The visual inspection device of claim 2, wherein a distance between the tunable lens and the image sensor is between 5% to 30% of the distance between the first convex lens and the image sensor.

4. The visual inspection device of claim 1, wherein an inner housing of the adapter includes a tapered shape portion.

5. The visual inspection device of claim 1, further comprising:
a second convex lens between the beam splitter and the tunable lens.

6. The visual inspection device of claim 1, wherein the light source is configured to emit light transmissions in different wavelengths.

7. The visual inspection device of claim 1, further comprising:
an aperture positioned between the light source and the diffuser.

8. The visual inspection device of claim 1, wherein the diffuser comprises a first diffuser and a second diffuser.

9. The visual inspection device of claim 1, further comprising:
a cylindrical lens positioned between the light source and the diffuser.

10. The visual inspection device of claim 1, further comprising:
an optical grating positioned between the light source and the diffuser.

11. The visual inspection device of claim 1, further comprising:
a computing system in communication with the visual inspection device, the computing system configured to:
receive the captured image; and
apply image recognition on the captured image to identify contamination on the end face of the connector.

12. The visual inspection device of claim 1, wherein the image sensor is diagonally tilted with respect to the connector end face held in the adapter.

* * * * *